US011965785B2

(12) United States Patent
Moriura et al.

(10) Patent No.: US 11,965,785 B2
(45) Date of Patent: Apr. 23, 2024

(54) PRESSURE-SENSITIVE ELEMENT HAVING SUFFICIENT EXPANDABILITY, A WIDE MEASUREMENT RANGE OF PRESSURE FORCE, AND A SIMPLE STRUCTURE, AND AN ELECTRONIC DEVICE USING THE PRESSURE-SENSITIVE ELEMENT

(71) Applicant: Panasonic Intellectual Property Management Co., Ltd., Osaka (JP)

(72) Inventors: Yuta Moriura, Osaka (JP); Yui Sawada, Osaka (JP); Shinobu Masuda, Osaka (JP); Hironobu Ukitsu, Osaka (JP); Takashi Matsumoto, Osaka (JP); Mitsutaka Matsumoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 368 days.

(21) Appl. No.: 17/220,971

(22) Filed: Apr. 2, 2021

(65) Prior Publication Data
US 2021/0223119 A1 Jul. 22, 2021

Related U.S. Application Data

(63) Continuation of application No. PCT/JP2019/035647, filed on Sep. 11, 2019.

(30) Foreign Application Priority Data

Oct. 18, 2018 (JP) .................. 2018-196844
Oct. 30, 2018 (JP) .................. 2018-204064

(51) Int. Cl.
*G01L 1/14* (2006.01)
*G01L 5/22* (2006.01)
*G06F 3/044* (2006.01)

(52) U.S. Cl.
CPC ............... *G01L 1/14* (2013.01); *G01L 5/22* (2013.01); *G06F 3/044* (2013.01)

(58) Field of Classification Search
CPC ......... G01L 5/228; G01L 5/221; G01L 1/146; G06F 3/0446
See application file for complete search history.

(56) References Cited

U.S. PATENT DOCUMENTS 4,574,438 A * 3/1986 Diepers ................ G01L 5/228
29/25.35
7,958,789 B2 * 6/2011 Hayakawa .............. G01B 7/22
73/862.626

(Continued)

FOREIGN PATENT DOCUMENTS

JP 6-323929 11/1994
JP 2008-170425 7/2008

(Continued)

OTHER PUBLICATIONS

International Search Report of PCT application No. PCT/JP2019/035647 dated Dec. 10, 2019.

*Primary Examiner* — Tran M. Tran
(74) *Attorney, Agent, or Firm* — Rimon P.C.

(57) ABSTRACT

Provided is a pressure-sensitive element having more sufficient expandability, a relatively wide measurement range of pressure force, and a relatively simple structure, and an electronic device using the pressure-sensitive element. The pressure-sensitive element includes a plurality of first electrodes being elongated in first direction, arranged in a first plane, and including a conductive elastic body, a plurality of second electrodes being elongated in second direction intersecting the first direction, arranged in a second plane facing the first plane, and including a conductor wire, and a plurality of dielectrics covering a surface of the plurality of second electrodes. The plurality of second electrodes have (Continued)

bent parts K arranged periodically, and capacitance at intersections of the plurality of first electrodes and the plurality of second electrodes changes in accordance with pressure force applied between the plurality of first electrodes and the plurality of second electrodes.

14 Claims, 43 Drawing Sheets

(56) References Cited

U.S. PATENT DOCUMENTS

| | | | | |
|---|---|---|---|---|
| 8,191,427 | B2* | 6/2012 | Hattori | E05F 15/44 |
| | | | | 340/657 |
| 8,451,013 | B1* | 5/2013 | Hsiao | B29C 70/54 |
| | | | | 324/609 |
| 8,544,336 | B2* | 10/2013 | Main | G01L 1/146 |
| | | | | 73/715 |
| 8,621,942 | B2* | 1/2014 | Sleeman | G01L 1/146 |
| | | | | 73/862.626 |
| 8,997,588 | B2* | 4/2015 | Taylor | A61B 5/6892 |
| | | | | 73/862.041 |
| 9,415,517 | B2* | 8/2016 | Naidu | B25J 9/1694 |
| 9,642,470 | B2* | 5/2017 | Taylor | A47C 27/082 |
| 9,645,021 | B2* | 5/2017 | Miura | G01L 1/22 |
| 9,904,395 | B2* | 2/2018 | Ogura | G01L 1/144 |
| 10,317,442 | B2* | 6/2019 | Kawaguchi | G01D 5/24 |
| 10,337,849 | B2* | 7/2019 | Otaka | G01B 7/16 |
| 10,365,171 | B2* | 7/2019 | Kaneko | G01B 7/28 |
| 10,401,241 | B2* | 9/2019 | Madden | G06F 3/04144 |
| 10,555,609 | B2* | 2/2020 | Park | A47C 7/62 |
| 10,760,982 | B2* | 9/2020 | Watazu | G01L 5/165 |
| 10,795,521 | B2* | 10/2020 | Leigh | G06F 3/0445 |
| 10,934,639 | B2* | 3/2021 | Horter | G01L 1/146 |
| 11,030,432 | B2* | 6/2021 | Kim | G06V 40/1306 |
| 11,099,669 | B2* | 8/2021 | Park | G01L 1/146 |
| 11,150,147 | B2* | 10/2021 | Horter | G01L 1/146 |
| 11,346,727 | B2* | 5/2022 | Hotta | G01L 1/148 |
| 2015/0294756 | A1* | 10/2015 | Ben Shalom | G01L 1/246 |
| | | | | 28/169 |
| 2016/0283006 | A1* | 9/2016 | Ogura | G01L 1/146 |
| 2016/0283007 | A1* | 9/2016 | Ogura | G01L 1/146 |
| 2018/0157364 | A1* | 6/2018 | Frey | G06F 3/04144 |
| 2019/0241204 | A1* | 8/2019 | Uematsu | B62D 1/065 |
| 2019/0277713 | A1 | 9/2019 | Moriura et al. | |

FOREIGN PATENT DOCUMENTS

| | | |
|---|---|---|
| JP | 2013-147765 | 8/2013 |
| JP | 5278038 B | 9/2013 |
| JP | 5519068 B | 6/2014 |
| JP | 2014-190712 | 10/2014 |
| JP | 5668966 B | 2/2015 |
| JP | 2016-090319 | 5/2016 |
| JP | 2017-080177 | 5/2017 |
| JP | 2018-019762 | 2/2018 |
| JP | 2018-072200 | 5/2018 |
| WO | 2018/096901 | 5/2018 |

* cited by examiner

FIG.9
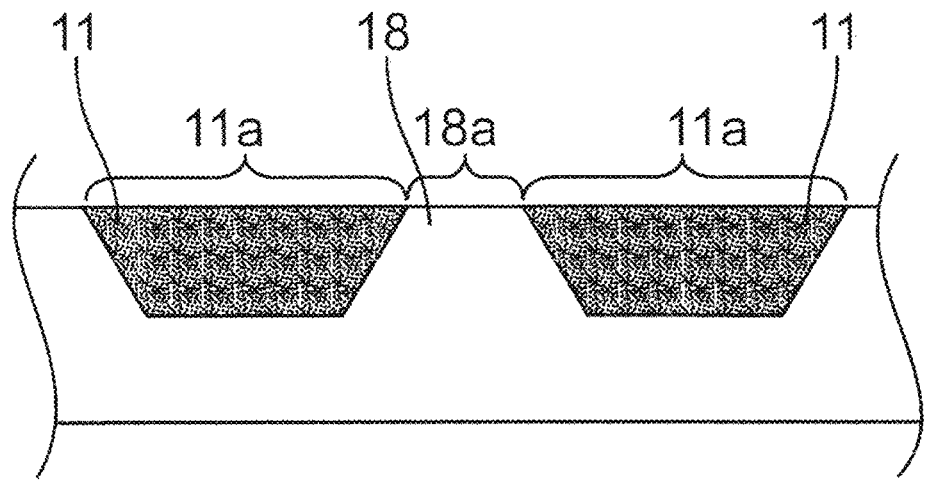
FIG.10
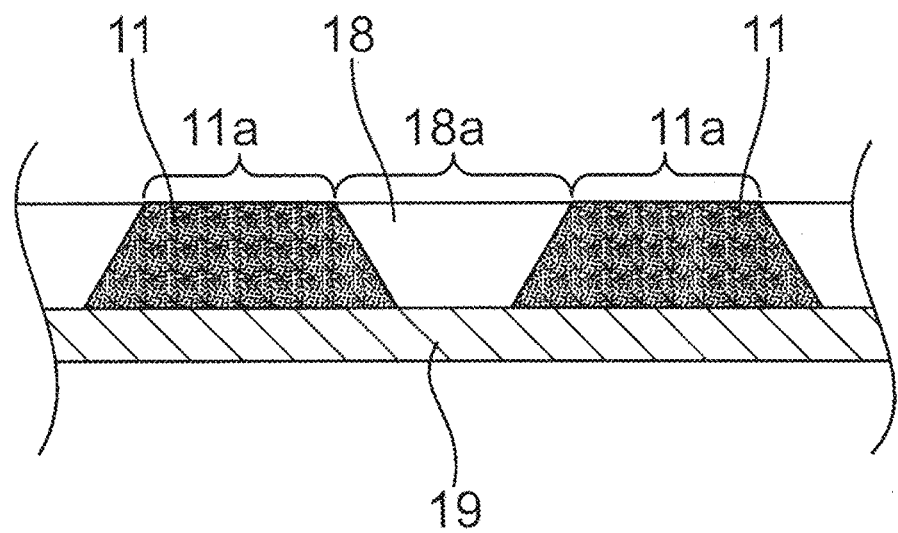
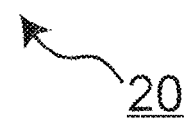

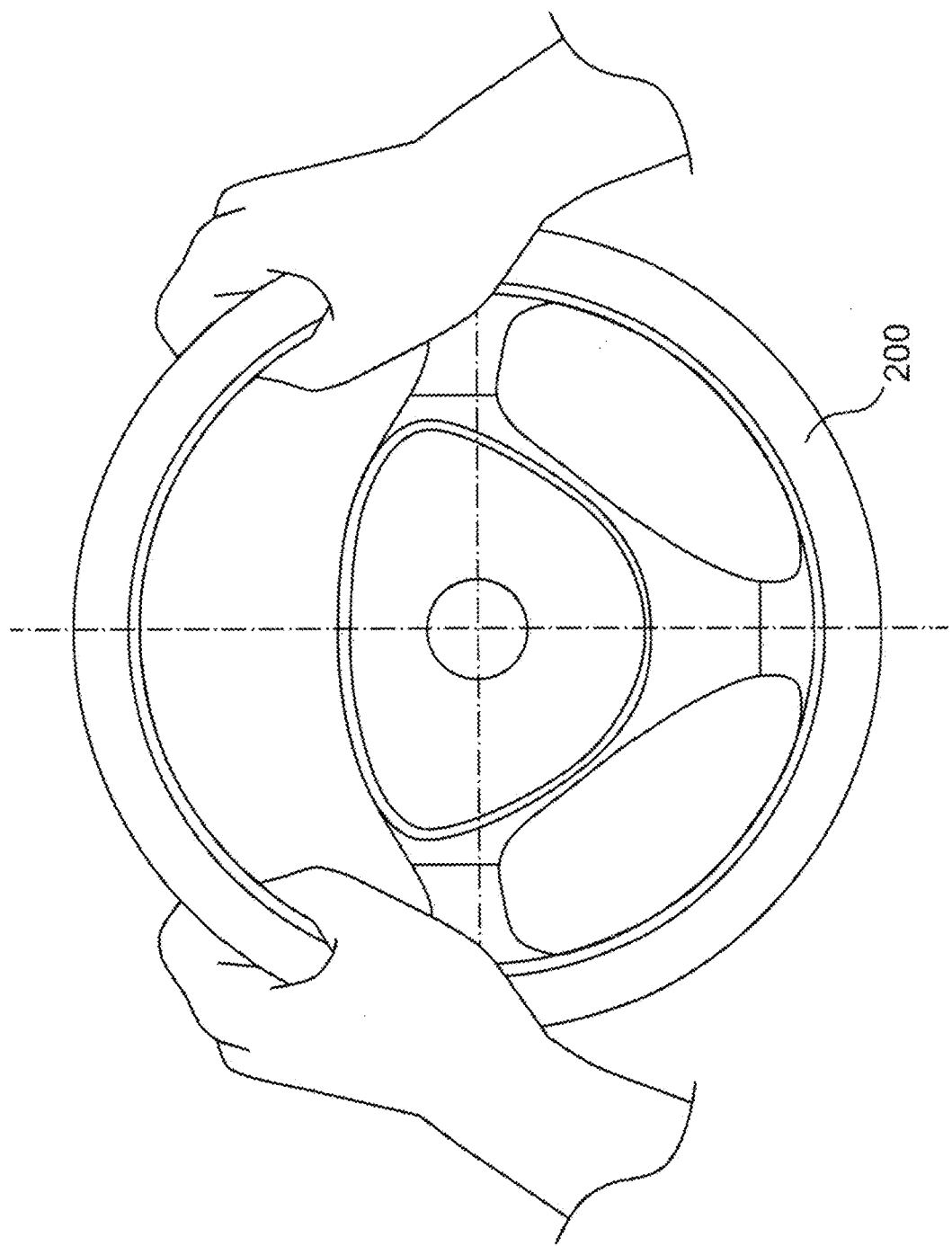

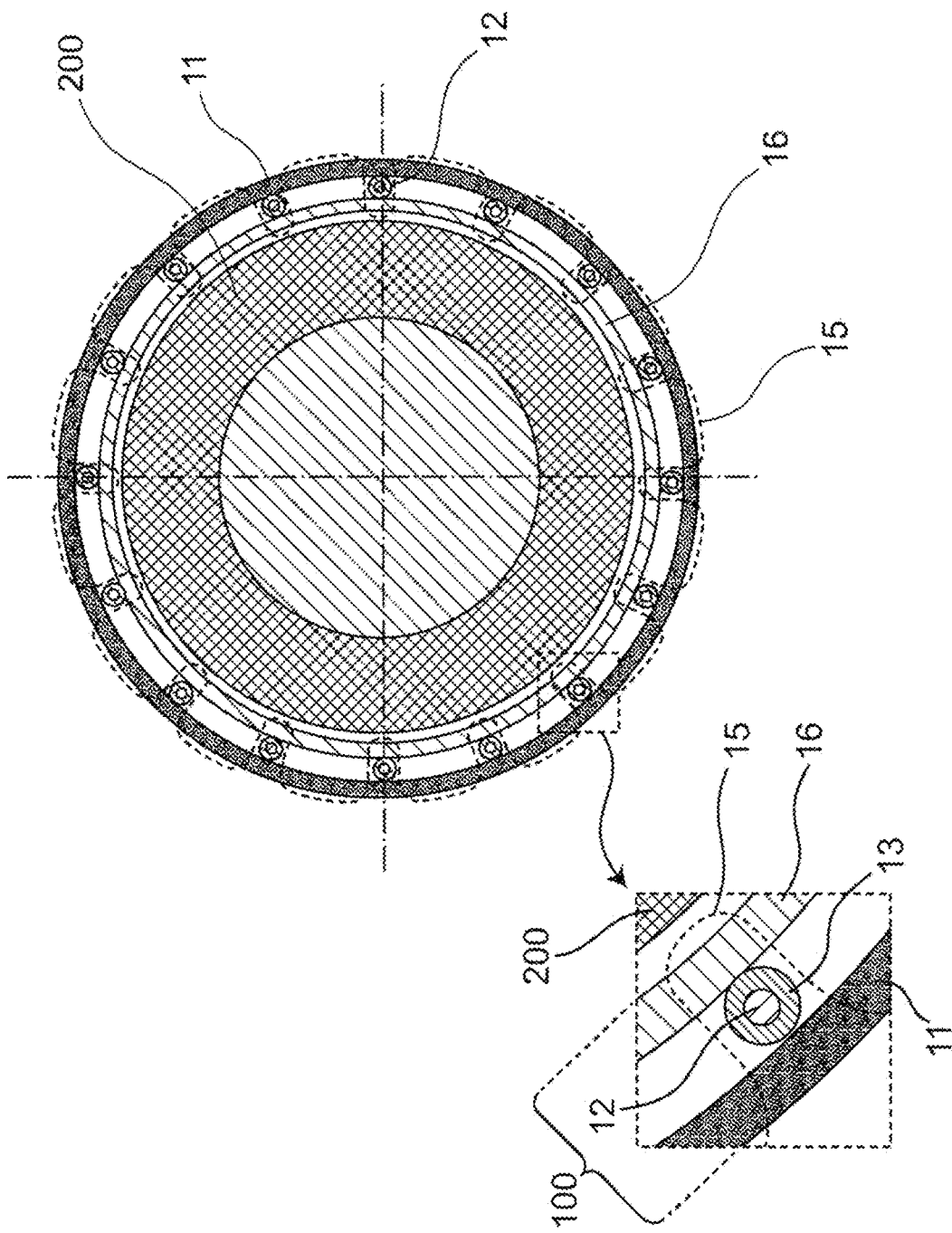

FIG.37A
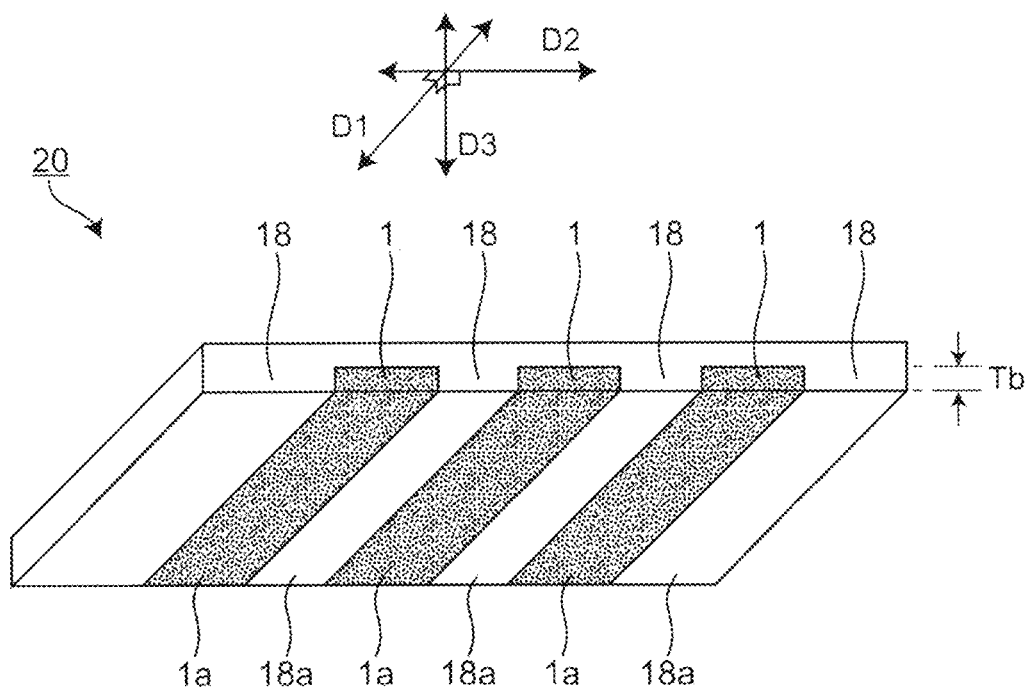
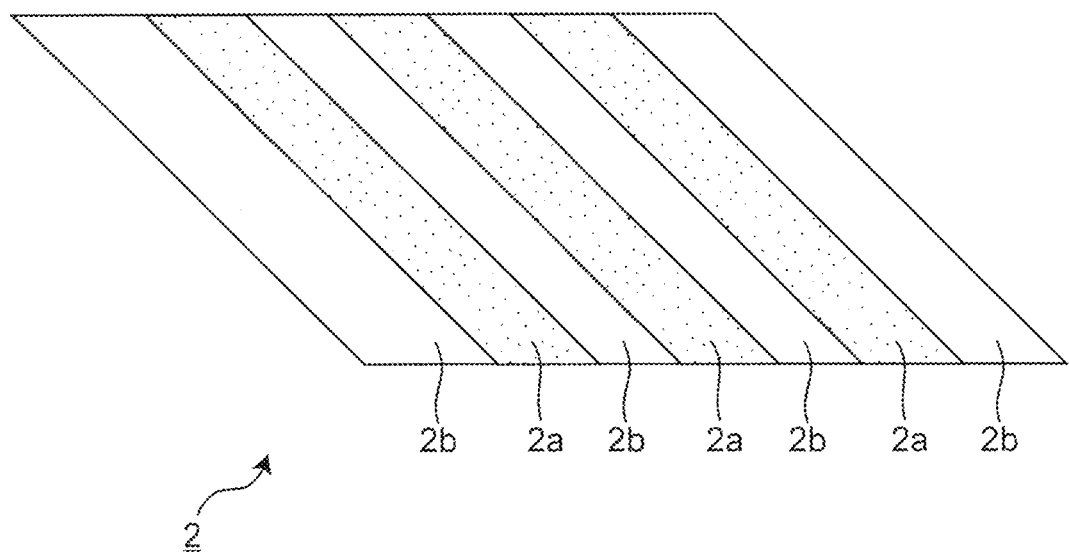

FIG.37B
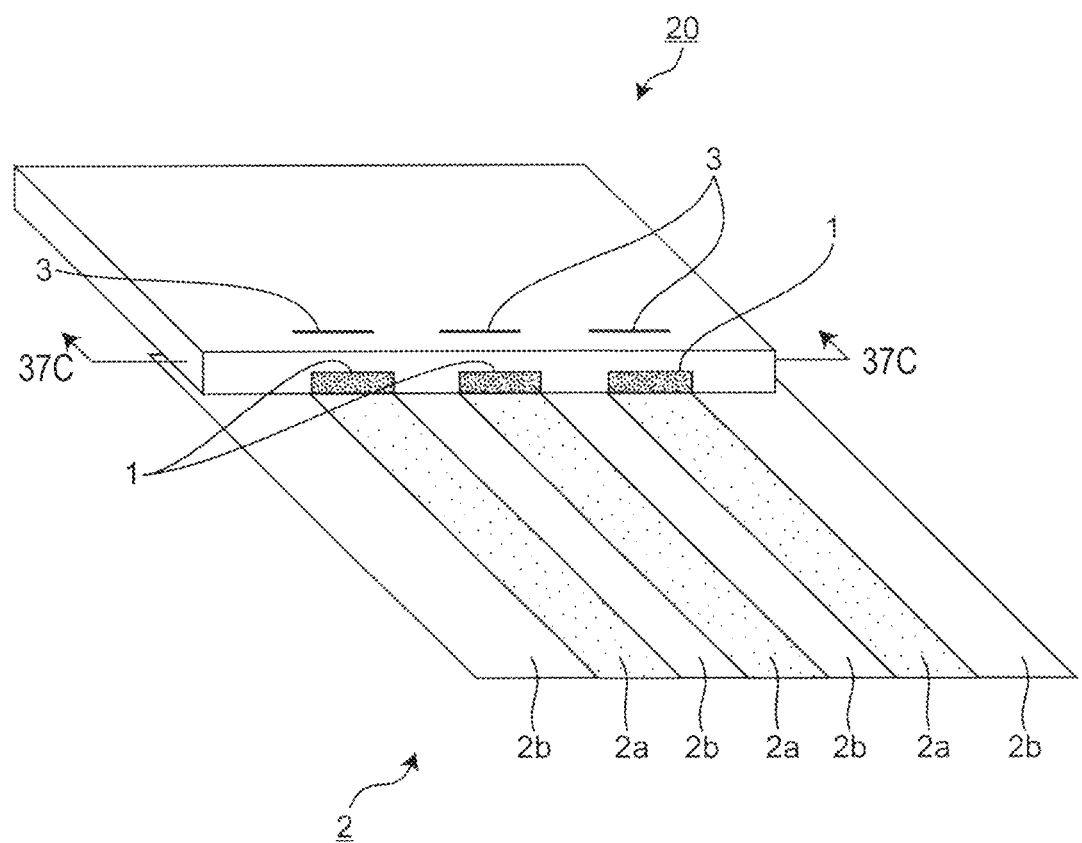
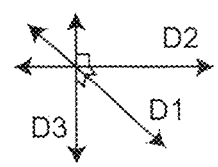

FIG.37C
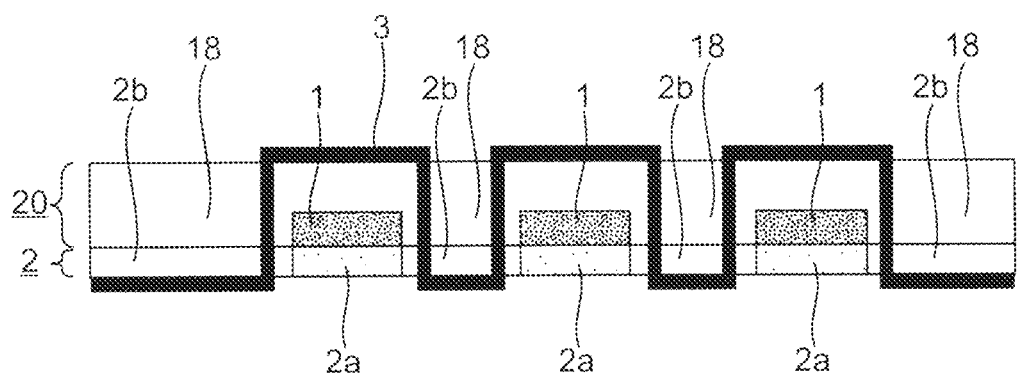
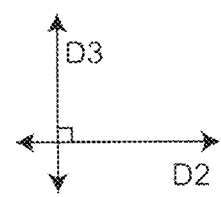

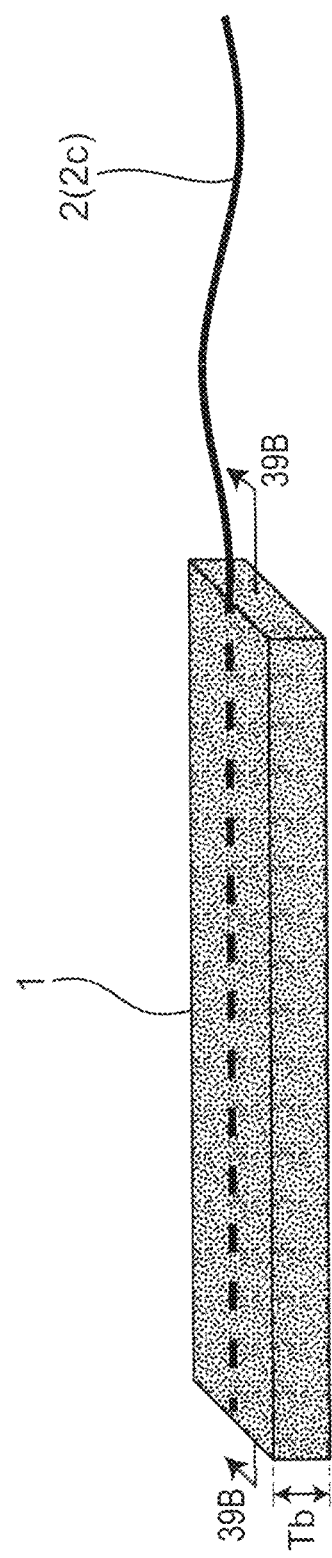

FIG.43A
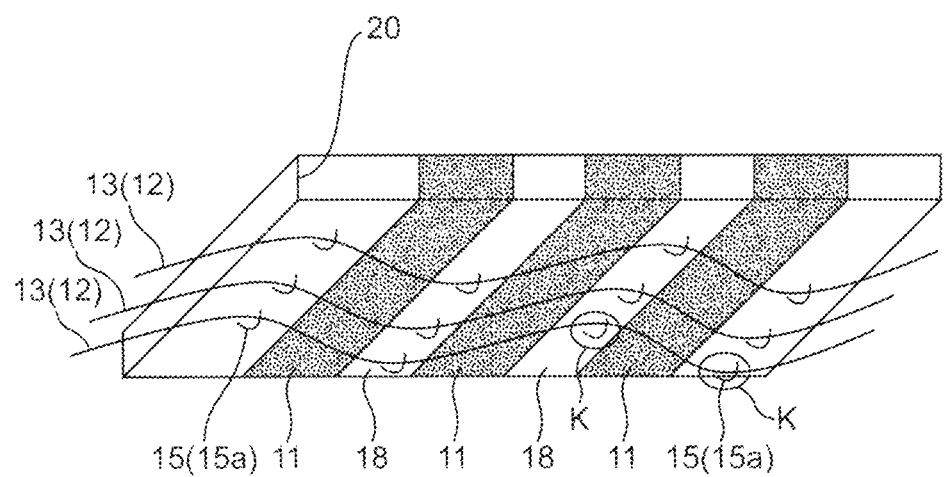
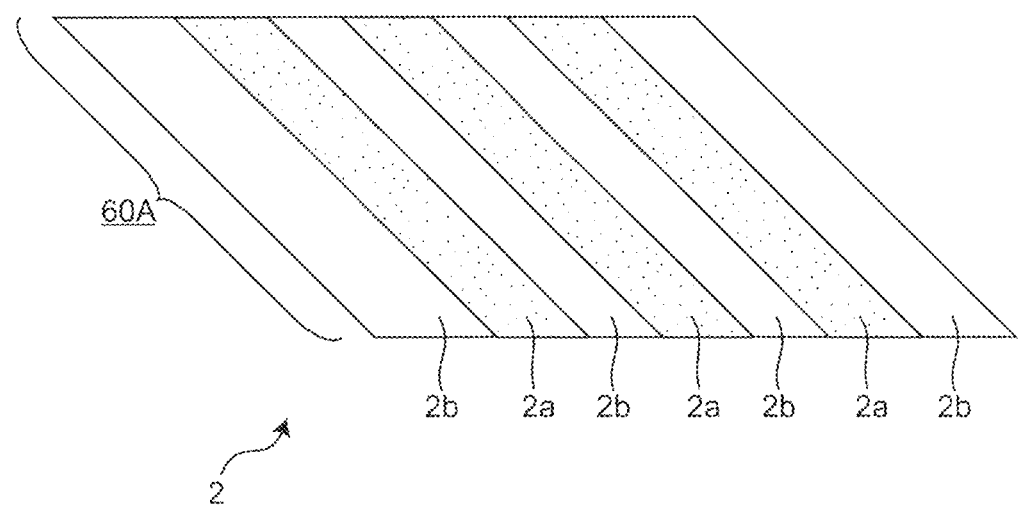

PRESSURE-SENSITIVE ELEMENT HAVING SUFFICIENT EXPANDABILITY, A WIDE MEASUREMENT RANGE OF PRESSURE FORCE, AND A SIMPLE STRUCTURE, AND AN ELECTRONIC DEVICE USING THE PRESSURE-SENSITIVE ELEMENT

BACKGROUND

1. Technical Field

The present disclosure relates to pressure-sensitive elements and electronic devices.

2. DESCRIPTION OF THE RELATED ART

Pressure-sensitive elements are widely used in fields such as industrial equipment, robots, and vehicles by being mounted on parts touched by humans as pressure-sensitive sensors for detecting pressure force (contact pressure). In recent years, along with the development of computer-based control technology and the improvement of design, the development of electronic devices using various free curved surfaces such as humanoid robots and interior parts of automobiles has been progressing. Along with the development, there has been a demand for high-performance pressure-sensitive elements to be mounted on free curved surfaces. For example, PTLs 1 to 3 disclose these related arts.

In an electronic device having a pressure-sensitive element, a technique of using a conductive elastic body having both conductivity and elasticity as an electrode is known. For example, a capacitive pressure-sensitive device has a first electrode including a conductive elastic body, a second electrode including a conductor wire, and a dielectric covering a surface of the second electrode. In such a pressure-sensitive device, when pressure force is applied between the first electrode and the second electrode, a contact area of the first electrode and the dielectric material is expanded based on the elasticity of the conductive elastic body as the first electrode. As a result, capacitance C [pF] between the first electrode and the second electrode changes, and the pressure force is measured based on this change.

In such an electronic device, electrical drawing has to be performed from the conductive elastic body. As a method of drawing out from the conductive elastic body, for example, as shown in FIG. 47, a method is known in which lead-out wire 510 including a flaky copper electrode is adhered to a surface of conductive elastic body 501 with conductive adhesive 520, and then an electric wire is connected to this copper electrode (for example, PTL 4).

CITATION LIST

Patent Literature

PTL 1: Japanese Patent No. 5668966
PTL 2: Japanese Patent No. 5519068
PTL 3: Unexamined Japanese Patent Publication No. 2014-190712
PTL 4: Japanese Patent No. 5278038

SUMMARY

After intensive studies, the inventors have found that the pressure-sensitive element used as a capacitive pressure-sensitive sensor needs improvement in expandability of the pressure-sensitive element itself, a measurement range (dynamic range) of the pressure force, and simplicity of a structure.

For example, a touch sensor disclosed in PTL 1 is configured by conductive cloths superimposed on top of each other, and thus the sensor as a whole fails to have sufficient expandability. Further, in the technique disclosed in PTL 1, the pressure force is detected by utilizing the change in capacitance based on a change in a distance between conductive threads, and this brings a problem that the measurement range of the pressure force is relatively narrow.

Further, for example, in a tactile sensor disclosed in PTL 2, detection elements are connected by a connection part having a crank-shaped bent structure, and thus the sensor as a whole fails to have sufficient expandability. Further, in the technique disclosed in PTL 2, it is necessary to connect the detection elements by the connection part having the crank-shaped bent structure, simplification of the structure of the pressure-sensitive element has been required.

Further, for example, in a sensor disclosed in PTL 3, a load sensor unit includes an elastomer base material and an elastomer front-side electrode and an elastomer reverse-side electrode disposed on a front side and a reverse side of the base material, respectively, and pressure force is detected based on a change in distance between the electrodes due to pressing. This brings a problem that the measurement range of the pressure force is relatively narrow.

Further, after intensive studies, the inventors have found that the conventional method of drawing out a wire needs improvement in stress concentration and contact resistance between conductive elastic body 501 and lead-out wire (that is, copper electrode) 510.

Specifically, for example, although electro elastic body 501 shown in FIG. 47 has elasticity, lead-out wire (that is, copper electrode) 510 and conductive adhesive 520 have neither elasticity nor flexibility. Thus, stress is concentrated at an interface between conductive adhesive 520 and conductive elastic body 501. Therefore, lead-out wire (that is, copper electrode) 510 and conductive adhesive 520 peel from conductive elastic body 501. Here, it is conceivable to use an elastic adhesive as the conductive adhesive, but such an elastic conductive adhesive is not commercially available and is difficult to obtain.

The contact resistance is electrical resistance generated between conductive elastic body 501 and lead-out wire (that is, copper electrode) 510, and indirect contact resistance between conductive elastic body 501 and lead-out wire (that is, copper electrode) 510 when conductive elastic body 501 is in indirect contact with lead-out wire (that is, copper electrode) 510 via conductive adhesive 520 (that is, copper electrode). Although conductive adhesive 520 is conductive, electrical resistance between conductive elastic body 501 and lead-out wire (that is, copper electrode) 510 is increased. This reduces measurement accuracy of the electronic device.

The present disclosure has been made in view of such circumstances. An object of the present disclosure is to provide a pressure-sensitive element having more sufficient expandability, a relatively wide measurement range of pressure force, and a relatively simple structure, and an electronic device using the pressure-sensitive element.

The pressure-sensitive element according to one aspect of the present disclosure includes a plurality of first electrodes, a plurality of second electrodes, and a dielectric. Each of the first electrodes includes a conductive elastic body and is elongated in a first direction. Each of the second electrodes includes a conductor wire and is elongated in a second direction. The dielectric covers a surface of each of the second electrodes and is brought into contact with each of the first electrodes in a predetermined contact region. The plurality of first electrodes is aligned in a first plane and in a direction perpendicular to the first direction. The plurality of second electrodes is aligned in a second plane facing the first plane and in a direction perpendicular to the second direction. The first direction and the second direction intersect when viewed from above the first plane. The first electrodes, the second electrodes, and the dielectric produce capacitance. An area of the contact region changes and the capacitance changes in accordance with the applied pressure force.

Further, the electronic device of the present disclosure includes the above pressure-sensitive element, a lead-out wire, and a connecting thread. The lead-out wire includes a conductive cloth led out from the pressure-sensitive element and having a conductive part. The connecting thread sews the conductive elastic body of the pressure-sensitive element and the conductive cloth together and electrically connects the conductive elastic body and the conductive part of the conductive cloth to each other.

The present disclosure makes it possible to obtain a pressure-sensitive element having more sufficient expandability, a relatively wide measurement range of pressure force, and a relatively simple structure, and an electronic device using the pressure-sensitive element.

BRIEF DESCRIPTION OF THE DRAWINGS

FIG. 9 is an enlarged cross-sectional view of the vicinity of the first electrode in another example of the pressure-sensitive element of the present disclosure, and is a schematic cross-sectional view perpendicular to the elongation direction of the first electrode (first direction);

FIG. 10 is an enlarged cross-sectional view of the vicinity of the first electrode in another example of the pressure-sensitive element of the present disclosure, and is a schematic cross-sectional view perpendicular to the elongation direction of the first electrode (first direction);

FIG. 25A is a schematic sketch of an example of a steering device (steering wheel) to which the pressure-sensitive element of the present disclosure is applied;

FIG. 25B is a schematic cross-sectional view and a partially enlarged view of an example of the steering device (steering wheel) to which the pressure-sensitive element of the present disclosure is applied;

FIG. 37A is a schematic exploded perspective view for explaining a method (particularly, a connector structure) of drawing out from two or more conductive elastic bodies by a conductive cloth in the first exemplary embodiment;

FIG. 37B is a schematic perspective view of an example of the basic structure (particularly, a connector structure) of the electronic device according to the first exemplary embodiment of the present disclosure obtained by the method of drawing out shown in FIG. 37A;

FIG. 37C is a schematic cross-sectional view of the electronic device of the present disclosure in FIG. 37B taken along line 37C-37C when viewed in a direction of an arrow;

FIG. 39A is a schematic perspective view of an example of the basic structure of the electronic device according to a second exemplary embodiment of the present disclosure;

FIG. 43A is a schematic exploded perspective view for explaining the method (particularly, the connector structure) of drawing out from two or more first electrodes (that is, conductive elastic bodies) by the conductive cloth in the pressure-sensitive device according to the third exemplary embodiment;

DETAILED DESCRIPTION

[Pressure-Sensitive Element of Present Disclosure]

Figure 1A:
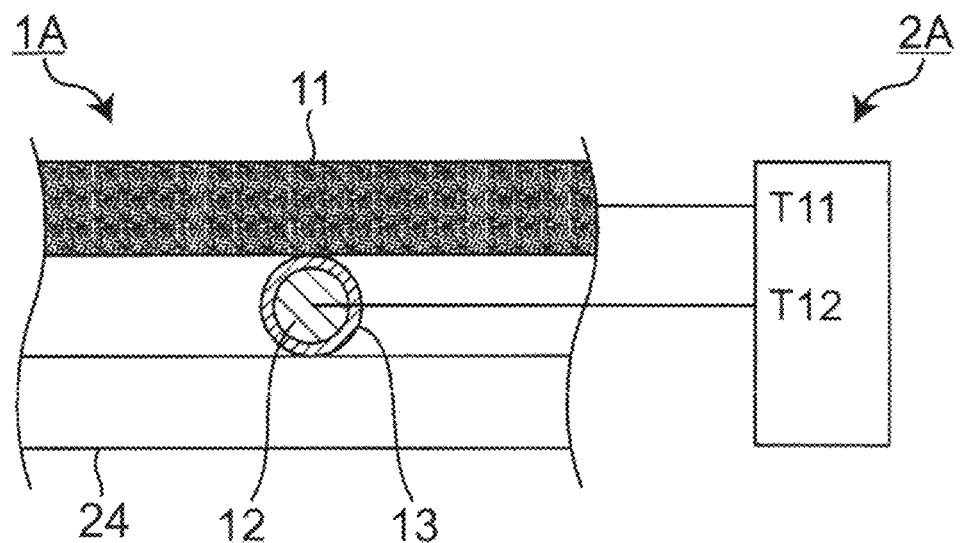
FIG. 1A is a schematic cross-sectional view of an example of a basic structure of a pressure-sensitive element for explaining a basic pressure measurement mechanism adopted by the pressure-sensitive element of the present disclosure.

A pressure-sensitive element of the present disclosure is an element having a capacitance and has a capacitor function. In such a pressure-sensitive element, the capacitance is changed by applying pressure force, and the pressure force is detected from the capacitance change. Thus, the pressure-sensitive element of the present disclosure is also referred to as a "capacitive pressure-sensitive sensor element", a "capacitive pressure detection sensor element", or a "pressure-sensitive switch element". The pressure-sensitive element of the present disclosure may be referred to as a "pressure-sensitive device".

A "plan view" as used herein refers to a state (top view or bottom view) when an object is viewed from above or below (particularly, above) along a thickness direction of the pressure-sensitive element. Further, a "cross-sectional view" referred to herein is a direction perpendicular to an elongation direction of the first electrode (that is, first direction D1) configuring the pressure-sensitive element, or a cross-sectional state (cross-sectional view) when viewed from a direction perpendicular to an elongation direction or a main direction of the second electrode (that is, second direction D2).

Hereinafter, the pressure-sensitive element of the present disclosure will be described with reference to the drawings. It should be noted that various elements shown in the drawings are only schematically shown for the present disclosure to be understood, and a dimensional ratio, appearance, or the like in the drawings may differ from actual ones. An "up-down direction", "left-right direction", and "front-rear direction" directly or indirectly used herein correspond to directions corresponding to an up-down direction, left-right direction, and front-rear direction in the drawings, respectively. The same reference signs or symbols indicate the same members or the same meanings unless otherwise specified. In one preferred aspect, it can be considered that a vertical downward direction (that is, a direction in which gravity acts) corresponds to a "downward direction" and a direction opposite to the vertical downward direction corresponds to an "upward direction". In the pressure-sensitive element of the present disclosure, pressing may be performed on either a first electrode side or a second electrode side in a relative relationship between the first electrode and the second electrode. In terms of further expanding the measurement range of the pressure force and further improving pressure sensitivity, the pressing is preferably performed on the first electrode side in the relative relationship between the first electrode and the second electrode. When the third electrode is used, the pressing may be performed on either the first electrode side or the third electrode side in a relative relationship between the first electrode, the second electrode, and the third electrode.

(Basic Measurement Mechanism (1))

As shown in FIG. 1A, the pressure-sensitive element of the present disclosure generally includes pressure-sensitive part 1A to which pressure force is applied and detector 2A that detects the pressure force, as a basic structure. FIG. 1A is a schematic cross-sectional view of an example of the basic structure of the pressure-sensitive element for explaining a basic pressure measurement mechanism adopted by the pressure-sensitive element of the present disclosure.

Pressure-sensitive part 1A has first electrode 11 including a conductive elastic body, second electrode 12 including a conductor wire, and dielectric 13 covering a surface of second electrode 12.

Figure 1B:
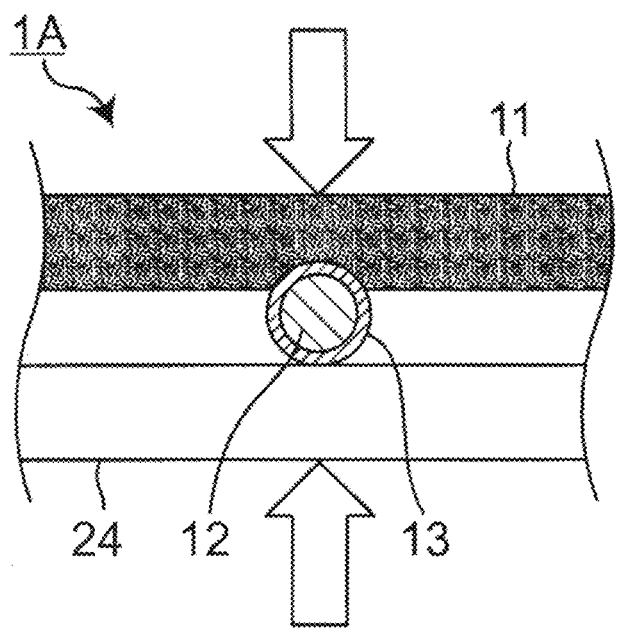
FIG. 1B is a schematic cross-sectional view of the basic structure of the pressure-sensitive element when pressure force is applied in FIG. 1A.

In the pressure-sensitive element of the present disclosure, as shown in FIG. 1B, when pressure force (arrow in FIG. 1B) is applied to pressure-sensitive part 1A, an area of a contact region between first electrode 11 and dielectric 13 (hereinafter simply referred to as "area of the contact region") expands based on elasticity of first electrode 11. As a result, capacitance C [pF] between first electrode 11 and second electrode 12 changes. Capacitance C [pF] and pressure force F [N] applied to the pressure-sensitive part are each represented by the following equations. The pressure force is thus detected by the detector. In the present disclosure, the pressure force is detected based on the change in the area of the contact region as described above, and the change in the area contributes more to the change in capacitance than, for example, a change in a distance between electrodes in a conventional pressure-sensitive element ($C \propto S$, $C \propto 1/d$). The measurement range of the pressure force is therefore relatively wide. In particular, when the pressure force is small, the change in capacitance based on the change in the distance between the electrodes is significantly small. FIG. 1B is a schematic cross-sectional view of the basic structure of the pressure-sensitive element when the pressure force is applied in FIG. 1A.

$$C = \frac{\varepsilon S}{d} \quad \text{[Equation 1]}$$

$$F = E \cdot eS \quad \text{[Equation 2]}$$

(In the equations, ε [pF/m] is a dielectric constant of the dielectric, S [m²] is a contact area between the first electrode and the dielectric, d [m] is a thickness of the dielectric, and E [Pa] is a Young's modulus of the first electrode, and e is a strain of the first electrode.)

The pressure force may be applied to pressure-sensitive part 1A in the pressure-sensitive element of the present disclosure from any of first electrode 11 or second electrode 12. FIG. 1B shows that the pressure force is applied from first electrode 11, and force is also applied from base material 24 described later by a reaction of the pressure force.

Detector 2A is a circuit that detects pressure force based on a change in capacitance between first electrode 11 and second electrode 12. Detector 2A is electrically connected to a wire drawn from first electrode 11 and a wire drawn from second electrode 12 via terminals T11 and T12, respectively. Detector 2A may be a control circuit, an integrated circuit, and the like. In terms of stabilizing detection of the pressure force by reducing an influence of noise, first electrode 11 is preferably connected to a ground of detector 2A. That is, terminal T11 of detector 2A to which the wire drawn from first electrode 11 is electrically connected is preferably further connected to the ground.

When a plurality of second electrodes 12 is used, detector 2A has a plurality of terminals for electrically connecting to the wires drawn from the plurality of second electrodes 12.

In the pressure-sensitive element of the present disclosure, the pressure force is measured by measuring the change in capacitance between terminal T11 and terminal T12 based on the change in the area of the contact region without deforming dielectric 13. The change in the area of the contact region is relatively larger than, for example, the change in the distance between the electrodes in the conventional pressure-sensitive element, and thus the pressure-sensitive element of the present disclosure has a relatively simple structure and a relatively wide range of pressure force can be measured.

(Basic Measurement Mechanism (2))

Figure 2:
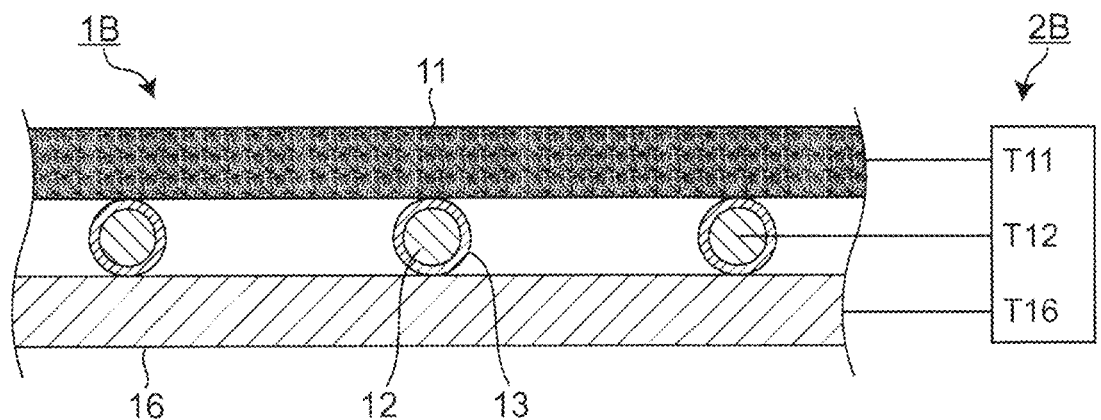
FIG. 2 is a schematic cross-sectional view of another example of the basic structure of the pressure-sensitive element for explaining the basic pressure measurement mechanism adopted by the pressure-sensitive element of the present disclosure.

A basic measurement mechanism (2) adopts the basic measurement mechanism (1). FIG. 2 is a schematic cross-sectional view of another example of the basic structure of the pressure-sensitive element for explaining the measurement mechanism (2). The basic structure of the pressure-sensitive element shown in FIG. 2 is similar to the basic structure shown in FIG. 1A, except that pressure-sensitive part 1B includes third electrode 16 including a conductive elastic body instead of base material 24, and that detector 2B further includes terminal T16 electrically connected to the wire drawn from third electrode 16. In terms of stabilizing detection of the pressure force by reducing an influence of noise, first electrode 11 and third electrode 16 are preferably connected to a ground of detector 2B.

In this measurement mechanism, the pressure force can be measured by measuring the change in capacitance between various combinations of terminals. For example, the pressure force can be measured by measuring at least one change selected from a group consisting of a change in capacitance between terminal T11 and terminal T16, a change in capacitance between terminal T11 and terminal T12, and a change in capacitance between terminal T12 and terminal T16. In terms of further improving pressure sensitivity, the pressure force is preferably measured by measuring two or more changes selected from the above group, preferably the change in capacitance between terminal T11 and terminal T12 and the change in capacitance between terminal T12 and terminal T16

In this measurement mechanism, the measurement range of the pressure force can be further widened by using first electrode 11 and third electrode 16 having different elastic moduli (Young's modulus). For example, when the elastic modulus of first electrode 11 is relatively low and the elastic modulus of third electrode 16 is relatively high, the measurement range of the pressure force is further widened because first electrode 11 is deformed and then third electrode 16 is deformed.

In this measurement mechanism as well, the pressure force is measured by measuring the change in capacitance between the terminals based on the change in the area of the contact region without deforming dielectric 13, and thus a relatively wide range of pressure force can be measured with a relatively simple structure.

In this measurement mechanism, first electrode 11, second electrode 12, and third electrode 16 are used. Thus, the influence of noise is small and the pressure force can be detected stably.

In this measurement mechanism, the pressure-sensitive element is further strengthened due to noise immunity by setting an electrode having a larger disturbance noise to 0 V potential. In general, the electrode having a larger disturbance noise is an electrode upstream in a pressurizing direction. In particular, when a conductor exists above the electrode upstream in the pressurizing direction, the electrode having a larger disturbance noise is an electrode downstream in the pressurizing direction. That is, examples of the electrode having a larger disturbance noise include the electrode upstream when a conductor does not exist above the electrode upstream in the pressurizing direction and the electrode downstream in the pressurizing direction when a conductor exists above the electrode upstream in the pressurizing direction. For example, when only the change in capacitance between terminal T11 and terminal T16 is measured, when only the change in capacitance between terminal T11 and terminal T12 is measured, and when only the change in capacitance between terminal T11 and terminal T12 is measured, when both the change in capacitance between terminal T11 and terminal T12 and the change in capacitance between terminal T12 and terminal T16 are measured, first electrode 11 is set to 0 V potential. Further, for example, when only the change in capacitance between terminal T12 and terminal T16 is measured, third electrode 16 is set to 0 V potential. This prevents noise when the pressure force is measured.

(Pressure-Sensitive Element)

Figure 3:
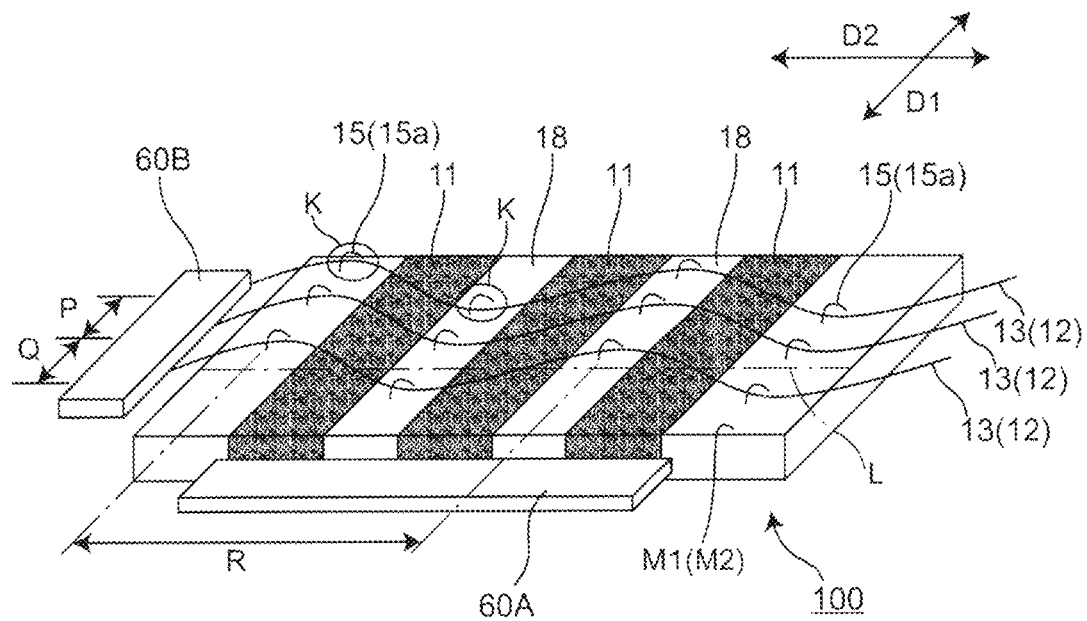
FIG. 3 is a schematic perspective view of a configuration of an example of the pressure-sensitive element of the present disclosure.

As shown in FIG. 3, for example, pressure-sensitive element 100 of the present disclosure includes a plurality of first electrodes 11, a plurality of second electrodes 12, and a plurality of dielectrics 13. Second electrodes 12 are covered with dielectrics 13. Pressure-sensitive element 100 of the present disclosure can also be referred to as a matrix sensor because the plurality of first electrodes 11 and the plurality of second electrodes 12 are elongated in first direction D1 and second direction D2, respectively, and first direction D1 and second direction D2 are directions intersecting each other in the same plane. In pressure-sensitive element 100 of the present disclosure, as is clear from the above description of the measurement mechanism, the capacitance at intersections (that is, parts or cross points) of first electrodes 11 and second electrodes 12 changes in accordance with the pressure force applied between first electrodes 11 and second electrodes 12. Therefore, the pressure force and the change in pressure force can be measured and detected based on the capacitance and the change in capacitance. For example, when the pressure force is applied, the area of the contact region between first electrodes 11 and dielectrics 13 at the intersections of first electrodes 11 and second electrodes 12 increases based on elasticity of first electrodes 11 and the capacitance changes. FIG. 3 is a schematic perspective view of a configuration of an example of the pressure-sensitive element of the present disclosure.

Figure 4:
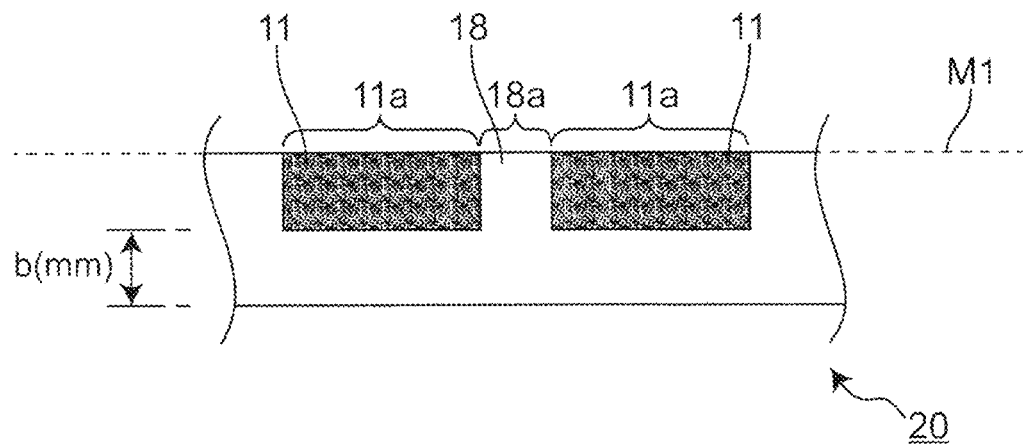
FIG. 4 is an enlarged cross-sectional view of a vicinity of a first electrode in the pressure-sensitive element of the present disclosure shown in FIG. 3, and is a schematic cross-sectional view perpendicular to an elongation direction of the first electrode (first direction)
Figure 5:
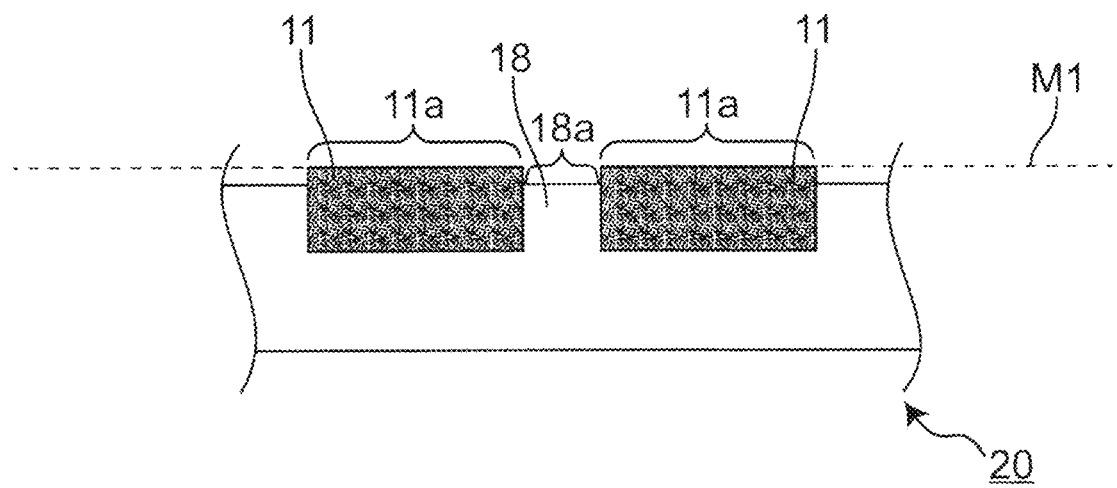
FIG. 5 is an enlarged cross-sectional view of the vicinity of the first electrode in another example of the pressure-sensitive element of the present disclosure, and is a schematic cross-sectional view perpendicular to the elongation direction of the first electrode (first direction)
Figure 6:
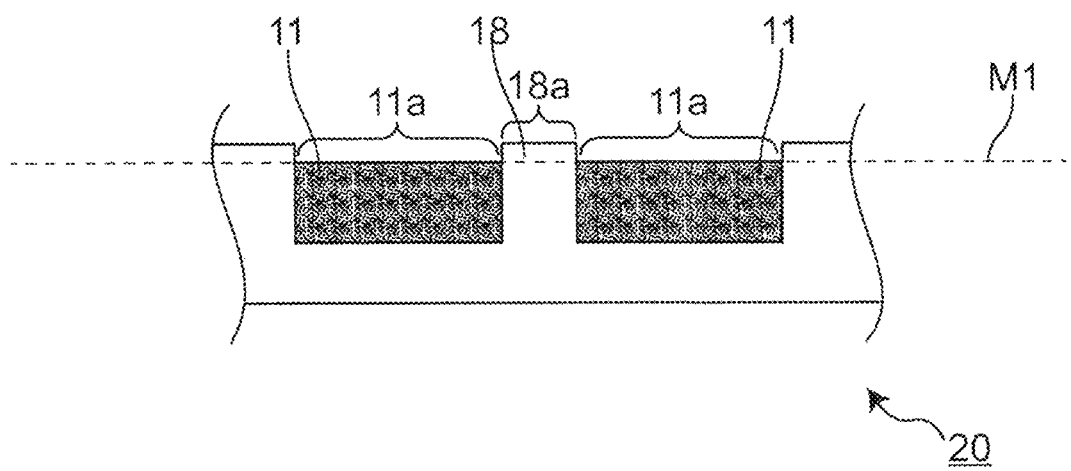
FIG. 6 is an enlarged cross-sectional view of the vicinity of the first electrode in still another example of the pressure-sensitive element of the present disclosure, and is a schematic cross-sectional view perpendicular to the elongation direction of the first electrode (first direction)

The plurality of first electrodes 11 is elongated in first direction D1 and is arranged in a first plane. Furthermore, the plurality of first electrodes 11 includes a conductive elastic body. "The plurality of first electrodes 11 is elongated in first direction D1" means that the elongation direction of first electrodes 11 is substantially parallel to first direction D1. "The plurality of first electrodes 11 is arranged in the first plane" means that the plurality of first electrodes 11 is arranged such that surfaces 11a of the plurality of first electrodes 11 on a side of second electrode 12 are all in substantially the same plane (first plane) M1 as shown in FIGS. 4 to 6. First plane M1 may be a flat plane as shown in FIGS. 4 to 6, or a curved plane. FIG. 4 is an enlarged cross-sectional view of a vicinity of the first electrode in the pressure-sensitive element of the present disclosure shown in FIG. 3, and is a schematic cross-sectional view perpendicular to the elongation direction of the first electrode (first direction). FIG. 5 is an enlarged cross-sectional view of the vicinity of the first electrode in another example of the pressure-sensitive element of the present disclosure, and is a schematic cross-sectional view perpendicular to the elongation direction of the first electrode (first direction). FIG. 6 is an enlarged cross-sectional view of the vicinity of the first electrode in still another example of the pressure-sensitive element of the present disclosure, and is a schematic cross-sectional view perpendicular to the elongation direction of the first electrode (first direction).

In general, a plurality of first insulating parts 18 including an insulating elastic body is arranged between the plurality of first electrodes 11 as shown in FIGS. 3 to 6. Thus, even if a wiring density of first electrode 11 is high, adjacent first electrodes can be prevented from being deformed and short-circuited when the pressure force is applied. It is therefore possible to provide a pressure-sensitive element capable of measuring a high-density pressing surface distribution.

When the plurality of first insulating parts 18 is arranged between the plurality of first electrodes 11, surfaces 11a of the plurality of first electrodes 11 on the second electrode side may be arranged as in any of the following aspects.

(Aspect 1) Surfaces 11a of the plurality of first electrodes 11 on the second electrode side are flush with surfaces 18a of the plurality of first insulating parts 18 on the second electrode side as shown in FIG. 4; "flush" means that there is no step.

(Aspect 2) Surfaces 11a of the plurality of first electrodes 11 on the second electrode side protrude from (that is, become higher than) surface 18a of the plurality of first insulating parts 18 on the second electrode side as shown in FIG. 5.

(Aspect 3) Surfaces 11a of the plurality of first electrodes 11 on the second electrode side are recessed from (that is, become lower than) surface 18a of the plurality of first insulating parts 18 on the second electrode side as shown in FIG. 6.

Figure 7:
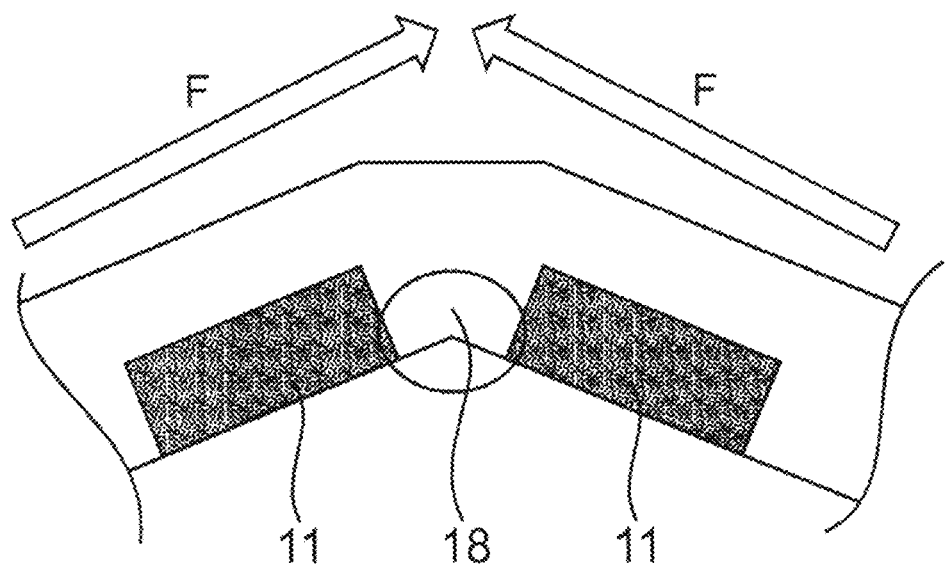
FIG. 7 is an enlarged cross-sectional view of the vicinity of the first electrode for explaining an example of effects when a surface of the first electrode on a second electrode side is flush with a surface of a first insulating part on a second electrode side.
Figure 8:
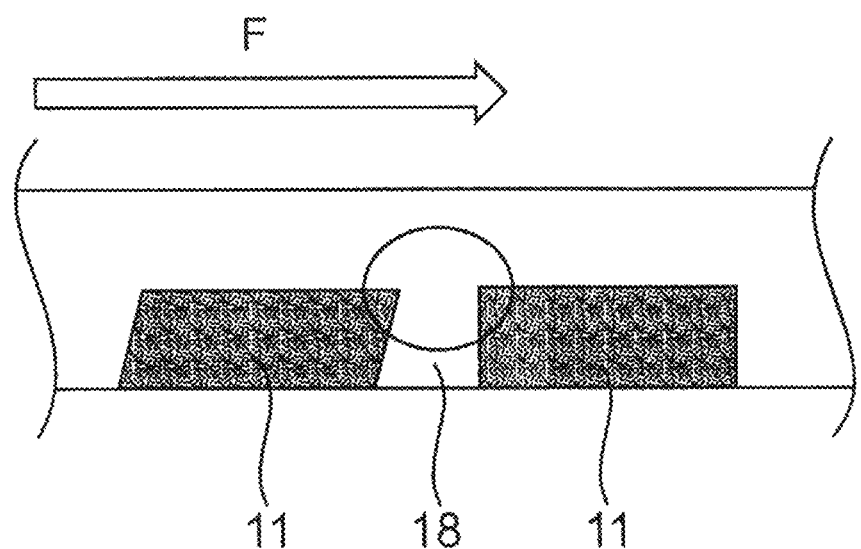
FIG. 8 is an enlarged cross-sectional view of the vicinity of the first electrode for explaining an example of effects when a surface of the first electrode on a second electrode side is flush with a surface of a first insulating part on a second electrode side.

The plurality of first electrodes 11 is preferably disposed such that surfaces 11a of the plurality of first electrodes 11 on the second electrode side are in a state of Aspect 1 in terms of further improving expandability of second electrodes 12 in second direction D2, further preventing a short circuit between adjacent first electrodes 11, further expanding the measurement range of pressure force, and further improving the pressure sensitivity. Specifically, in Aspect 1, second electrodes 12 (and dielectrics 13 on the surfaces of second electrodes 12) can receive pressure relatively uniformly between first electrodes 11 and first insulating parts 18 (a first elastic sheet described later) and a base material or a second elastic sheet described later. Thus, expansion and contraction of second electrode 12 in second direction D2 is not easily inhibited by a local high voltage. Furthermore, in Aspect 1, a short circuit between adjacent first electrodes 11 is further prevented, and the pressure-sensitive measurement with higher sensitivity is possible. Specifically, in this flush structure of first electrodes 11 and first insulating parts 18, a short circuit is less likely to occur between adjacent first electrodes 11 even if the pressure-sensitive element bends as shown in FIG. 7 while good pressure sensitivity is ensured. Further, as shown in FIG. 8, a short circuit is less likely to occur between adjacent first electrodes 11 due to critical compression while good pressure sensitivity is ensured. FIGS. 7 and 8 are enlarged cross-sectional views for explaining an example of effects when surfaces 11a of the plurality of first electrodes 11 on the second electrode side are flush with surfaces 18a of the plurality of first insulating parts 18 on the second electrode side. In FIGS. 7 and 8, F indicates force.

First electrodes 11 each have a rectangular shape as a cross-sectional shape in FIGS. 3 to 6, but are not limited to this shape as long as the capacitance between the electrodes can be measured. First electrodes 11 may have, for example, a trapezoidal shape as shown in FIGS. 9 and 10. Specifically, the cross-sectional shape of first electrode 11 may be a trapezoidal shape in which a side on the second electrode side (surface 11a) is longer than a side facing the side (hereinafter referred to as "trapezoidal shape A") as shown in FIG. 9 or, a trapezoidal shape in which the side on the second electrode side (surface 11a) is shorter than the side facing the side (hereinafter referred to as "trapezoid shape B") as shown in FIG. 10. Trapezoidal shapes A and B are more preferable than a rectangular shape in terms of further preventing a short circuit between first electrodes 11 and improving simplicity of manufacturing when a shearing direction is deviated. Trapezoidal shape A is more preferable than trapezoidal shape B in terms of further preventing a short circuit between first electrodes 11 and further improving the pressure sensitivity due to an increase in the contact area between first electrodes 11 and dielectrics 13. Note that as shown in FIG. 10, when first electrodes 11 have trapezoidal shape B as the cross-sectional shape and the pressing is performed on the first electrode side in the relative relationship between the first electrodes and the second electrodes, elastic base material 19 having an elastic modulus (or hardness) higher than that of first electrodes 11 and first insulating parts 18 is preferably disposed upstream in the pressing direction of first electrode 11 as described above in terms of further improving the pressure sensitivity. This is because elastic base material 19 makes it easier for the pressure force (load) to be transmitted to the contact surface between first electrode 11 and dielectric 13. FIGS. 9 and 10 are enlarged cross-sectional views of the vicinity of the first electrode in still another example of the pressure-sensitive element of the present disclosure, and are schematic cross-sectional views perpendicular to the elongation direction of the first electrode (first direction).

The plurality of first electrodes 11 and the plurality of first insulating parts 18 are preferably integrated to configure first elastic sheet 20. "The plurality of first electrodes 11 and the plurality of first insulating parts 18 are integrated" means that the plurality of first electrodes 11 and the plurality of first insulating parts 18 are integrally configured so as to be inseparable. As a result, a positional relationship between first electrodes 11 can be easily maintained, and a high-density pressure-sensitive element can be provided. Further, it is easy to handle and manufacture the plurality of first electrodes in manufacturing. Furthermore, durability related to the expandability of the pressure-sensitive element is improved.

In first elastic sheet 20, first electrodes 11 are preferably embedded in first insulating parts 18. Here, "embedded" refers to "embedded" in a state where surfaces 11a of first electrodes 11 on the second electrode side are exposed. Specifically, in terms of further expanding the measurement range of the pressure force and further improving the pressure sensitivity, first electrodes 11 may be embedded in first insulating parts 18 such that only surfaces 11a on the second electrode side are exposed as shown in FIGS. 4 and 6, or first electrodes 11 may be embedded in first insulating parts 18 such that surfaces 11*a* on the second electrode side and the vicinity of surfaces 11*a* are exposed as shown in FIG. 5.

First electrodes 11 have elastic properties and conductive properties. The elastic properties are properties of being locally deformed by external force (for example, normal pressure force applied to a pressure-sensitive element in interpersonal pressure-sensitive use: for example, pressure force of about 0.1 N/cm$^2$ to 100 N/cm$^2$ inclusive) and returning to an original shape when being released from the external force. Specifically, first electrodes 11 may have elastic properties such that the area of the contact region between first electrodes 11 and dielectrics 13 is expanded by the pressure force on the pressure-sensitive part. More specifically, first electrodes 11 may have a lower elastic modulus than dielectrics 13 so as to be deformed more than dielectric 13 when pressed. In terms of further improving the expandability, further expanding the measurement range of the pressure force, and further improving the pressure sensitivity, the elastic modulus of first electrodes 11 is preferably, for example, about $10^4$ Pa to $10^8$ Pa inclusive, for example, about $1.5 \times 10^6$ Pa. The larger the elastic modulus of first electrode 11 within the above range, the wider the measurement range of the pressure force. The smaller the elastic modulus of first electrode 11 within the above range, the higher the pressure sensitivity. With a higher pressure sensitivity, for example, even minute pressure force that has been difficult to detect in the known art can be detected. This allows a start of application of the pressure force to be accurately detected. The elastic modulus can be adjusted, for example, by changing a cross-linking density. The cross-linking density can be adjusted by an amount of cross-linking material added. In relation to the conductive properties, a conductivity of first electrode 11 may be sufficiently smaller than impedance of capacitance in a desired frequency band. The conductivity of first electrode 11 is generally less than or equal to 200 Ω·cm, particularly from 0.01 Ω·cm to 200 Ω·cm inclusive, and more preferably, for example, 25 Ω·cm. This conductivity can be adjusted by changing a relative ratio of a conductive filler and a resin material (rubber material) described later. The interpersonal pressure-sensitive use refers to use for monitoring pressure caused by a human body, as will be described later. Note that "to" refers to "more than or equal to and less than or equal to." For example, "0.01 Ω·cm to 200 Ω·cm" described above means more than equal to 0.1 Ω·cm and less than or equal to 200 Ω·cm.

First electrode 11 corresponds to an elastic electrode member and can also be referred to as an expandable member. First electrode 11 may include any material as long as first electrode 11 has both the elastic properties and the conductive properties as described above. For example, first electrode 11 may include a conductive resin including a resin material (particularly a rubber material) and a conductive filler dispersed in the resin material. In terms of further improving the expandability of first electrode 11 in first direction D1 and second direction D2, further expanding the measurement range of the pressure force, and further improving the pressure sensitivity, first electrode 11 preferably includes conductive rubber including a rubber material and conductive filler dispersed in the rubber material. First electrode 11, including conductive rubber, can more effectively expand and contract in first direction D1 and second direction D2, allows the pressure force to be more effectively detected, and produces a sense of pressure during pressing. The resin material may be at least one resin material selected from the group consisting of, for example, styrene-based resin, silicone-based resin (for example, polydimethylpolysiloxane (PDMS)), acrylic-based resin, rotaxane-based resin, urethane-based resin, and the like. The rubber material may be at least one rubber material selected from the group consisting of, for example, silicone rubber, isoprene rubber, butadiene rubber, styrene-butadiene rubber, chloroprene rubber, nitrile rubber, polyisobutylene, ethylene propylene rubber, chlorosulfonated polyethylene, acrylic rubber, fluororubber, epichlorohydrin rubber, urethane rubber, natural rubber, and the like. The rubber material may include a cross-linking material and a filler for holding the elastic body and reinforcing tear strength and tensile strength, depending on a type of rubber. The conductive filler may include at least one material selected from the group consisting of carbon materials such as carbon nanotubes, carbon black, and graphite; metal materials such as gold (Au), silver (Ag), copper (Cu), carbon (C), zinc oxide (ZnO), indium (III) oxide ($In_2O_3$), and tin (IV) oxide ($SnO_2$); conductive polymer materials such as PEDOT:PSS (that is, composite including poly (3,4-ethylenedioxythiophene) (PEDOT) and polystyrene sulfonic acid (PSS)); and conductive fibers such as metal coated organic fibers and metal wires (fiber state). A shape of the conductive filler is preferably a shape in which conductive fillers easily come into contact with each other, and may be spherical, elliptical (cross-sectional shape), carbon nanotube shape, graphene shape, tetrapod shape, or nanorod shape. The conductive filler may have an additive for improving dispersibility, such as a dispersant, attached to a surface (surface layer). As the conductive filler, two or more kinds of conductive fillers having different dimensions, shapes, and types may be used. Further, a conductive layer may be used instead of or in addition to the conductive filler. Specifically, the first electrode may be configured by a conductive layer provided on a surface of a resin structure (particularly, a rubber structural material) including the above resin material (particularly, a rubber material), the conductive layer having a conductive ink or the like applied to the surface.

A thickness of each first electrode 11 is not limited as long as the capacitance between the electrodes changes due to the pressure force from outside and first electrode 11 can withstand the expansion and contraction. The thickness of each first electrode 11 is generally from 0.01 mm to 20 mm inclusive, preferably from 0.2 mm to 2 mm inclusive in the interpersonal pressure-sensitive use, and more preferably, for example, 0.5 mm.

A width of each first electrode 11 (dimension in second direction D2) is not limited as long as the capacitance between the electrodes changes due to an external pressure force and first electrodes 11 can withstand the expansion and contraction. The width of each first electrode 11 is generally from 0.01 mm to 1,000 mm inclusive, preferably from 1 mm to 50 mm inclusive in the interpersonal pressure-sensitive use, and more preferably, for example, 10 mm.

First electrode 11 generally has an elongated shape (for example, a linear shape). A longitudinal dimension of first electrode 11 (dimension in first direction D1) is not limited and may be appropriately set in accordance with intended use. The longitudinal dimension of first electrode 11 is generally from 10 mm to 1000 mm inclusive, preferably from 100 mm to 500 mm inclusive, and more preferably, for example, 300 mm in the interpersonal pressure-sensitive use.

First electrode 11 is preferably connected to the ground (0V) of the detector in terms of preventing noise when the pressure force is measured.

First insulating parts 18 have elastic properties and non-conductive properties. The elastic properties are similar to the elastic properties of first electrode 11. Specifically, it is sufficient that first insulating parts 18 have elastic properties such that expansion and contraction of the pressure-sensitive element in first direction D1 and second direction D2 are achieved. First insulating parts 18 preferably have an elastic modulus equal to or less than the elastic modulus of first electrodes 11 so as to be deformed to the same extent as first electrodes 11 or to be deformed more than first electrodes 11 when expanded or contracted. In terms of further improving the expandability, further expanding the measurement range of the pressure force, and further improving the pressure sensitivity, the elastic modulus of first insulating parts 18 is preferably, for example, about $10^3$ Pa to $10^8$ Pa inclusive, for example, about $10^6$ Pa. The larger the elastic modulus of first insulating parts 18 within the above range, the wider the measurement range of the pressure force. The smaller the elastic modulus of first insulating parts 18 within the above range, the higher the pressure sensitivity. With a higher pressure sensitivity, for example, even minute pressure force that has been difficult to detect in the known art can be detected. This allows a start of application of the pressure force to be accurately detected. The elastic modulus can be adjusted, for example, by changing a cross-linking density. The cross-linking density can be adjusted by an amount of cross-linking material added. In relation to the non-conductive properties, a conductivity of first insulating parts 18 may be sufficiently larger than impedance of capacitance in a desired frequency band. The conductivity of first insulating parts 18 is generally more than or equal to $10^3$ Ω·cm, particularly from $10^4$ Ω·cm to $10^{10}$ Ω·cm inclusive, and more preferably, for example, $10^7$ Ω·cm. This conductivity can be achieved by using a resin material (rubber material).

First insulating parts 18 correspond to elastic insulating members and can also be referred to as expandable members. First insulating parts 18 may include any material as long as first insulating parts 18 have both the elastic properties and the non-conductive properties as described above. For example, first insulating parts 18 may include a non-conductive resin including a resin material (particularly, a rubber material). In terms of further improving the expandability of first insulating parts 18 in first direction D1 and second direction D2, further expanding the measurement range of the pressure force, and further improving the pressure sensitivity, first insulating parts 18 preferably include non-conductive rubber including a rubber material. First insulating parts 18, including non-conductive rubber, can more effectively expand and contract in first direction D1 and second direction D2, allow the pressure force to be more effectively detected, and produce a sense of pressure during pressing. The resin material may be at least one resin material selected from the group consisting of, for example, styrene-based resin, silicone-based resin (for example, polydimethylpolysiloxane (PDMS)), acrylic-based resin, rotaxane-based resin, urethane-based resin, and the like. The rubber material may be at least one rubber material selected from the group consisting of, for example, silicone rubber, isoprene rubber, butadiene rubber, styrene-butadiene rubber, chloroprene rubber, nitrile rubber, polyisobutylene, ethylene propylene rubber, chlorosulfonated polyethylene, acrylic rubber, fluororubber, epichlorohydrin rubber, urethane rubber, natural rubber, and the like. The rubber material may include a cross-linking material and a filler for holding the elastic body and reinforcing tear strength and tensile strength, depending on a type of rubber.

A thickness of each first insulating part 18 is not limited as long as the capacitance between the electrodes changes due to the pressure force from outside and first insulating parts 18 can withstand the expansion and contraction. The thickness of each first insulating part 18 is generally such a thickness that surface 18a of each first insulating part 18 on the second electrode side is near surface 11a of each first electrode 11 on the second electrode side (preferably flush with surface 11a). In particular, thickness b (see FIG. 4) of each first insulating part 18 on a side of first electrode 11 opposite to surface 11a on the second electrode side is generally from 0.01 mm to 10 mm inclusive, preferably from 0.01 mm to 2 mm inclusive, more preferably from 0.1 mm to 2 mm inclusive, even more preferably from 0.2 mm to 1 mm inclusive, and most preferably, for example, 0.5 mm in terms of further improving the expandability of first insulating parts 18 in first direction D1 and second direction D2, further expanding the measurement range of the pressure force, and further improving the pressure sensitivity in the interpersonal pressure-sensitive use.

A width (dimension in second direction D2) of each first insulating part 18 between adjacent first electrodes 11 is not limited as long as the capacitance between the electrodes changes due to the pressure force from outside and first insulating parts 18 can withstand the expansion and contraction. The width of each first insulating part 18 is generally from 0.01 mm to 50 mm inclusive, preferably from 0.5 mm to 10 mm inclusive in the interpersonal pressure-sensitive use, and more preferably, for example, 2 mm.

A dimension of each first insulating part 18 in first direction D1 is not limited, and is generally equal to or longer than the longitudinal dimension of first electrode 11 (dimension in first direction D1) in terms of preventing a short circuit between first electrodes 11.

Elastic base material 19 has elastic properties and non-conductive properties. The elastic properties are similar to the elastic properties of first electrode 11. Specifically, it is sufficient that elastic base material 19 has elastic properties such that expansion and contraction of the pressure-sensitive element in first direction D1 and second direction D2 are achieved. Elastic base material 19 preferably has a higher elastic modulus than first insulating parts 18 so as not to be deformed more than first insulating parts 18 when pressed in terms of further improving the pressure sensitivity with good transmission of the pressure force. In terms of further improving the expandability, further expanding the measurement range of the pressure force, and further improving the pressure sensitivity, the elastic modulus of elastic base material 19 is preferably, for example, from about $10^5$ Pa to $10^8$ Pa inclusive, for example, about $10^6$ Pa. The larger the elastic modulus of elastic base material 19 within the above range, the wider the measurement range of the pressure force. The smaller the elastic modulus of elastic base material 19 within the above range, the higher the pressure sensitivity. With a higher pressure sensitivity, for example, even minute pressure force that has been difficult to detect in the known art can be detected. This allows a start of application of the pressure force to be accurately detected. The elastic modulus can be adjusted, for example, by changing a cross-linking density. The cross-linking density can be adjusted by an amount of cross-linking material added. In relation to the non-conductive properties, a conductivity of elastic base material 19 may be sufficiently larger than impedance of capacitance in a desired frequency band. The conductivity of elastic base material 19 is generally more than or equal to $10^3$ Ω·cm, particularly from $10^4$ Ω·cm to $10^{10}$ Ω·cm inclusive, and more preferably, for example, $10^7$ Ω·cm. This conductivity can be achieved by using a resin material (rubber material).

Elastic base material 19 corresponds to an elastic electrode member and can also be referred to as an expandable member. Elastic base material 19 may include any material as long as elastic base material 19 has both the elastic properties and the non-conductive properties as described above. For example, elastic base material 19 may include a non-conductive resin including a resin material (particularly, a rubber material) similarly to first insulating parts 18. In terms of further improving the expandability of elastic base material 19 in first direction D1 and second direction D2, further expanding the measurement range of the pressure force, and further improving the pressure sensitivity, elastic base material 19 preferably includes non-conductive rubber including a rubber material. Elastic base material 19, including non-conductive rubber, can more effectively expand and contract in first direction D1 and second direction D2, allows the pressure force to be more effectively detected, and produces a sense of pressure during pressing. The resin material may be at least one resin material selected from the group consisting of resin materials similar to first insulating part 18. The rubber material may be at least one rubber material selected from the group consisting of rubber materials similar to first insulating parts 18. The rubber material may include a cross-linking material and a filler for holding the elastic body and reinforcing tear strength and tensile strength, depending on a type of rubber.

A thickness of each elastic base material 19 is not limited as long as the capacitance between the electrodes changes due to the pressure force from outside and elastic base material 19 can withstand the expansion and contraction. The thickness of elastic base material 19 is generally from 0.01 mm to 1000 mm inclusive, preferably from 0.05 mm to 1 mm inclusive, and more preferably, for example, 0.2 mm in the interpersonal pressure-sensitive use.

First electrodes 11 and first insulating parts 18 (particularly, first elastic sheet 20 including first electrodes 11 and first insulating parts 18) can be manufactured by a known method of molding with a mold.

Figure 11A:
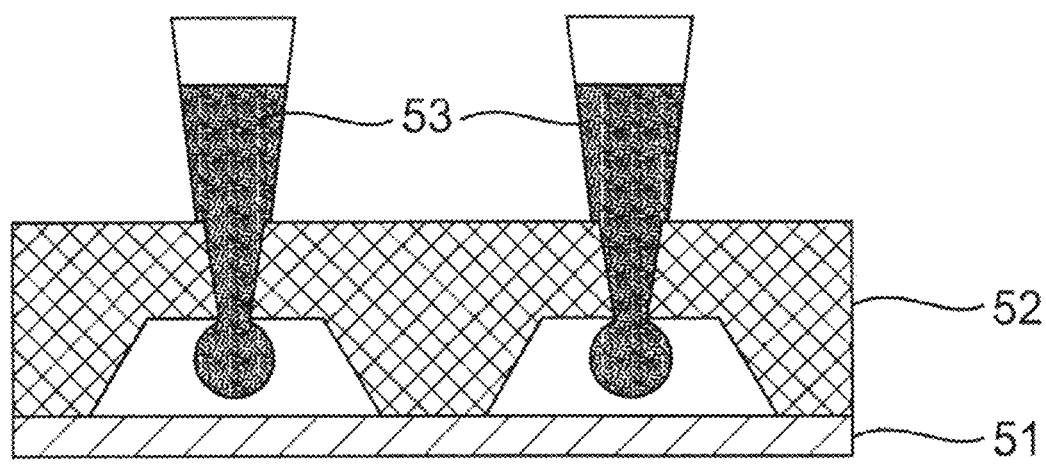
FIG. 11A is a schematic cross-sectional view of one step of a method of manufacturing the first electrode and the first insulating part (first elastic sheet shown in FIG. 9) in the pressure-sensitive element of the present disclosure.
Figure 11B:
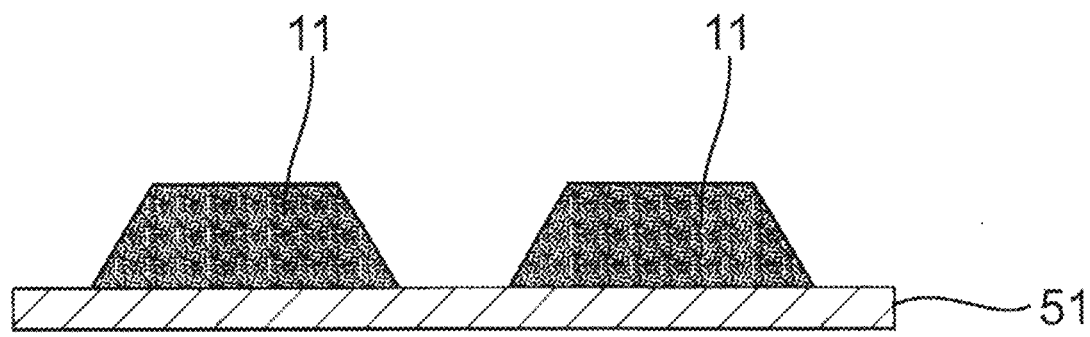
FIG. 11B is a schematic cross-sectional view of one step of the method of manufacturing the first electrode and the first insulating part (first elastic sheet shown in FIG. 9) in the pressure-sensitive element of the present disclosure.
Figure 11C:
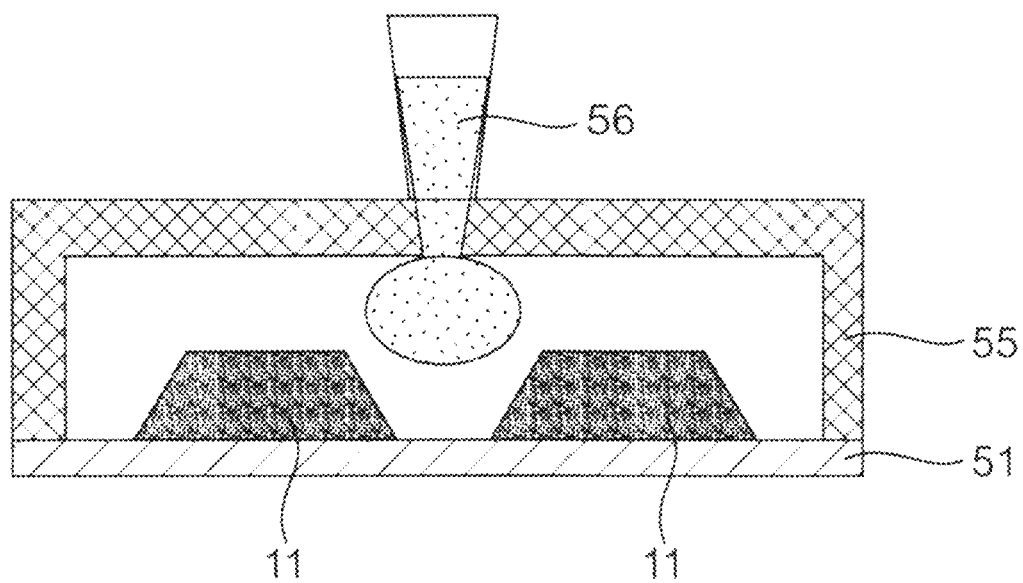
FIG. 11C is a schematic cross-sectional view of one step of the method of manufacturing the first electrode and the first insulating part (first elastic sheet shown in FIG. 9) in the pressure-sensitive element of the present disclosure.
Figure 11D:
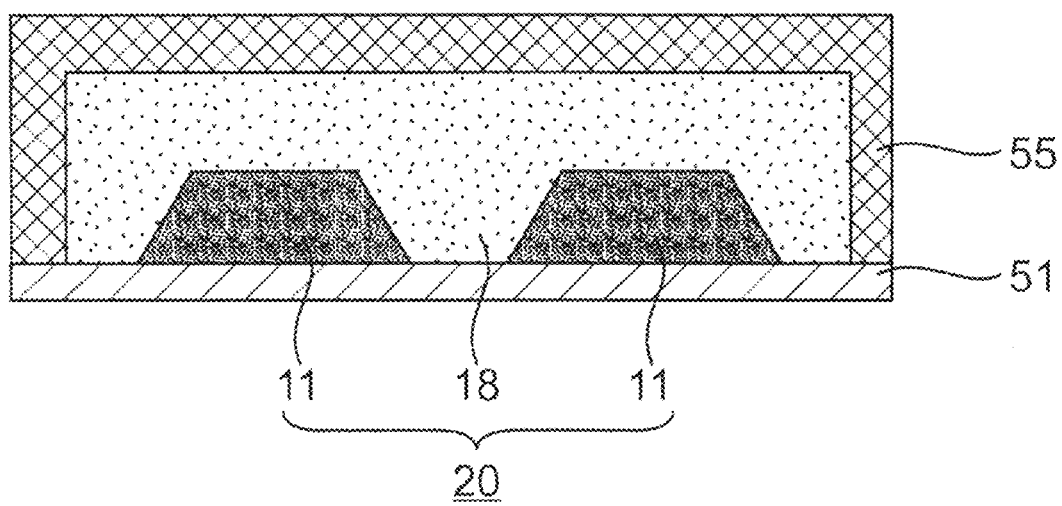
FIG. 11D is a schematic cross-sectional view of one step of the method of manufacturing the first electrode and the first insulating part (first elastic sheet shown in FIG. 9) in the pressure-sensitive element of the present disclosure.

For example, when first electrodes 11 and first insulating part 18 shown in FIG. 9 are manufactured, first, a conductive filler and, if desired, a cross-linking material are applied to a solution of a desired resin material (rubber material) or raw material solution to obtain a composite material for the first electrode and a composite material for the first insulating part. Next, as shown in FIG. 11A, composite material 53 for the first electrode is filled and cross-linked between molds 51 and 52 having a molding surface corresponding to a desired shape of the first electrode to obtain first electrode 11 on mold 51 as shown in FIG. 11B. Then, as shown in FIG. 11C, composite material 56 for the first insulating part is filled and cross-linked between molds 51 and 55 having a molding surface corresponding to a desired shape of the first insulating part (particularly, first elastic sheet 20) to obtain first electrode 11 and first insulating part 18 (particularly, first elastic sheet 20) in molds 51 and 55 as shown in FIG. 11D. FIGS. 11A to 11D are schematic cross-sectional views of one step of the method of manufacturing the first electrode and the first insulating part (first elastic sheet shown in FIG. 9) in the pressure-sensitive element of the present disclosure.

Figure 12A:
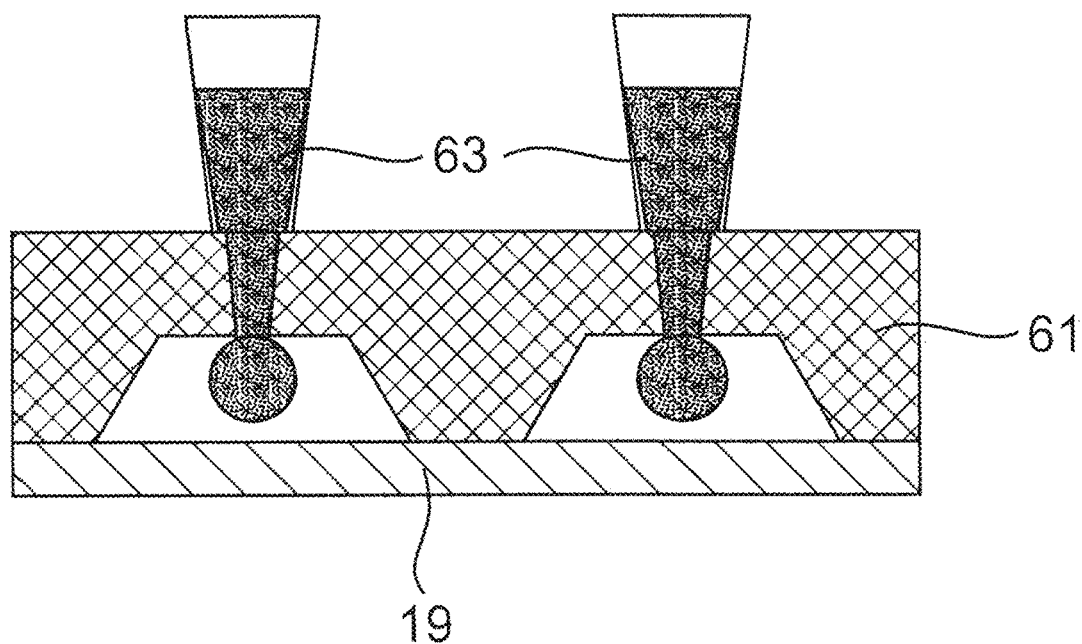
FIG. 12A is a schematic cross-sectional view of one step of the method of manufacturing the first electrode and the first insulating part (first elastic sheet shown in FIG. 10) in the pressure-sensitive element of the present disclosure.
Figure 12B:
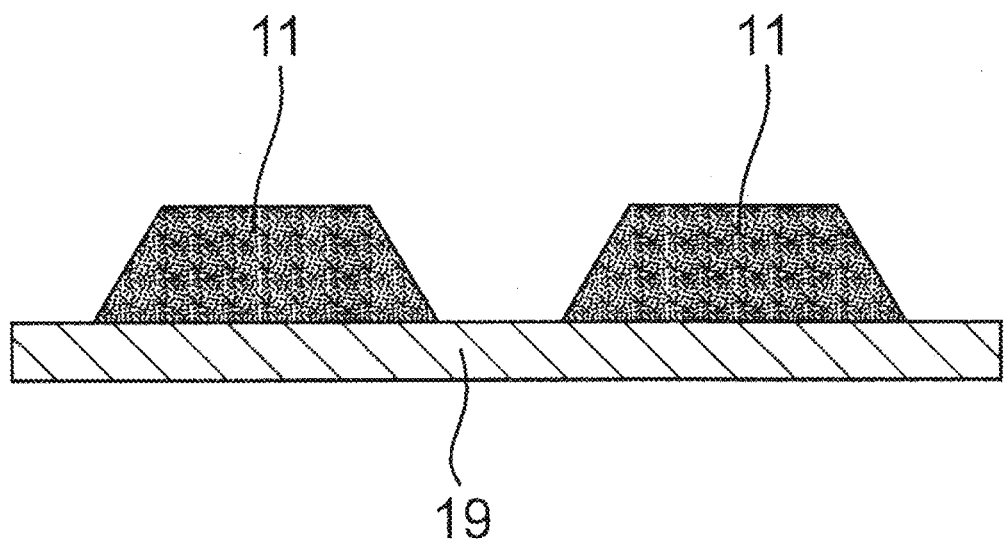
FIG. 12B is a schematic cross-sectional view of one step of the method of manufacturing the first electrode and the first insulating part (first elastic sheet shown in FIG. 10) in the pressure-sensitive element of the present disclosure.
Figure 12C:
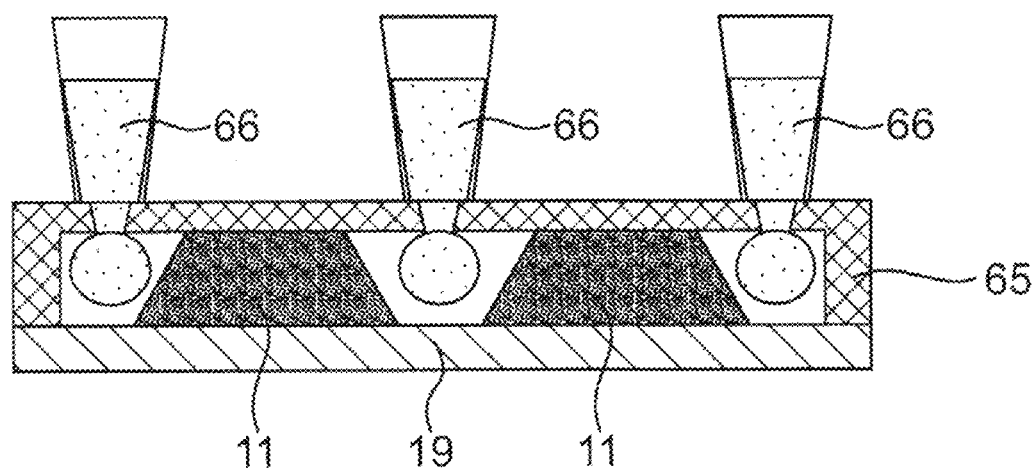
FIG. 12C is a schematic cross-sectional view of one step of the method of manufacturing the first electrode and the first insulating part (first elastic sheet shown in FIG. 10) in the pressure-sensitive element of the present disclosure.
Figure 12D:
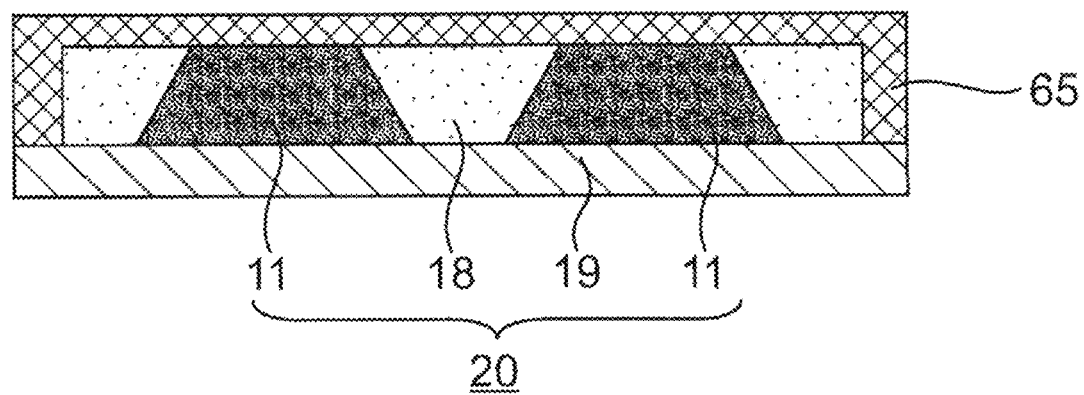
FIG. 12D is a schematic cross-sectional view of one step of the method of manufacturing the first electrode and the first insulating part (first elastic sheet shown in FIG. 10) in the pressure-sensitive element of the present disclosure.

For example, when first electrode 11 and first insulating part 18 shown in FIG. 10 are manufactured, first, a conductive filler and, if desired, a cross-linking material are applied to a solution of a desired resin material (rubber material) or raw material solution to obtain the composite material for the first electrode, the composite material for the first insulating part, and a composite material for the elastic base material. Next, elastic base material 19 is obtained by molding and cross-linking using the composite material for the elastic base material. Next, as shown in FIG. 12A, composite material 63 for the first electrode is filled and cross-linked between mold 61 having a molding surface corresponding to a desired shape of the first electrode and elastic base material 19 to obtain first electrode 11 on elastic base material 19 as shown in FIG. 12B. Then, as shown in FIG. 12C, composite material 66 for the first insulating part is filled and cross-linked between mold 65 having a molding surface corresponding to a desired shape of the first insulating part (particularly, first elastic sheet 20) and elastic base material 19 to obtain first electrode 11 and first insulating part 18 (particularly, first elastic sheet 20) between mold 65 and elastic base material 19 as shown in FIG. 12D. FIGS. 12A to 12D are schematic cross-sectional views of one step of the method of manufacturing the first electrode and the first insulating part (first elastic sheet shown in FIG. 10) in the pressure-sensitive element of the present disclosure.

Figure 13:
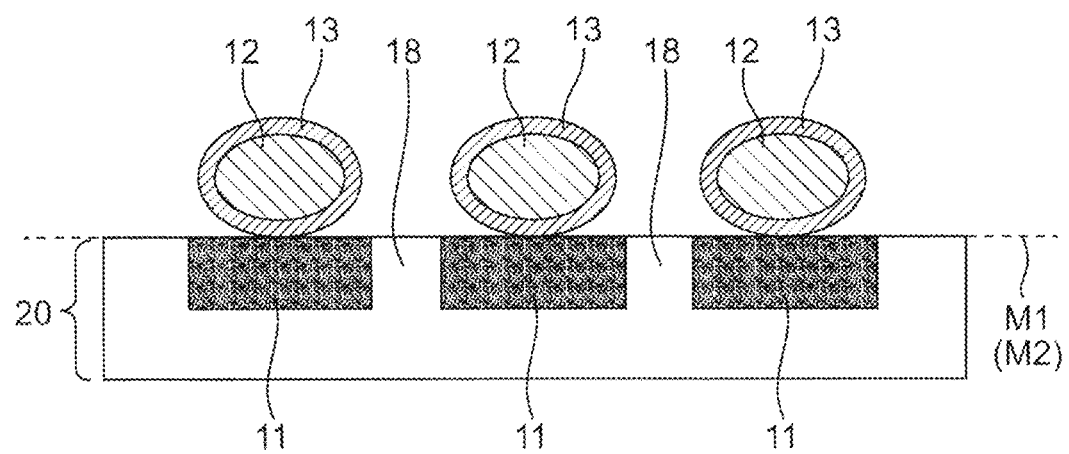
FIG. 13 is a schematic cross-sectional view of the pressure-sensitive element in FIG. 3 taken along straight line L (dashed-dotted line) on first plane M1, and is a sectional view perpendicular to first direction D1.

Each of the plurality of second electrodes 12 is a linear member having at least conductive properties (for example, a conductor wire or a metal wire), and a surface of each second electrode 12 is generally covered with dielectric 13. Each of the plurality of second electrodes 12 is elongated in second direction D2 intersecting first direction D1 and is arranged in a second plane facing the first plane. Second direction D2 intersecting first direction D1 refers to second direction D2 intersecting first direction D1 when first direction D1 and second direction D2 are represented in the same plane, and means that these directions are not parallel to each other. At this time, an angle (smaller angle) formed by first direction D1 and second direction D2 is not limited, and may be, for example, from 1° to 90° inclusive. In terms of further improving the expandability of the pressure-sensitive element in first direction D1, the angle (smaller angle) formed by first direction D1 and second direction D2 is preferably from 30° to 90° inclusive (particularly more than or equal to 30° and particularly less than) 90° and more preferably, for example, 45°. "The plurality of first electrodes 11 is elongated in second direction D2" means that the elongtion direction of second electrodes 12 is substantially parallel to second direction D2. As will be described later, second electrodes 12, having bent parts arranged periodically, are elongated in second direction D2, and thus the elongation direction of second electrodes 12 is a direction in which second electrodes 12 are elongated as a whole (for example, the main direction). The second plane facing the first plane refers to the second plane parallel to first plane M1, and second plane M2 may be the same plane as first plane M1 as shown in FIG. 13. The second plane may be a flat plane or a curved plane depending on first plane M1. FIG. 13 is a schematic cross-sectional view of the pressure-sensitive element in FIG. 3 taken along straight line L (dashed-dotted line) on first plane M1, and is a sectional view perpendicular to first direction D1. Note that FIG. 13 shows that when a cross-sectional shape of second electrode 12 is circular, second electrode 12 has an elliptical shape in the sectional view perpendicular to first direction D1. The cross-sectional shape of second electrode 12 is a shape in a cross-sectional view perpendicular to a longitudinal direction, assuming that second electrode 12 has a linear shape.

Figure 14A:
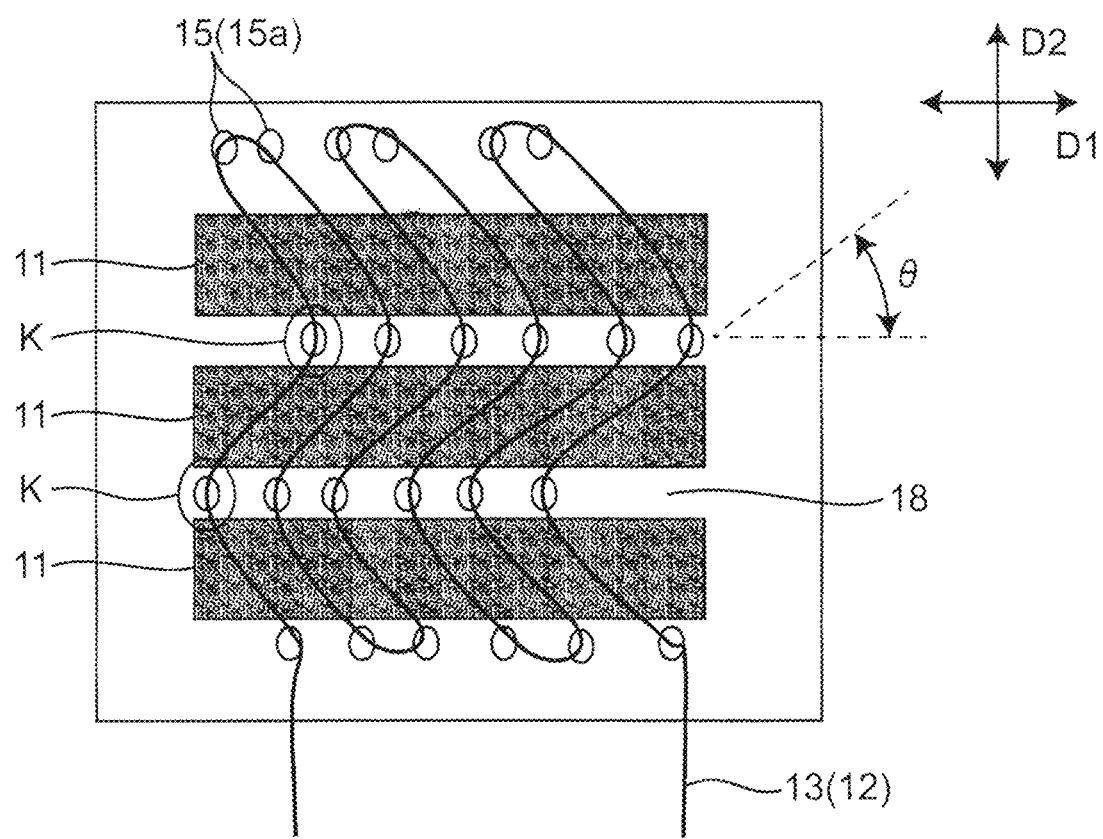
FIG. 14A is a plan view of another example of the pressure-sensitive element of the present disclosure, and is a plan view before extension.

Each of the plurality of second electrodes 12 has bent parts K arranged periodically (and regularly) in a plan view, as shown in FIGS. 3 and 14A. For example, each of the plurality of second electrodes 12 has a meander shape in a plan view. The meander shape is a shape of a wave in which a linear object is bent periodically (and regularly). "Bent" described herein includes not only a state of being linearly bent but also a state of being curvilinearly bent (that is, "curved"). Thus, specific examples of the meander shape include a sine wave shape, a rectangular wave shape, a triangular wave shape, a sawtooth wave shape, and a composite shape of these shapes. FIG. 3 is a schematic perspective view of the configuration of an example of the pressure-sensitive element of the present disclosure. It is also obvious from FIG. 3 that each of the plurality of second electrodes 12 has bent parts K arranged periodically (and regularly) in a plan view. FIG. 14A is a plan view of another example of the pressure-sensitive element of the present disclosure, and is a plan view before extension.

Figure 14B:
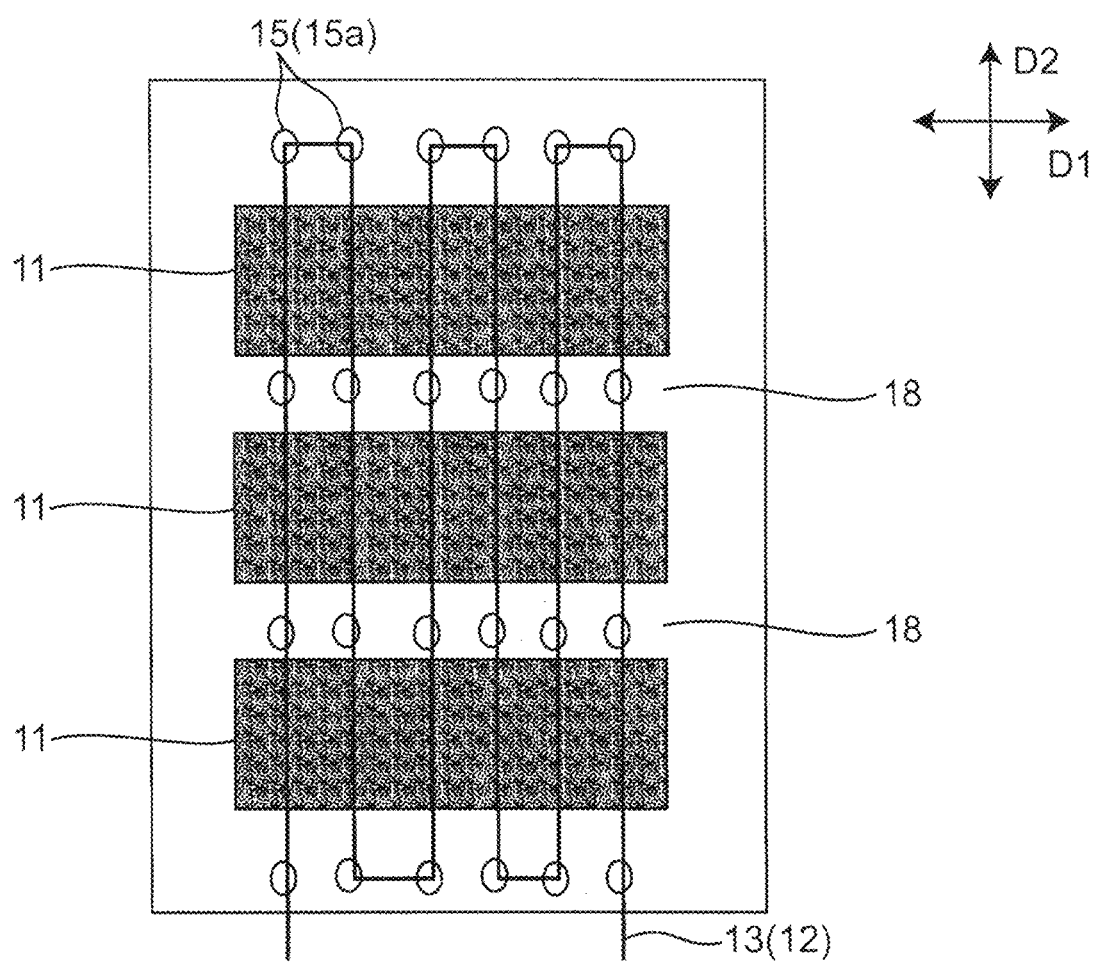
FIG. 14B is a plan view of the pressure-sensitive element in FIG. 14A when extended.

As described above, each of the plurality of second electrodes 12 has bent parts K arranged periodically (and regularly), and thus pressure-sensitive element 100 of the present disclosure has more sufficient expandability. Specifically, pressure-sensitive element 100 expands and contracts more sufficiently in the second direction based on the extension and bending of bent parts K of second electrode 12 (and the elasticity of first electrode 11 and first insulating part 18) as shown in FIGS. 14A and 14B. Further, pressure-sensitive element 100 expands and contracts more sufficiently in first direction D1 based on the elasticity of first electrode 11 (and the first insulating part).

In relation to expansion and contraction (particularly, extension) in second direction D2, specifically assuming that a bending angle of second electrode 12 with respect to first direction D1 is θ as shown in FIG. 14A, pressure-sensitive element 100 extends such that a dimension of pressure-sensitive element 100 in second direction D2 during extension is 1/sine times a dimension of pressure-sensitive element 100 in second direction D2 during bending (that is, before extension). On the other hand, when second electrode 12 is not provided with a bent part, θ is 90°, and thus extension is not achieved. FIG. 14B is a plan view of the pressure-sensitive element in FIG. 14A when extended.

Bending angle θ of second electrode 12 is an average value of the angles (smaller angles) formed by a tangent line between any two adjacent bent parts K in each second electrode 12 and first direction D1. In terms of further improving the expandability (particularly, expandability in second direction D2) of pressure-sensitive element 100, further preventing a short circuit between adjacent first electrodes 11, further improving the expansion of the measurement range of the pressure force, and further improving the pressure sensitivity, bending angle θ of second electrode 12 is preferably from 1° to 90° inclusive (particularly, more than or equal to 1° and less than 90°), more preferably from 10° to 80° inclusive, even more preferably from 30° to 60° inclusive, and most preferably from 40° to 50° inclusive.

The plurality of second electrodes 12 generally has a similar shape in a plan view, and any two adjacent second electrodes 12 of the plurality of second electrodes 12 are parallel to each other. Here, "parallel" means a relationship in which two adjacent second electrodes 12 are spaced apart from each other at a certain space and do not intersect each other.

When each of the plurality of second electrodes 12 has a meander shape, distance P (pitch) (space in first direction D1) (FIG. 3) between any two adjacent second electrodes 12 is generally from 1 mm to 30 mm inclusive, preferably from 2 mm to 10 mm inclusive in terms of interpersonal pressure-sensitive use, and more preferably, for example, 5 mm.

Maximum displacement Q (for example, amplitude×2a) (FIG. 3) in first direction D1 at each second electrode 12 is generally from 2 mm to 40 mm inclusive, preferably from 4 mm to 20 mm inclusive in terms of interpersonal pressure-sensitive use, and more preferably, for example, 10 mm. Repeating unit dimension R (FIG. 3) in second direction D2 at each second electrode 12 is generally from 1 mm to 40 mm inclusive, preferably from 2 mm to 20 mm inclusive in terms of interpersonal pressure-sensitive use, and more preferably, for example, 10 mm.

Each second electrode 12, having dielectric 13 covering the surface of second electrode 12, is disposed in close proximity to first electrode 11. That is, each second electrode 12 is disposed so as to be in indirect contact with first electrode 11 via dielectric 13 on the surface of second electrode 12. In relation to the conductive properties, it is sufficient that second electrode 12 has a resistivity sufficiently smaller than impedance of capacitance in a desired frequency band. The resistivity of second electrode 12 is generally less than or equal to $10^{-1}$ Ω·cm, particularly from $10^{-12}$ Ω·cm to $10^{-1}$ Ωcm inclusive, and more preferably from $10^{-12}$ Ω·cm to $10^{-8}$ Ω·cm inclusive. This resistivity can be achieved, for example, by using a metal wire.

Each second electrode 12 may generally have flexibility, may have elastic properties, or may have both flexibility and elastic properties. Flexibility is a characteristic of returning to an original shape when released from force after having been flexed and deformed as a whole by external force (normal pressure force applied to the pressure-sensitive element: for example, pressure force of about 0.1 N/cm² to 100 N/cm² inclusive). Second electrode 12, having flexibility, has an elastic modulus of, for example, more than about $10^8$ Pa, particularly more than $10^8$ Pa and less than or equal to $10^{12}$ Pa, for example, about $1.2 \times 10^{11}$ Pa.

Second electrode 12 may include any material as long as second electrode 12 has at least conductive properties. Second electrode 12, having flexibility, may include, for example, a metal body. Further, second electrode 12, having flexibility, may include a glass body and at least one of a conductive layer formed on a surface of the glass body or a conductive filler dispersed in the glass body. Further, second electrode 12, having flexibility, may include a resin body and at least one of a conductive layer formed on a surface of the resin body or a conductive filler dispersed in the resin body. The metal body is an electrode member including metal, that is, second electrode 12 may substantially include metal. The metal body include, for example, at least one metal selected from the group consisting of gold (Au), silver (Ag), copper (Cu), nichrome (Ni—Cr alloy), carbon (C), zinc oxide (ZnO), indium (III) oxide (In₂O₃), and tin (IV) oxide (SnO₂). The glass body is not limited as long as the glass body has a silicon oxide network structure, and may include, for example, at least one glass material selected from the group consisting of quartz glass, soda-lime glass, borosilicate glass, lead glass, and the like. The resin body may include at least one resin material selected from the group consisting of styrene-based resin, silicone-based resin (for example, polydimethylpolysiloxane (PDMS)), acrylic-based resin, rotaxane-based resin, urethane-based resin, and the like. The conductive layer of the glass body and the resin body may be a layer formed by depositing at least one metal selected from the group of metals similar to the metal that can form the metal body, or may be a layer formed by coating a conductive ink, for example. The conductive filler of the glass body and the resin body may include at least one metal selected from the group consisting of metals similar to the metals that can form the metal body. Second electrode 12, having elastic properties, may include conductive rubber similar to first electrode 11.

Second electrode 12 is generally a long member having an elongated shape (for example, linear shape). When second electrode 12 is a long member and includes a metal body, second electrode 12 corresponds to a metal wire (for example, a copper wire) and is preferable in terms of further expanding the measurement range of the pressure force and further improving the pressure sensitivity.

Second electrode 12 may be a heater element of the pressure-sensitive element. When second electrode 12 is the heater element, the pressure-sensitive element having second electrode 12 also functions as a heater. A nichrome wire can be mentioned as a heater element. For example, when the pressure-sensitive element is installed on a seat surface of a vehicle, at least one of a driver's body or a passenger's body can be kept warm so as not to be cold. Further, for example, when the pressure-sensitive element is installed on a surface of a steering device (for example, a steering wheel), hands holding the steering device can be kept warm so as not to be cold.

Figure 15:
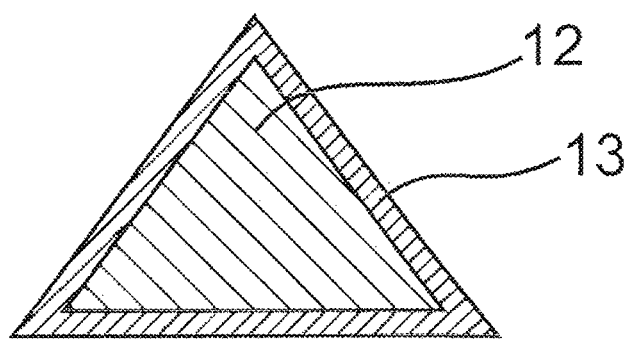
FIG. 15 is a schematic cross-sectional view of an example of a second electrode.
Figure 16:
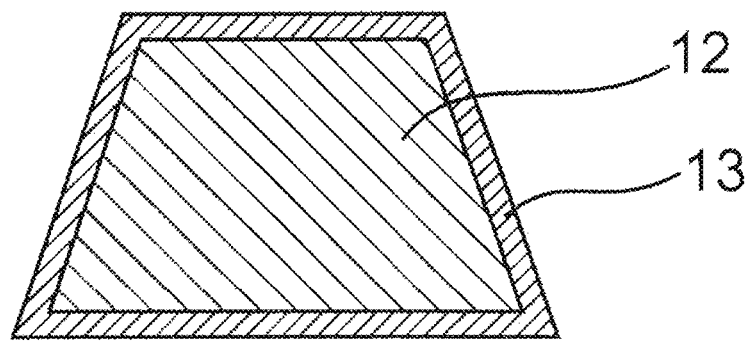
FIG. 16 is a schematic cross-sectional view of another example of the second electrode.

The cross-sectional shape of second electrode 12 is not limited as long as the area of the contact region between dielectric 13 and first electrode 11 on the surface of second electrode 12 is expanded by applying pressure force, and may be, for example, a circular shape or an elliptical shape, or a triangular or trapezoidal shape as shown in FIG. 15 or 16, respectively. When the cross-sectional shape of second electrode 12 is a shape having an inclination, such as a triangular shape or a trapezoidal shape, the area of the contact region between dielectric 13 and first electrode 11 is likely to be constant when no pressure force is applied, and this improves linearity of sensitivity. In particular, when the cross-sectional shape of second electrode 12 is a trapezoidal shape, the first electrode and the second electrode (particularly, dielectric 13) can be separated from each other without a load during unloading, and thus reliability is improved. FIGS. 15 and 16 are schematic cross-sectional views of an example of second electrode 12.

The cross-sectional dimension of second electrode 12 is not limited as long as the capacitance between the electrodes can be measured, and is generally from 1 µm to 10 mm inclusive, preferably from 100 µm to 1 mm inclusive in terms of further expanding the measurement range of the pressure force and further improving the pressure sensitivity, and more preferably, for example, 300 µm. When the cross-sectional dimension of second electrode 12 is reduced, the change in the area of the contact region becomes large, and the pressure sensitivity is improved. Increasing a cross-sectional dimension of the long member further widens the measurement range of the pressure force. The cross-sectional dimension of second electrode 12 is a maximum dimension in the cross-sectional shape. Specifically, the cross-sectional dimension of second electrode 12 is a maximum dimension (for example, diameter) in the cross-sectional view perpendicular to the longitudinal direction, assuming that second electrode 12 has a linear shape.

In general, the plurality of second electrodes 12 is used. At this time, patterning is possible by detecting the changes in capacitance at the intersections (intersecting parts or cross points) between the plurality of second electrodes 12 and the plurality of first electrodes 11 with a detector. Patterning refers to detecting a pressing position as well as the pressure force.

The surface of each of the plurality of second electrodes 12 is covered with dielectric 13. Although dielectric 13 completely covers the entire surface of second electrode 12 in FIGS. 13, 15, and 16, a covering region of dielectric 13 is not limited as long as dielectric 13 at least partially covers the surface of second electrode 12. "Dielectric 13 at least partially covers the surface of second electrode 12" means that dielectric 13 covers at least a part of the surface of second electrode 12 between first electrode 11 and second electrode 12. In other words, it is sufficient that dielectric 13 covers at least a part of the surface of second electrode 12 as long as dielectric 13 is between first electrode 11 and second electrode 12. "Dielectric 13 covers" means that dielectric 13 is adhered to the surface of second electrode 12 as a film and integrated with the surface of second electrode 12.

In terms of further simplifying a pressure-sensitive element structure, dielectric 13 preferably completely covers the entire surface of second electrode 12. When dielectric 13 completely covers the entire surface of second electrode 12, dielectric 13 configures an insulating film of second electrode 12, and dielectric 13 and second electrode 12 are generally integrated. Integrated dielectric 13 and second electrode 12 may correspond to a single insulation-coated metal wire, and may be, for example, an enamel wire or an element wire. When the insulation-coated metal wire is used, a pressure-sensitive element can be configured without a photolithography process such as etching by simply arranging the insulation-coated metal wire between first electrode 11 and stranded wire 14. This can further sufficiently simplify the pressure-sensitive element structure and reduce manufacturing costs.

Dielectric 13 may include any material as long as dielectric 13 has at least properties of a "dielectric". For example, dielectric 13 may include a resin material, a ceramic material, a metal oxide material, or the like. It should be noted that these are merely examples, but dielectric 13 may include at least one resin material selected from the group consisting of polypropylene resin, polyester resin (for example, polyethylene terephthalate resin), polyimide resin, polyphenylene sulfide resin, polyvinyl formal resin, polyurethane resin, polyamideimide resin, polyamide resin, and the like. Further, dielectric 13 may include at least one metal oxide material selected from the group consisting of $Al_2O_3$, $Ta_2O_5$, and the like. Dielectric 13 generally includes a material having a resistance value higher than impedance of capacitance in a desired frequency band.

Dielectric 13 generally has rigid properties. The rigidity properties are properties of resisting deformation due to external force (normal pressure force applied to a pressure-sensitive element: for example, pressure force of about 0.1 $N/cm^2$ to 100 $N/cm^2$ inclusive). Dielectric 13 is generally not deformed by the normal pressure force as described above. Dielectric 13 may have a higher elastic modulus than first electrode 11 so as not to be deformed more than first electrode 11 when pressure force is applied to the pressure-sensitive part. For example, when the elastic modulus of first electrode 11 is from about $10^4$ Pa to $10^8$ Pa inclusive, dielectric 13 may have a higher elastic modulus than the elastic modulus.

A thickness of dielectric 13 is not limited as long as the capacitance between the electrodes changes due to external pressure force, and is usually from 20 nm to 2 mm inclusive, preferably from 20 nm to 1 mm inclusive in terms of interpersonal pressure-sensitive use, and more preferably, for example, 10 µm.

Dielectric 13, including a resin material, can be formed by a coating method of applying a resin material solution and drying, an electrodeposition method of performing electrodeposition in a resin material solution, or the like. Dielectric 13, including a metal oxide material, can be formed by an anodic oxidation method or the like.

Figure 17:
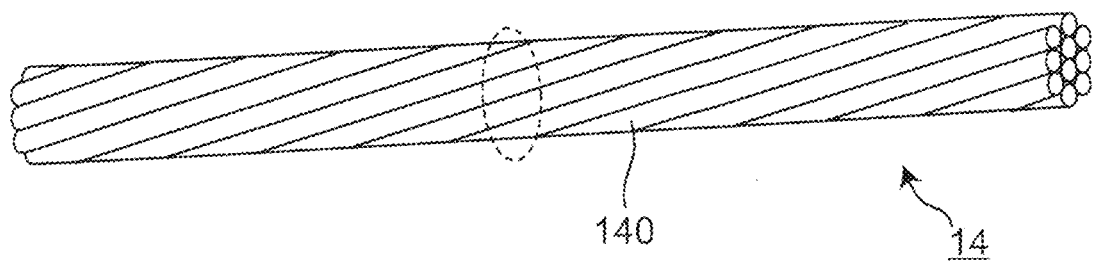
FIG. 17 is a schematic perspective view of a stranded wire that can be used as the second electrode and a dielectric.
Figure 18A:
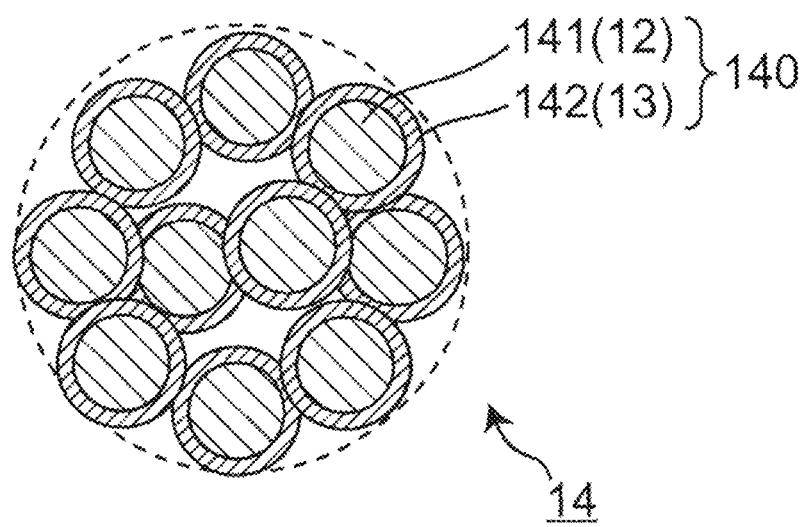
FIG. 18A is a schematic cross-sectional view of the stranded wire in FIG. 17 to which no external force is applied.
Figure 18B:
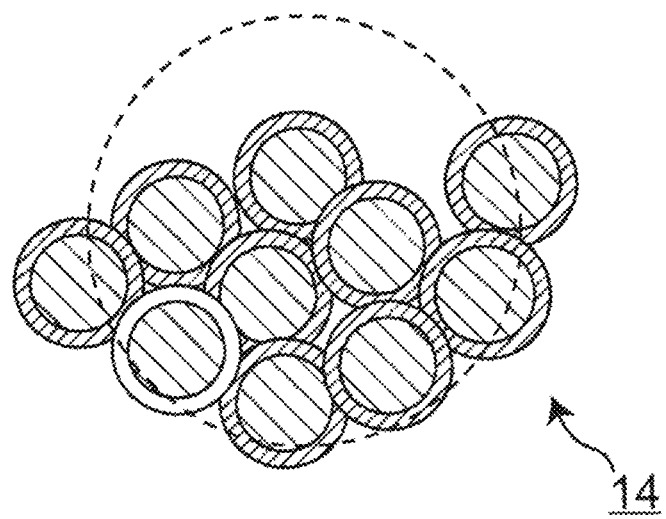
FIG. 18B is a schematic cross-sectional view of the stranded wire in FIG. 17 to which external force is applied.

In the present disclosure, each of second electrodes 12 preferably configures a stranded wire. The stranded wire is, for example, as shown in FIG. 17, a stranded wire (for example, a composite wire) 14 formed by twisting a plurality of insulation-coated conductor wires (for example, insulation-coated metal wires) 140. A cross-sectional shape of stranded wire 14 in FIG. 17 is shown in FIG. 18A. When no external force (for example, pressure force) is applied to stranded wire 14, the plurality of insulation-coated conductor wires 140 configuring stranded wire 14 generally converges in a substantially circular shape as a whole, as shown in FIG. 18A. As shown in FIG. 18B, the cross-sectional shape of stranded wire 14 is deformed when external force is applied. That is, a cross-sectional configuration of the plurality of insulation-coated conductor wires 140 configuring stranded wire 14 changes as shown in FIG. 18B. Therefore, when stranded wire 14 is used as each of second electrodes 12, there is a concern that a large difference in pressure-sensitive characteristics may occur before and after the application of the external force. However, the following phenomena have been found in the present disclosure.

Even when stranded wire 14 is used as each of second electrodes 12, there is substantially no difference in the pressure-sensitive characteristics before and after the application of the external force, but rather, the measurement range of the pressure force is further expanded and the pressure sensitivity is further improved. FIG. 17 is a schematic perspective view of the stranded wire that can be used as second electrode 12 and dielectric 13. FIG. 18A is a schematic cross-sectional view of the stranded wire in FIG. 17 to which no external force is applied. FIG. 18B is a schematic cross-sectional view of the stranded wire in FIG. 17 to which an external force is applied.

When each of second electrodes 12 configures stranded wire 14 formed by twisting the plurality of insulation-coated conductor wires 140, for example, as shown in FIG. 17, conductor wire 141 in each insulation-coated conductor wire 140 of stranded wire 14 corresponds to second electrode 12, and insulating coat 142 covering a surface of conductor wire 141 corresponds to dielectric 13. In such an aspect, each of the plurality of second electrodes 12 and each of the plurality of dielectrics 13 configure stranded wire 14 including the plurality of insulation-coated conductor wires 140.

In stranded wire 14, each conductor wire 141 (second electrode 12) has the surface covered with insulating coat 142 (dielectric 13) as shown in FIGS. 17 and 18A, but a surface of the stranded wire including the plurality of conductor wires without insulating coat 142 (dielectric material 13) may be covered with insulating coat 142 (dielectric 13).

In stranded wire 14, the surface of each conductor wire 141 (second electrode 12) is preferably covered with insulating coat 142 (dielectric 13) as shown in FIGS. 17 and 18A in terms of further expanding the measurement range of the pressure force and further improving the pressure sensitivity.

A cross-sectional dimension of stranded wire 14 may be similar to the cross-sectional dimension of second electrode 12. The cross-sectional dimension of stranded wire 14 is preferably from 100 μm to 1 mm inclusive, more preferably from 100 μm to 500 μm inclusive.

A number of conductor wires 141 configuring stranded wire 14 is not limited as long as the capacitance between the electrodes can be measured, and may be, for example, two or more, particularly 2 to 100.

Conductor wire 141 configuring stranded wire 14 may include a similar material to the above material configuring second electrode 12. Conductor wire 141 configuring stranded wire 14 is preferably a metal body (that is, a metal wire) similar to the metal body that can form second electrode 12. A cross-sectional dimension of conductor wire 141 configuring stranded wire 14 may be similar to the cross-sectional dimension of second electrode 12. The cross-sectional dimension of conductor wire 141 configuring stranded wire 14 is preferably from 1 μm to 500 μm inclusive, and more preferably from 10 μm to 100 μm inclusive.

Conductor wire 141 configuring stranded wire 14 has a similar conductivity to second electrode 12.

Conductor wire 141 configuring stranded wire 14 may include a similar material to the above material configuring second electrode 12. Conductor wire 141 configuring stranded wire 14 is preferably a metal body (that is, a metal wire) similar to the metal body that can form second electrode 12.

Insulating coat 142 configuring stranded wire 14 may include a similar material to the above material configuring dielectric 13.

The covering region of insulating coat 142 is not limited as long as insulating coat 142 covers the surface of conductor wire 141 at least partially. Insulating coat 142 preferably completely covers the entire surface of conductor wire 141 in terms of further simplifying the pressure-sensitive element structure. When insulating coat 142 completely covers the entire surface of conductor wire 141, insulating coat 142 configures an insulating film of conductor wire 141, and insulating coat 142 and conductor wire 141 are generally integrated. Integrated insulating coat 142 and conductor wire 141 may correspond to a single insulation-coated metal wire, and may be, for example, an enamel wire or an element wire. Stranded wire 14 can be formed simply by twisting the plurality of insulation-coated metal wires.

Insulating coat 142 has rigid properties similarly to dielectric 13. Similarly to dielectric 13, insulating coat 142 may have a higher elastic modulus than first electrode 11 so as not to be deformed more than first electrode 11 when pressure force is applied. For example, when the elastic modulus of first electrode 11 is from about $10^4$ Pa to $10^8$ Pa inclusive, insulating coat 142 may have a higher elastic modulus than the elastic modulus.

A thickness of insulating coat 142 configuring stranded wire 14 may be within a similar range to the thickness of dielectric 13 described above, and is, for example, from 20 nm to 2 mm inclusive, preferably from 20 nm to 1 mm inclusive in terms of interpersonal pressure-sensitive use, and more preferably, for example, 10 μm.

Pressure-sensitive element 100 may further include restraining member 15 that limits a displacement of second electrode 12. Restraining member 15 does not have to fix second electrode 12 at a predetermined position on pressure-sensitive element 100, but it is sufficient that restraining member has such binding force as to hold second electrode 12 at a predetermined position. Pressure-sensitive element 100, having the restraining member, can prevent displacement of second electrode 12, and consequently, can reliably detect the pressure force at a predetermined position. Further, the pressure-sensitive element, mounted on a curved surface, can easily reduce distortion and the like and prevent damage.

Restraining member 15 restrains second electrode 12 (and dielectric 13) to first elastic sheet 20 including first electrode 11 in FIGS. 3 and 13, but the configuration is not limited to this as long as dielectric 13 on the surface of second electrode 12 and first electrode 11 are brought into contact with each other. For example, restraining member 15 may restrain second electrode 12 (and dielectric 13) to first elastic sheet 20 and the second elastic sheet (not shown) described later, which is disposed so as to sandwich second electrode 12 (and dielectric 13). Further, for example, restraining member 15 may restrain second electrode 12 (and dielectric 13) to both first elastic sheet 20 and the second elastic sheet (not shown) described later. That is, the first elastic sheet, second electrode 12 (and dielectric 13), and the second elastic sheet (not shown) may be integrated by restraining member 15 in a state where second electrode 12 (and dielectric 13) is disposed between the first elastic sheet and the second elastic sheet. Restraining member 15 preferably restrains second electrode 12 (and dielectric 13) to first elastic sheet 20 including first electrode 11 in terms of further improving the expandability, further expanding the measurement range of the pressure force, and further improving the pressure sensitivity.

Restraining member 15 restrains by sewing and connecting with connecting thread 15a in terms of preventing dielectric 13 from peeling from second electrode 12, further improving the expandability of the pressure-sensitive element, further expanding the measurement range of the pressure force, and further improving the pressure sensitivity. By sewing and connecting first elastic sheet 20 and second electrode 12 with connecting thread 15a, a position where the first electrode and the second electrode intersect each other can be restrained within a certain range while maintaining bendability and expandability of the pressure-sensitive element, and reproducibility of a pressure sensitive position can be ensured. Furthermore, it is possible to prevent dielectric 13 from peeling from second electrode 12.

Connecting thread 15a may have a form of a twisted thread in which the fibers are twisted, or may have a form of a single fiber (that is, a monofilament) which is not twisted. The fibers configuring the connecting thread may be chemical fibers, natural fibers, or mixed fibers of chemical fibers and natural fibers.

The chemical fibers may be synthetic fibers, semi-synthetic fibers, regenerated fibers, or inorganic fibers. Examples of the synthetic fibers include polystyrene fibers, aliphatic polyamide fibers (for example, nylon 6 fibers and nylon 66 fibers), aromatic polyamide fibers, polyvinyl alcohol fibers (for example, vinylon fibers), polyvinylidene chloride fibers, polyvinyl chloride fibers, polyester fibers (for example, polyester fibers, PET fibers, PBT fibers, polytrimethylene terephthalate fibers, and polyarylate fibers), polyacrylonitrile fibers, polyethylene fibers, polypropylene fibers, polyurethane fibers, phenol fibers, and polyfluoroethylene fibers. Examples of the semi-synthetic fibers include cellulosic fibers and protein fibers. Examples of the regenerated fibers include rayon fibers, cupra fibers, and lyocell fibers. Examples of the inorganic fibers include glass fibers, carbon fibers, ceramic fibers, and metal fibers.

The natural fibers may be plant fibers, animal fibers, or mixed fibers of plant fibers and animal fibers. Examples of the plant fibers include cotton and hemp (for example, flax and ramie). Examples of the animal fibers include hair (for example, wool, angora, cashmere, and mohair), silk, and feather (for example, down and feather).

As connecting thread 15a, a thread having expandability and used for a thread for knitting or the like is preferably used. The thread having expandability is available as a commercial product such as Eiffel (Kanagawa Co., Ltd.) and SOLOTEX (registered mark) (TEIJIN FRONTIER CO., LTD.).

Restraint of second electrode 12 (and dielectric 13) to first elastic sheet 20 or the second elastic sheet described later with connecting thread 15a generally includes passing connecting thread 15a through first elastic sheet 20 or the second elastic sheet described later. At this time, connecting thread 15a is preferably passed so as to avoid the electrodes (that is, the first electrode and the third electrode described later). For example, when connecting thread 15a is passed through first elastic sheet 20, connecting thread 15a is preferably passed through first insulating part 18, not through first electrode 11 as shown in FIGS. 3 and 14A. Passing connecting thread 15a so as to avoid the electrodes makes it possible to suppress variations in the conductive properties of the first electrode (and the third electrode described later) and ensure accuracy of the pressure-sensitive measurement.

Figure 19A:
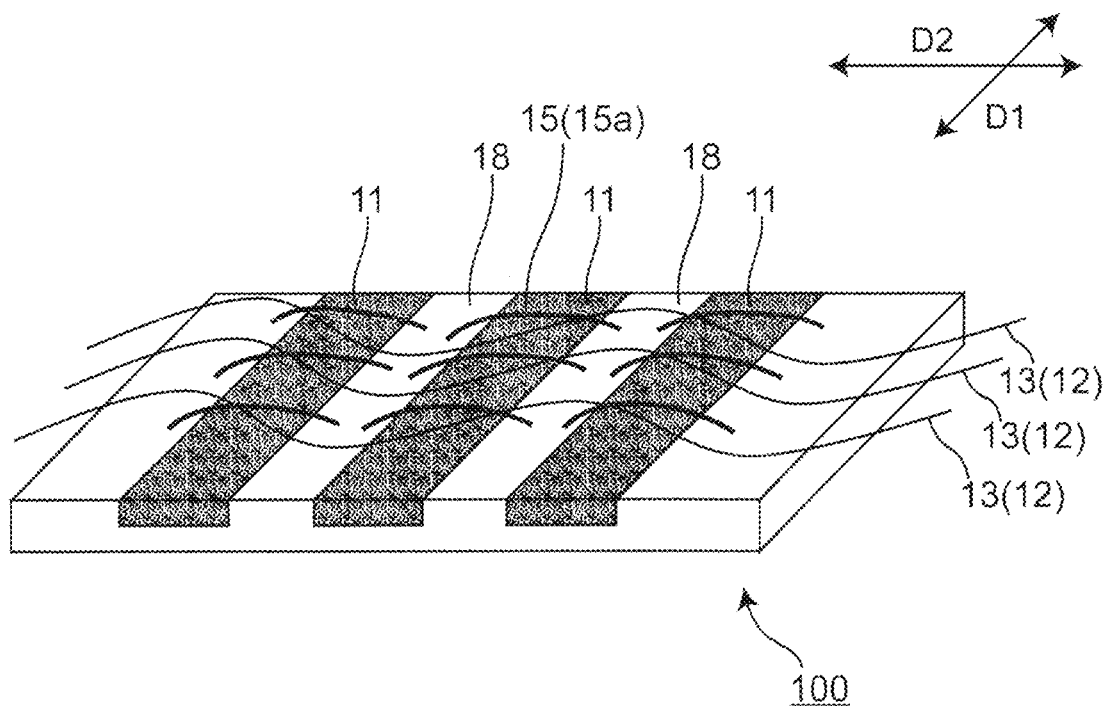
FIG. 19A is a schematic perspective view of a configuration of another example of the pressure-sensitive element of the present disclosure, and is a perspective view for explaining another stitch by a connecting thread.
Figure 19B:
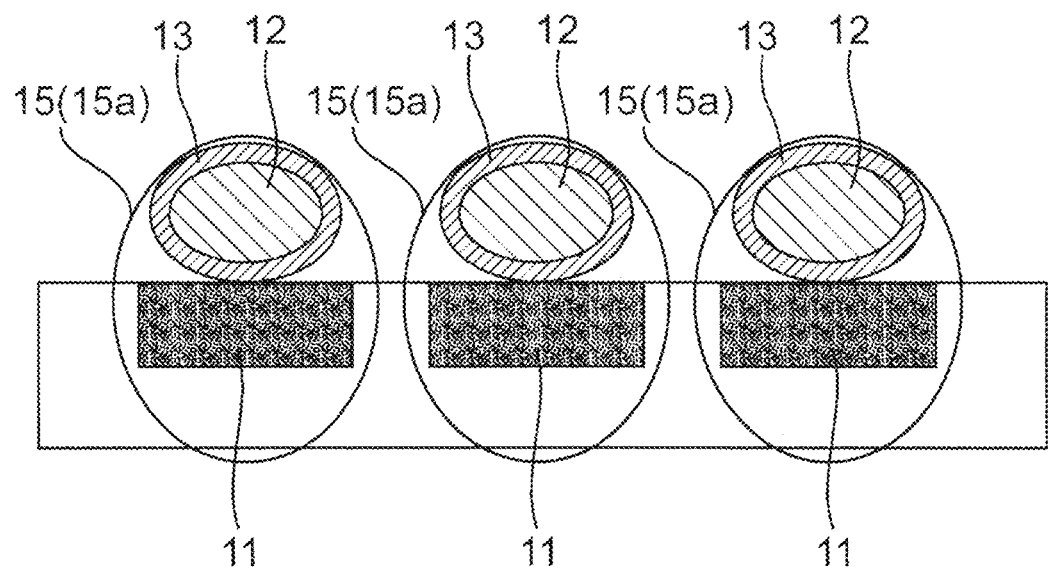
FIG. 19B is a schematic cross-sectional view of the pressure-sensitive element in FIG. 19A, and is a sectional view perpendicular to first direction D1.

In FIGS. 3, 14A, and the like, second electrode 12 is sewn and connected to first elastic sheet 20 by stitch in which connecting thread 15a straddles (or crosses) second electrode 12 (and dielectric 13) at first insulating part 18 (hereinafter, simply referred to as "stitch S1") without straddling (or crossing) first electrode 11, but the configuration is not limited to this. For example, connecting thread 15a may sew and connect second electrode 12 to first elastic sheet 20 by stitch in which connecting thread 15a straddles (or crosses) second electrode 12 (and dielectric 13) together with first electrode 11 (hereinafter, simply referred to as "stitch S2") as shown in FIGS. 19A and 19B. Also in such an aspect, connecting thread 15a is passed so as to avoid the electrodes, and it is therefore possible to suppress variations in the conductive properties of the electrodes and ensure the accuracy of the pressure-sensitive measurement. The stitch is a way of sewing or a seam. FIG. 19A is a schematic perspective view of a configuration of another example of the pressure-sensitive element of the present disclosure, and is a perspective view for explaining another stitch by the connecting thread. FIG. 19B is a schematic cross-sectional view of the pressure-sensitive element in FIG. 19A, and is a sectional view perpendicular to first direction D1.

When connecting thread 15a sews and connects second electrode 12 to first elastic sheet 20 by stitch S1, connecting thread 15a can sew and connect first elastic sheet 20 and second electrode 12 while being disposed along first direction D1 in a plan view as shown in FIG. 3. As a result, first elastic sheet and second electrode 12 can be easily sewn and connected together in a state where a sewn part is not brought into contact with first electrode 11 during sewing with the connecting thread.

Figure 20:
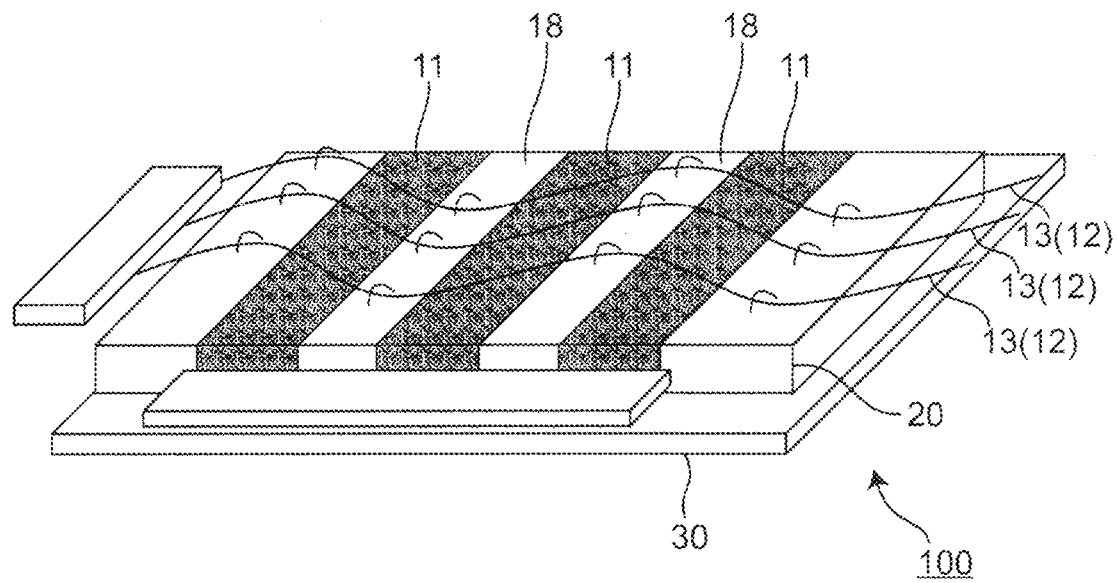
FIG. 20 is a schematic perspective view of the configuration of another example of the pressure-sensitive element of the present disclosure, and is a perspective view for explaining arrangement of a first insulating layer.

As shown in FIG. 20, pressure-sensitive element 100 of the present disclosure preferably further includes first insulating layer 30 disposed on a side of first elastic sheet 20 opposite to second electrode 12. First insulating layer 30 described above can reduce measurement noise due to influence of a rear surface of first electrode 11 and allows stable and accurate pressure-sensitive measurement. FIG. 20 is a schematic perspective view of the configuration of another example of the pressure-sensitive element of the present disclosure, and is a perspective view for explaining arrangement of first insulating layer 30.

First insulating layer 30 has elastic properties and non-conductive properties. The elastic properties are similar to the elastic properties of first electrode 11. Specifically, it is sufficient that first insulating layer 30 has elastic properties such that expansion and contraction of the pressure-sensitive element in first direction D1 and second direction D2 are achieved. First insulating layer 30 preferably has a lower elastic modulus than first electrode 11 so as to be deformed more than first electrode 11 when expanded or contracted. In terms of further improving the expandability, further expanding the measurement range of the pressure force, and further improving the pressure sensitivity, the elastic modulus of first insulating layer 30 is preferably, for example, from about $10^4$ Pa to $10^8$ Pa inclusive, for example, about $10^5$ Pa. The larger the elastic modulus of first insulating layer 30 within the above range, the wider the measurement range of the pressure force. The smaller the elastic modulus of first insulating layer 30 within the above range, the higher the pressure sensitivity. With a higher pressure sensitivity, for example, even minute pressure force that has been difficult to detect in the known art can be detected. This allows a start of application of the pressure force to be accurately detected. The elastic modulus can be adjusted, for example, by changing a cross-linking density. The cross-linking density can be adjusted by an amount of cross-linking material added. In relation to the non-conductive properties, a resistivity of first insulating layer 30 may be sufficiently larger than impedance of capacitance in a desired frequency band. The resistivity of first insulating layer 30 is generally more than or equal to $10^3$ Ω·cm, particularly from $10^4$ Ω·cm to $10^{10}$ Ω·cm inclusive, and more preferably, for example, $10^7$ Ω·cm. This resistivity can be achieved by using, for example, a resin material (rubber material).

First insulating layer 30 corresponds to an elastic insulating member and can also be referred to as an expandable member. First insulating layer 30 may include any material as long as first insulating layer 30 has both the elastic properties and the non-conductive properties as described above. For example, first insulating layer 30 may include a non-conductive resin including a resin material (particularly, a rubber material). In terms of further improving the expandability of first insulating layer 30 in first direction D1 and second direction D2, further expanding the measurement range of the pressure force, and further improving the pressure sensitivity, first insulating layer 30 preferably includes non-conductive rubber including a rubber material. First insulating layer 30, including non-conductive rubber, can more effectively expand and contract in first direction D1 and second direction D2, allows the pressure force to be more effectively detected, and produces a sense of pressure during pressing. The resin material may be a similar resin material to the resin material described in the description of first insulating part 18. The rubber material may be a similar rubber material to the rubber material described above in the description of first insulating part 18. The rubber material may include a cross-linking material and a filler for holding the elastic body and reinforcing tear strength and tensile strength, depending on a type of rubber.

A thickness of each first insulating layer 30 is not limited as long as the capacitance between the electrodes changes due to the pressure force from outside and first insulating layer 30 can withstand the expansion and contraction. The thickness of first insulating layer 30 is generally from 0.01 mm to 10 mm inclusive, preferably from 0.01 mm to 2 mm inclusive, more preferably from 0.1 mm to 2 mm inclusive, and even more preferably, for example, 0.5 mm in terms of further improving the expandability of first insulating layer 30 in first direction D1 and second direction D2, further expanding the measurement range of the pressure force, and further improving the pressure sensitivity in the interpersonal pressure-sensitive use.

Pressure-sensitive element 100 preferably further includes second elastic sheet 40 that faces first elastic sheet 20 across the plurality of second electrodes 12. Second elastic sheet 40 may be a similar layer (or sheet) to first insulating layer 30 described above, or may be an elastic sheet including the third electrode. When second elastic sheet 40 is a similar layer (or sheet) to first insulating layer 30 described above, pressure-sensitive element 100 adopts measurement mechanism (1) described above. When second elastic sheet 40 is an elastic sheet including the third electrode, pressure-sensitive element 100 adopts measurement mechanism (2) described above. Pressure-sensitive element 100 preferably includes second elastic sheet 40 including the third electrode in terms of further expanding the measurement range of the pressure force and further improving the pressure sensitivity. Hereinafter, a case where second elastic sheet 40 is an elastic sheet including the third electrode will be described.

Figure 21:
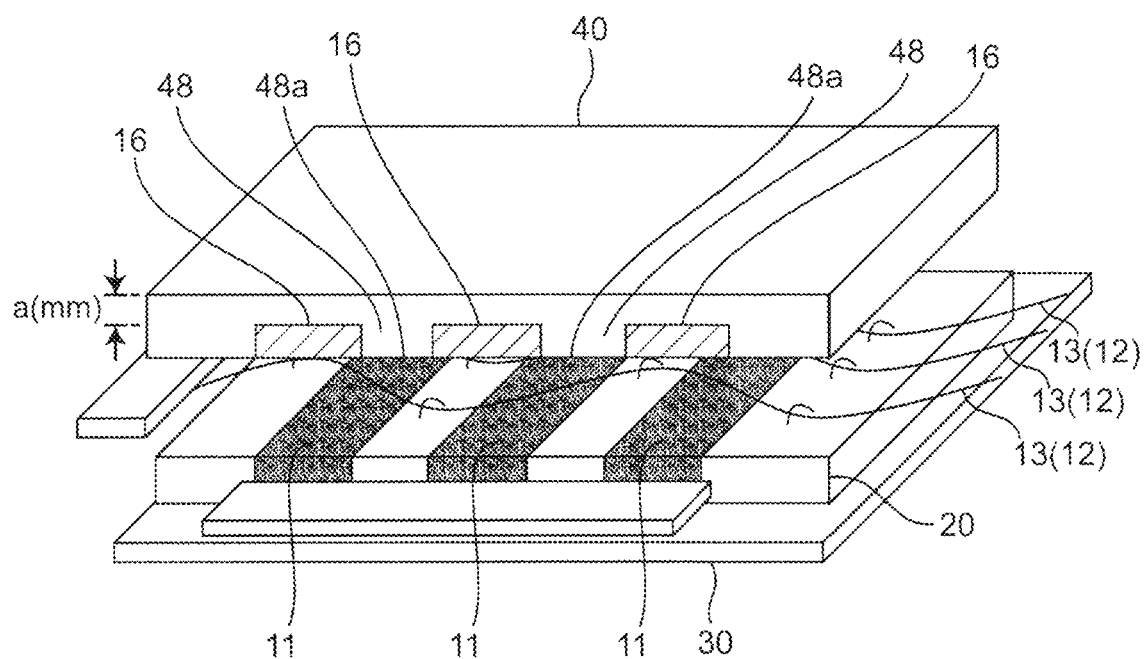
FIG. 21 is a schematic perspective view of the configuration of another example of the pressure-sensitive element of the present disclosure, and is a perspective view for explaining arrangement of a second elastic sheet.

In terms of further extending life of the pressure-sensitive element (particularly, the first electrode), further expanding the measurement range of the pressure force, and further improving the pressure sensitivity, when second elastic sheet 40 is an elastic sheet including the third electrode, second elastic sheet 40 preferably has the following structure: as shown in FIG. 21, second elastic sheet 40 has a plurality of third electrodes 16 facing the plurality of first electrodes 11 and including a conductive elastic body, and a plurality of second insulating parts 48 disposed between the plurality of third electrodes 16 and including an insulating elastic body. FIG. 21 is a schematic perspective view of the configuration of another example of the pressure-sensitive element of the present disclosure, and is a perspective view for explaining arrangement of second elastic sheet 40.

Specifically, first elastic body sheet 20 and second elastic body sheet 40 are disposed such that each of the plurality of first electrodes 11 of the first elastic sheet and each of the plurality of third electrodes 16 of the second elastic sheet face each other. More specifically, an elongation direction of the plurality of third electrodes 16 of second elastic sheet 40 is parallel to an elongtion direction of the plurality of first electrodes 11 of first elastic sheet 20 (that is, first direction D1).

Second elastic sheet 40, having third electrode 16 and second insulating part 48 described above, allows deformation due to the pressure force to be dispersed to both the first electrodes and the third electrodes and allows the measurement range of the pressure force to be expanded. Further, a degree of deformation of the first electrodes can be reduced, and the life of the first electrodes can be extended.

Third electrodes 16 and second insulating parts 48 correspond to first electrodes 11 and first insulating parts 18, respectively. Third electrodes 16 and second insulating parts 48 may be selected from a similar range to first electrodes 11 and first insulating parts 18, respectively. For example, the elastic modulus, conductivity, shape, dimensions, and constituent materials of third electrodes 16 and second insulating parts 48 may be selected from a similar range to shapes, dimensions, and constituent materials of first electrodes 11 and first insulating parts 18, respectively.

In particular, a thickness of each second insulating part 48 is not limited as long as the capacitance between the electrodes changes due to the pressure force from outside and second insulating part 48 can withstand expansion and contraction. The thickness of second insulating part 48 may be generally such a thickness that surface 48a of second insulating part 48 on the second electrode side is near a surface of third electrode 16 on the second electrode side (is preferably flush with the surface of third electrode 16 on the second electrode side). In particular, thickness a (see FIG. 21) of second insulating part 48 on a side of third electrode 16 opposite to the surface on the second electrode side is generally from 0.01 mm to 10 mm inclusive, preferably from 0.01 mm to 2 mm inclusive, more preferably from 0.1 mm to 2 mm inclusive, even more preferably from 0.2 mm to 1 mm inclusive, and most preferably, for example, 0.2 mm in terms of further improving the expandability of second insulating part 48 in first direction D1 and second direction D2, further expanding the measurement range of the pressure force, and further improving the pressure sensitivity in the interpersonal pressure-sensitive use.

Third electrode 16 and second insulating part 48 (particularly, second elastic sheet 40 including third electrode 16 and second insulating part 48) can be particularly manufactured by a similar method of manufacturing first electrodes 11 and first insulating part 18 (particularly, first elastic sheet 20 including first electrode 11 and first insulating part 18) (that is, the known method of molding with a mold).

Pressure-sensitive element 100 of the present disclosure preferably further includes a second insulating layer (not shown) disposed on a side of second elastic sheet 40 opposite to second electrode 12. This can reduce measurement noise due to influence of a rear surface of the third electrode and allows stable and accurate pressure-sensitive measurement.

The second insulating layer may be selected from a similar range to that of first insulating layer 30. For example, the elastic modulus, conductivity, shape, dimension, and constituent materials of the second insulating layer may be selected from a similar range to that of first insulating layer 30.

Figure 22:
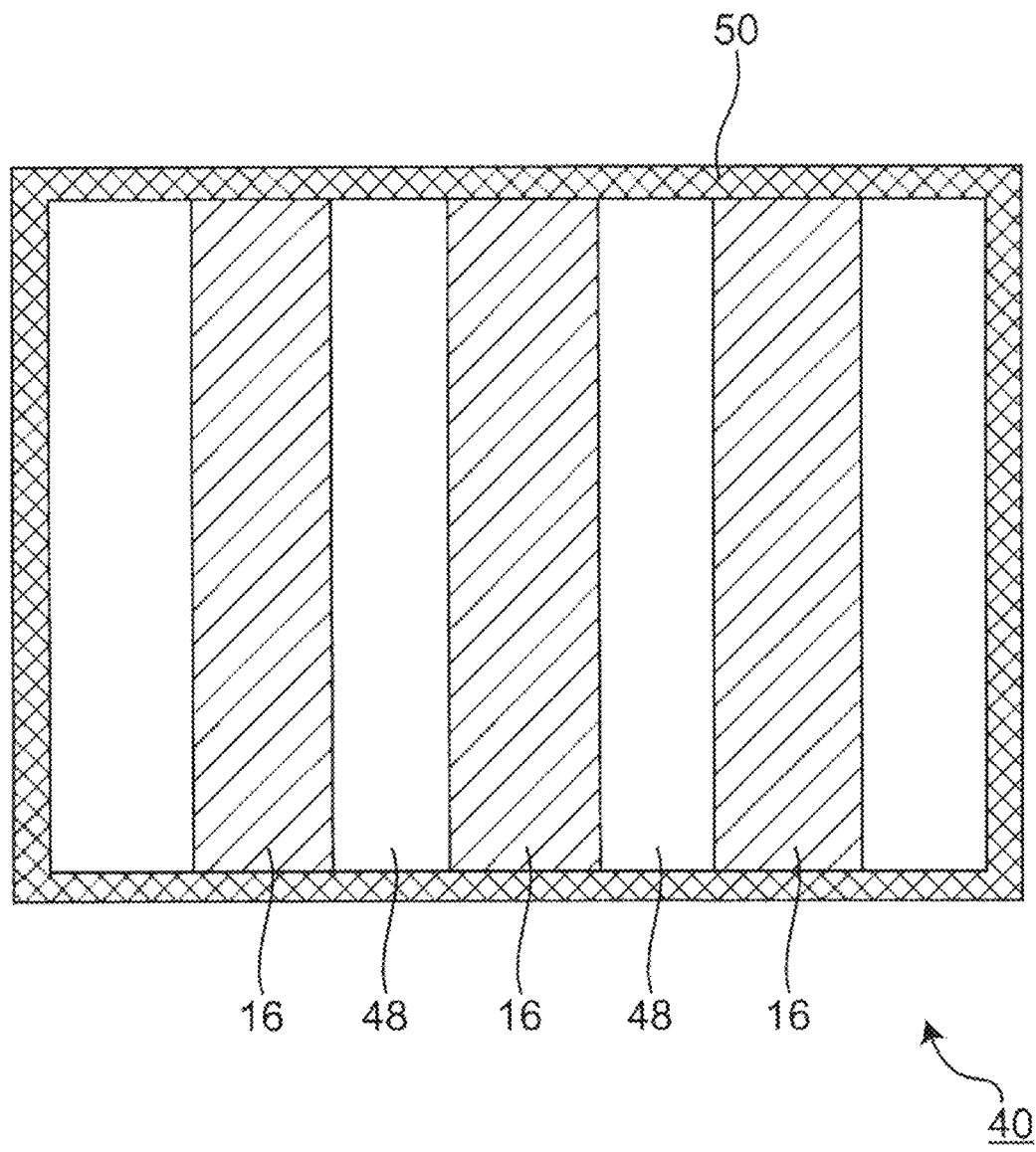
FIG. 22 is a schematic bottom view of the second elastic sheet, and is a diagram for explaining arrangement of a sealing part in second elastic sheet 40.

Pressure-sensitive element 100 of the present disclosure has sealing part 50 that internally seals second electrode 12 (and dielectric 13) between first elastic sheet 20 and second elastic sheet 40. Sealing part 50 is generally provided on a peripheral edge between first elastic sheet 20 and second elastic sheet 40 and internally seals second electrode 12 (and dielectric 13) as shown in FIG. 22. Sealing part 50 can reduce deterioration of first electrode 11 and third electrode 16 (and second electrode 12 and dielectric 13) of the pressure-sensitive element, and can improve long-term reliability. FIG. 22 is a schematic bottom view of the second elastic sheet, and is a diagram for explaining arrangement of sealing part 50 in second elastic sheet 40.

Sealing part 50 is not limited as long as sealing between first elastic sheet 20 and second elastic sheet 40 can be achieved, and sealing part 50 can be formed by, for example, a silicone rubber-based adhesive or the like.

Pressure-sensitive element 100 of the present disclosure generally has connector 60A electrically connected to the plurality of first electrodes 11 and connector 60B electrically connected to the plurality of second electrodes 12, as shown in FIG. 3 and the like. The capacitance and the changes in capacitance at the intersections (that is, the intersecting parts or cross points) of first electrodes 11 and second electrodes 12 in a plan view are measured through connectors 60A and 60B described above. Connectors 60A and 60B are not limited as long as the measurement can be performed with an electrical connection between first electrodes 11 and second electrodes 12, and known connectors can be used.

[Method of Manufacturing Pressure-Sensitive Element of the Present Disclosure]

Pressure-sensitive element 100 of the present disclosure can be manufactured, for example, by a method including the following steps: a step of manufacturing first elastic sheet 20 including the plurality of first electrodes 11 and first insulating part 18; a step of installing second electrodes 12 having dielectric 13 on the surface of first elastic sheet 20; a step of connecting connectors 60A and 60B to first elastic sheet 20 on which second electrodes 12 are installed; and a step of laminating second elastic sheet 40 to first elastic sheet 20 to which connectors 60A and 60B are connected.

Figure 23:
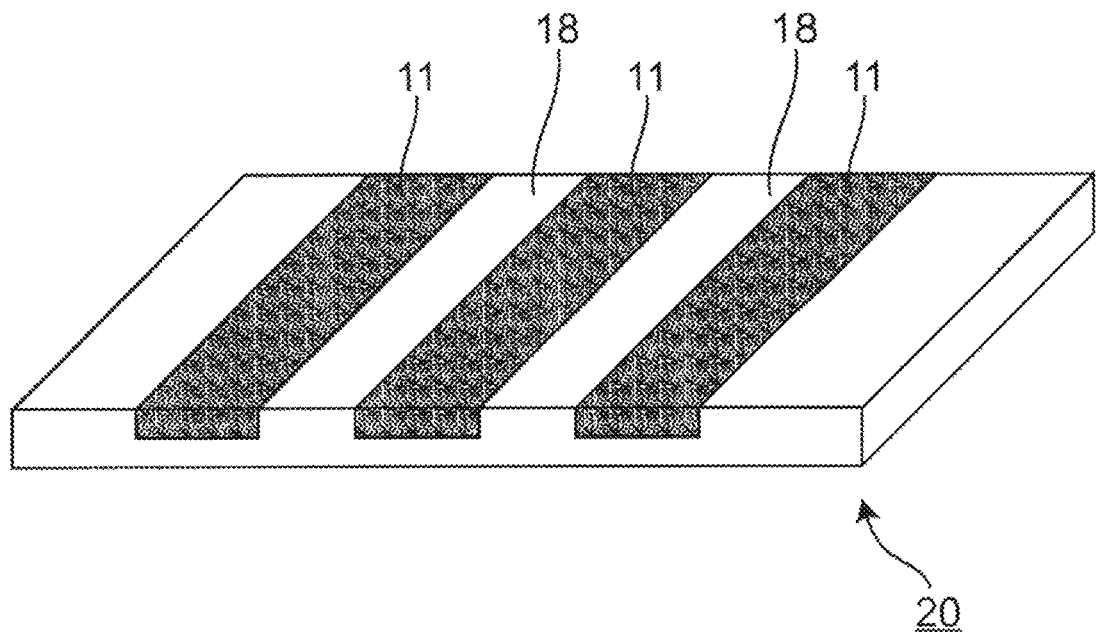
FIG. 23 is a schematic perspective view of one step of the method of manufacturing the pressure-sensitive element.

In the step of manufacturing first elastic sheet 20, for example, first elastic sheet 20 shown in FIG. 23 is obtained by using a known method of molding with a mold. Specifically, it is sufficient to adopt the above method shown in FIGS. 11A to 11D and the above method shown in FIGS. 12A to 12D in accordance with the cross-sectional shape of first electrode 11. FIG. 23 is a schematic perspective view of one step of a method of manufacturing the pressure-sensitive element.

Figure 24:
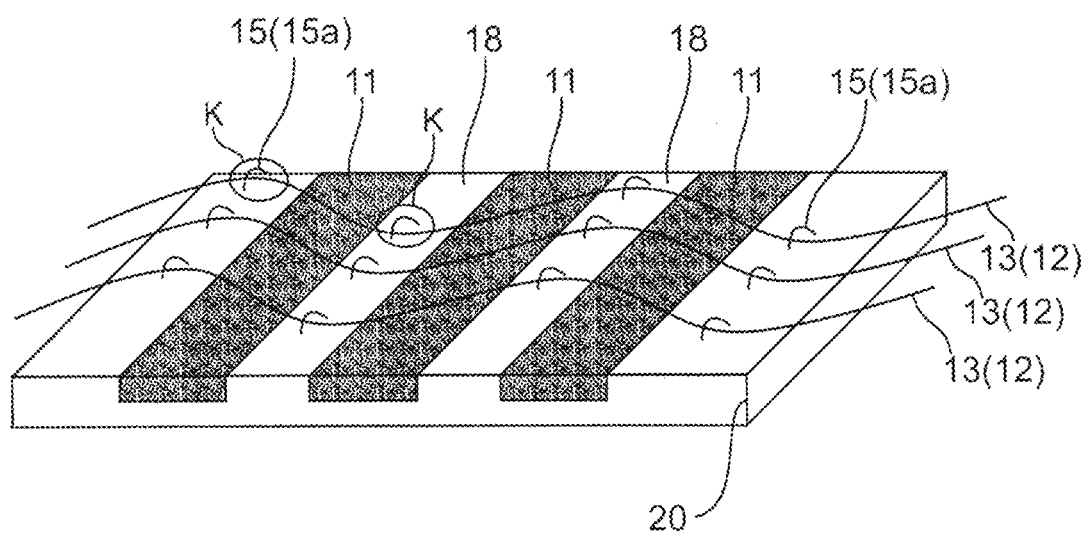
FIG. 24 is a schematic perspective view of one step of the method of manufacturing the pressure-sensitive element.

In the step of installing second electrodes 12, first, bent parts K are formed on second electrodes 12 in a desired arrangement, and second electrodes 12 are arranged on first elastic sheet 20. Next, each second electrode 12 is restrained to first elastic sheet 20 at a desired position by restraining member 15. For example, as shown in FIG. 24, connecting thread 15a is used at a desired position and with a desired stitch to sew and connect second electrodes 12 to first elastic sheet 20. FIG. 24 is a schematic perspective view of one step in the method of manufacturing the pressure-sensitive element.

In the step of connecting the connectors, for example, as shown in FIG. 20, connectors 60A and 60B are connected to first elastic sheet 20 on which second electrodes 12 are installed, and, if desired, first insulating layer 30 is disposed and adhered onto the side of first elastic sheet 20 opposite to second electrode 12. A method of adhering is not limited as long as the adhesion between first elastic sheet 20 and first insulating layer 30 is achieved, and examples of the method include a method using an adhesive such as a silicone rubber-based adhesive. An application region of the adhesive may be an entire surface or a part (for example, a peripheral edge) of first insulating layer 30, but is preferably the entire surface of first insulating layer 30 in terms of sealing a through hole provided in first elastic sheet 20 by restraining member 15.

In the step of laminating second elastic sheet 40, as shown in FIG. 21, second elastic sheet 40 is attached to first elastic sheet 20 such that second electrodes 12 (and dielectrics 13) are sandwiched between first elastic sheet 20 and second elastic sheet 40. A method of laminating is not limited as long as the adhesion between first elastic sheet 20 and second elastic sheet 40 is achieved, and examples of the method include a method using an adhesive such as a silicone rubber-based adhesive. The application region of the adhesive is preferably the peripheral edge of second elastic sheet 40 (that is, region of sealing part 50) as shown in FIG. 22 in terms of the extension and bending of second electrodes 12 (and dielectrics 13) during expansion and contraction of pressure-sensitive element 100 and the sealing between first elastic sheet 20 and second elastic sheet 40.

(Use of Pressure-Sensitive Element of Present Disclosure)

The pressure-sensitive element of the present disclosure can be suitably used as a sensor element in various management systems and various electronic devices.

Examples of management systems include a shortage management system (shopping basket, logistics management, refrigerator goods, and inventory management), a vehicle management system (or driver monitoring system) (seat, steering device, switch around console (allowing analog input)), a coaching management system (shoes and clothing), a security management system (all contact parts), a nursing care and childcare management system (functional bedding and functional toilet seat goods), and the like.

The vehicle management system (or driver monitoring system) monitors a distribution of pressure applied to a steering device by a driver (that is, gripping force or gripping position) and changes in the distribution and a distribution of pressure applied to an in-vehicle seat by the driver (sitting state) (for example, center of gravity position) and changes in the distribution. This makes it possible to grasp a driving state, read a condition of the driver (sleepiness, psychological state, and the like), and provide feedback. The coaching management system is a system that can monitor the center of gravity or load distribution of the human body (for example, the sole of the foot) and changes in the center of gravity or the load distribution, and correct or guide a state to an appropriate state or a comfortable state. The security management system can, for example, read a weight, stride length, passing speed, sole pattern, and the like simultaneously when a person passes by and identify the person by collating with data. The nursing care and childcare management system is a system that monitors a distribution of pressure applied to a bed, a toilet seat, or the like by a human body or a center of gravity of the pressure and changes in the distribution or the center of gravity, and estimates a behavior, and prevents overturn and fall.

Examples of electronic devices include in-vehicle devices (car navigation systems, audio equipment, and the like), home appliances (electric kettles, IH cooking heaters, and the like), smartphones, electronic paper, electronic book readers, and the like. By being applied to various management systems and various electronic devices as described above, the pressure-sensitive element of the present disclosure can be used as a touch sensor element (pressure-sensitive sheet, operation panel, operation switch, and the like) that is more convenient for a user than ever before.

For example, a case where the pressure-sensitive element of the present disclosure is applied to a steering device of a moving body will be described in detail. Examples of the moving body include an automobile, a ship, an airplane, and the like. Examples of the steering device include a steering wheel shown in FIG. 25A. FIG. 25A shows a grip of the steering wheel with a reference sign 200. In this case, the pressure-sensitive element is preferably provided on which fingers are placed when the human grips grip 200 by hand. At this time, the pressure-sensitive element is preferably provided in consideration of front and rear directions of the pressure-sensitive element such that the pressure force is applied in a direction from the first electrode to the second electrode. The pressure-sensitive part of the pressure-sensitive element is generally provided such that first electrode 11 is disposed on an outer side and second electrode 12 is disposed on an inner side in a positional relationship between first electrode 11 and second electrode 12.

Specifically, FIG. 25B shows an exemplary embodiment in which pressure-sensitive element 100 of the present disclosure is applied to a steering wheel of an automobile. As shown in FIG. 25B, pressure-sensitive element 100 is mounted on an outer peripheral curved surface of grip 200 of the steering wheel. At this time, pressure-sensitive element 100 is disposed such that first electrode 11 is disposed on the outer side and third electrode 16 is disposed on the inner side in a relative positional relationship between first electrode 11, second electrode 12, and third electrode 16. More specifically, pressure-sensitive element 100 is mounted such that an outer surface of third electrode 16 comes into contact with the outer peripheral curved surface of grip 200.

A method of mounting is not limited as long as the pressure-sensitive part is fixed to the grip, and for example, an adhesive is useful. In FIG. 25B, it seems that a gap is formed between the outer surface of third electrode 16 and the outer peripheral curved surface of grip 200, but the gap is generally filled with an adhesive.

In the detector (not shown) of pressure-sensitive element 100, terminal T11 to which first electrode 11 is electrically connected is preferably connected to a ground of a main body of the moving body.

Use of the pressure-sensitive element of the present disclosure can be classified into interpersonal pressure-sensitive use and non-interpersonal pressure-sensitive use. The interpersonal pressure-sensitive use is use for monitoring pressure caused by the human body, and includes, among the above uses, for example, the vehicle management system (or driver monitoring system), the coaching management system, the security management system, and the nursing care and childcare management system. The non-interpersonal pressure-sensitive use is use for monitoring pressure caused by an object other than the human body, and includes, for example, a shortage management system among the above uses.

Example 11

(Experimental Example 1) (Examination of Rubber Base Material)

Figure 26:
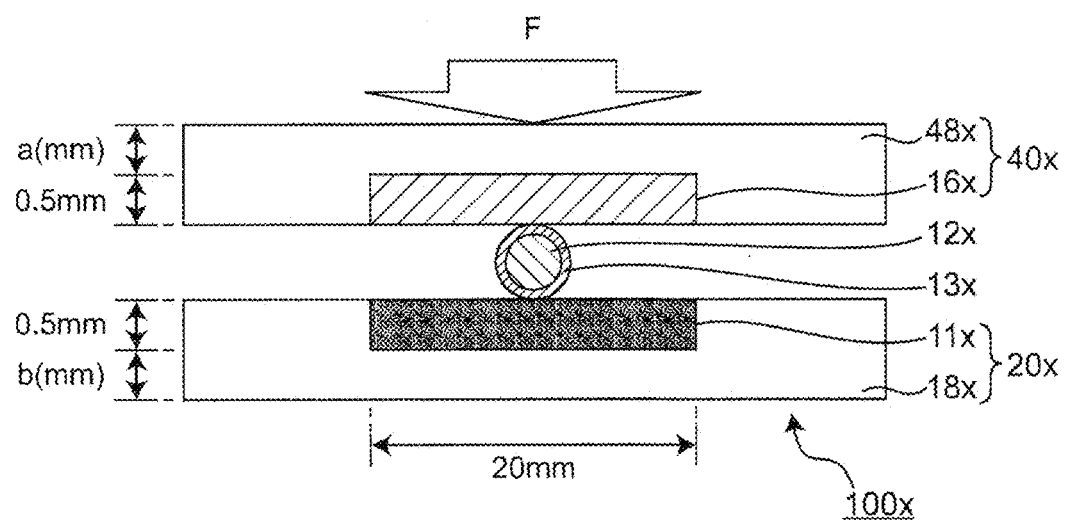
FIG. 26 is a schematic cross-sectional view of the pressure-sensitive element used in Example (Experimental Example 1)

Pressure-sensitive element $100x$ shown in FIG. 26 was manufactured. In pressure-sensitive element $100x$, second electrode $12x$ of which surface is covered with dielectric $13x$ is sandwiched between first electrode $11x$ of first elastic sheet $20x$ and third electrode $16x$ of second elastic sheet $40x$. First elastic sheet $20x$ includes first electrode $11x$ and first insulating part $18x$ having dimensions shown in FIG. 26. Second elastic sheet $40x$ includes third electrode $16x$ and second insulating part $48x$ having dimensions shown in FIG. 26. FIG. 26 is a schematic cross-sectional view of the pressure-sensitive element used in Example 1 (Experimental Example 1).

First electrode $11x$ includes conductive rubber including silicone rubber and a conductive filler (conductive carbon). The elastic modulus was $10^6$ Pa and the conductivity was 10 Ω·cm. First insulating part $18x$ includes insulating rubber including silicone rubber. The elastic modulus was $10^5$ Pa and the conductivity was $10^7$ Ω·cm.

Second electrode $12x$ and dielectric $13x$ configure a single insulation-coated metal wire, and one enamel wire (diameter of 1 mm, dielectric thickness of about 16 μm to 30 μm inclusive) is used as the single insulation-coated metal wire.

Third electrode $16x$ includes conductive rubber including silicone rubber and a conductive filler (conductive carbon). The elastic modulus was $10^6$ Pa and the conductivity was 25 Ω·cm. Second insulating part $48x$ includes insulating rubber including silicone rubber. The elastic modulus was $10^5$ Pa and the conductivity was $10^7$ Ω·cm.

A pressure-sensitive element was manufactured for each combination of a=0.2 mm, 0.5 mm, or 1.0 mm and b=0.2 mm, 0.5 mm, or 1.0 mm.

Figure 27:
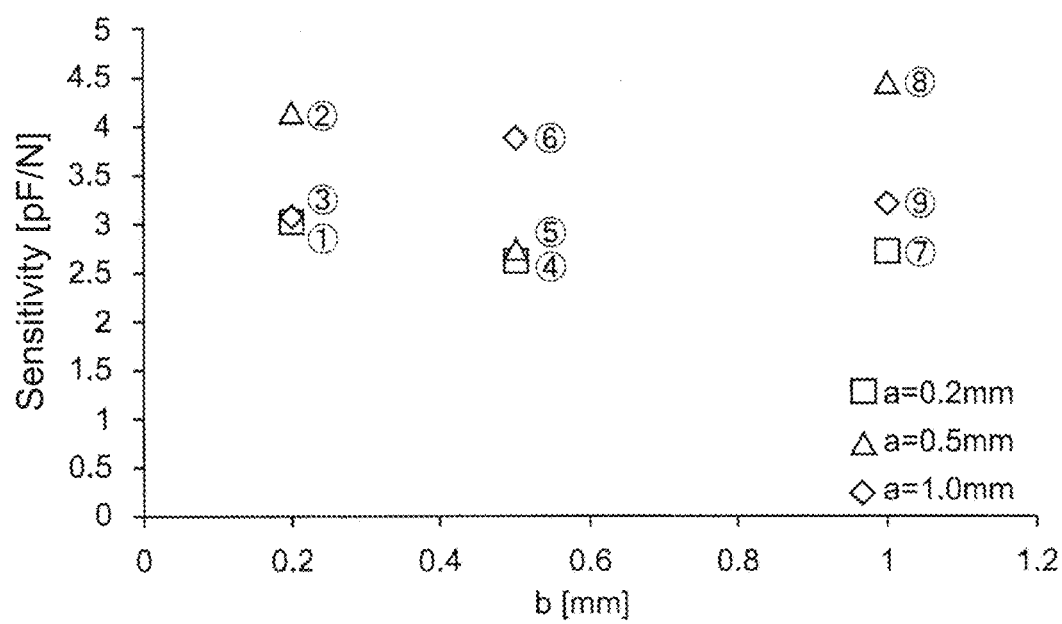
FIG. 27 is a graph of evaluation results of Example (Experimental Example 1)

For each pressure-sensitive element, pressure force F was changed in a range of 0 N to 50 N inclusive three times, and the capacitance was measured. At each time, a sensitivity (pF/N) when the pressure force was 5 N was obtained, and an average value was calculated. The results are shown in Table 1 and FIG. 27. The larger the value of sensitivity, the more preferable the sensitivity. FIG. 27 is a graph of evaluation results of Example (Experimental Example 1).

TABLE 1

| Sensitivity at 5N [pF/N] | | Third electrode side a (mm) | | |
| --- | --- | --- | --- | --- |
| | | 0.2 | 0.5 | 1.0 |
| First electrode side b (mm) | 0.2 | 3.014 | 4.14 | 3.054 |
| | 0.5 | 2.6 | — | 3.86 |
| | 1.0 | 2.7 | 4.44 | 3.21 |

"—" indicates no measurement performed.

(Experimental Example 2) (Examination of Stranded Wire)

Figure 28:
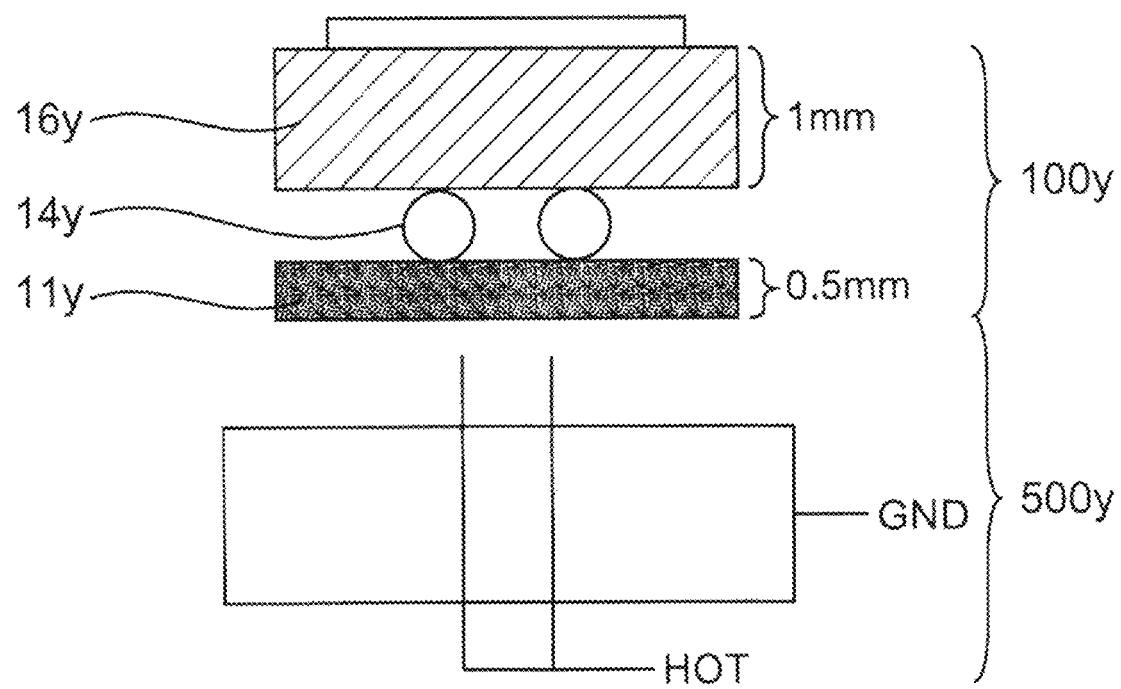
FIG. 28 is a schematic diagram of a pressure-sensitive sensor evaluation mechanism used in Example (Experimental Example 2)

Using a pressure-sensitive sensor evaluation mechanism as shown in FIG. 28, use of stranded wire 14y in pressure-sensitive element 100y was examined.

In pressure-sensitive element 100y, stranded wire 14y is sandwiched between first electrode 11y and third electrode 16y. First electrode 11y includes conductive rubber including silicone rubber and a conductive filler (conductive carbon). The elastic modulus was $10^6$ Pa and the conductivity was 10 Ω·cm.

As stranded wire 14y, a stranded wire formed by twisting ten insulation-coated metal wires (enamel wires; dielectric thickness of about 3 μm to 5 μm inclusive) having a diameter of 0.05 mm is used. Third electrode 16y includes conductive rubber including a silicone rubber and a conductive filler (carbon nanotube). The elastic modulus was $10^6$ Pa and the conductivity was 25 Ω·cm.

In pressure measuring part 500y, a measurement instrument (4263B LCR meter manufactured by Keysight Technologies) was used under the following conditions: measurement frequency of 10 kHz, voltage of 1 V, integration time of 65 msec (MID), with open correction.

(1) Characteristic Variation Due to Shape Deformation of Stranded Wire

Figure 29:
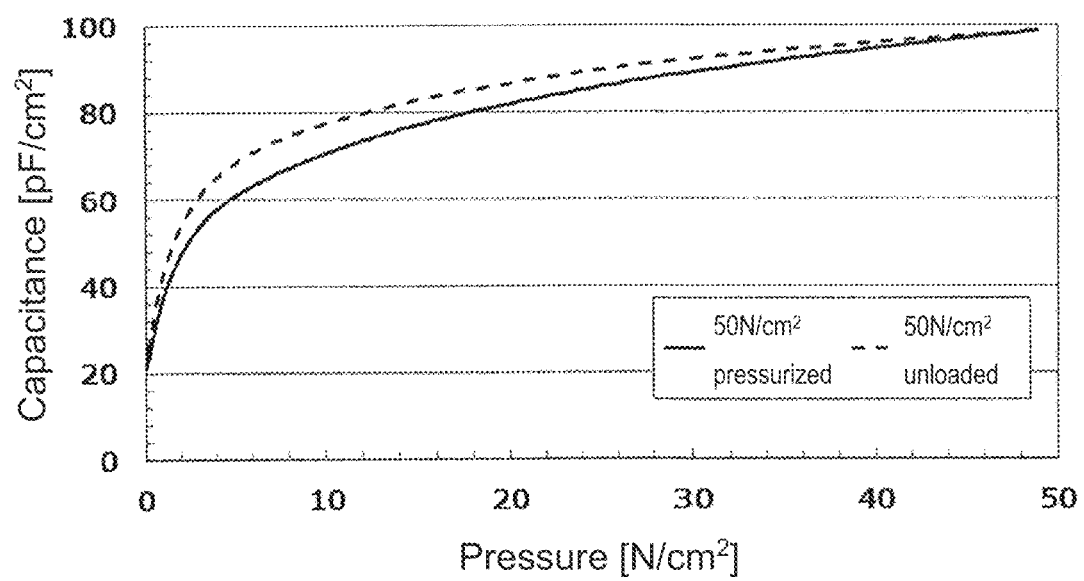
FIG. 29 is a graph of evaluation results related to "(1) characteristic variation due to shape deformation of stranded wire" in Example (Experimental Example 2)
Figure 30:
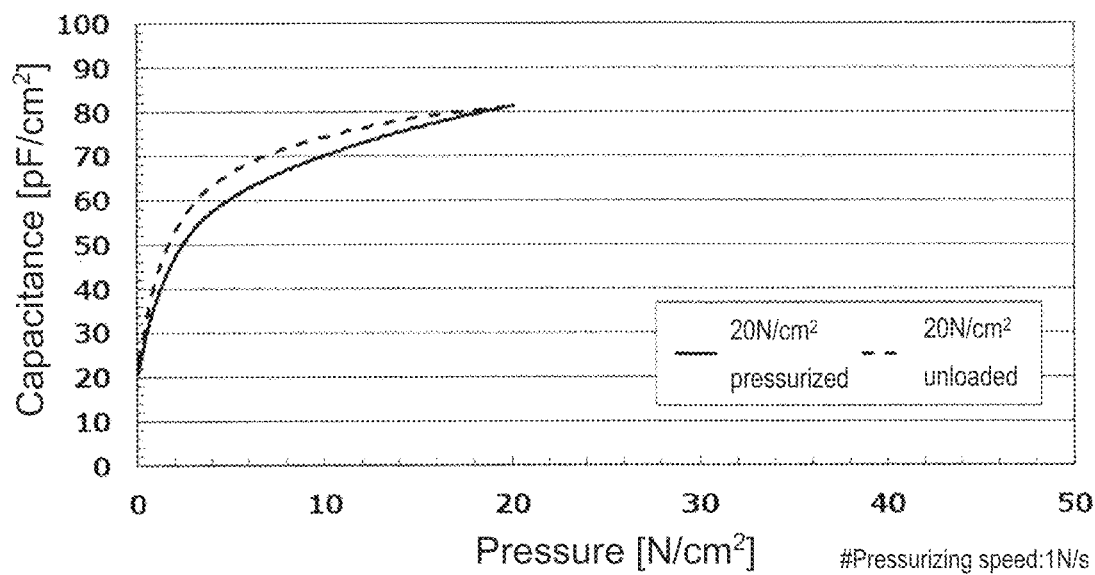
FIG. 30 is a graph of evaluation results related to "(1) characteristic variation due to shape deformation of stranded wire" in Example (Experimental Example 2)
Figure 31:
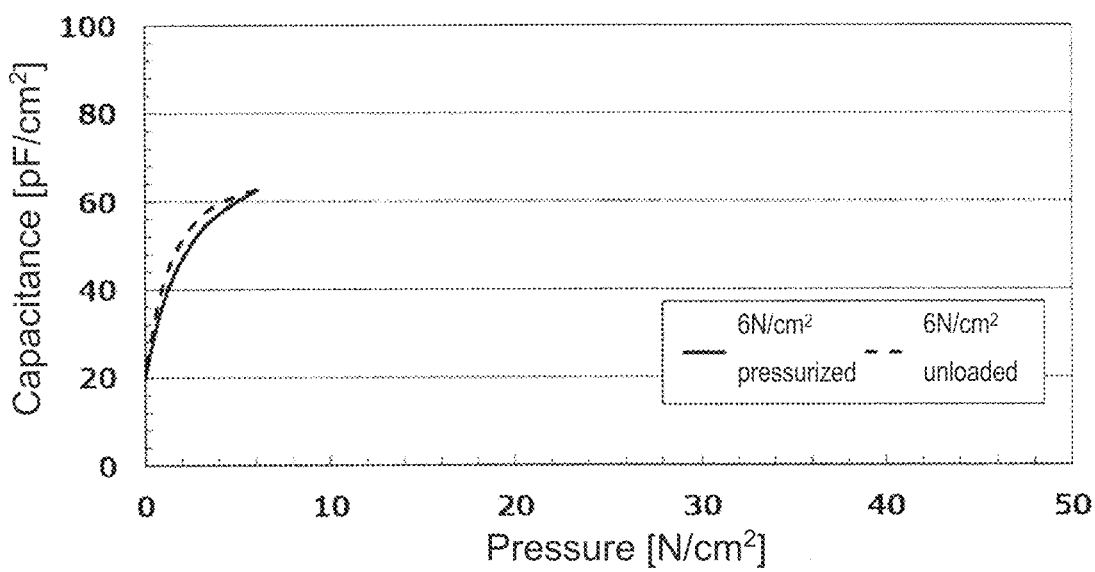
FIG. 31 is a graph of evaluation results related to "(1) characteristic variation due to shape deformation of stranded wire" in Example (Experimental Example 2)

In the pressure-sensitive element, pressure force F was changed in a range of 0 N/cm² to 50 N/cm² inclusive under the following conditions, and the capacitance was measured. The results are shown in FIGS. 29 to 31.

In the results, almost the same pressure-sensitive characteristics were confirmed regardless of the measurement pressure under each condition, and it was therefore clarified that there was no characteristic variation due to a shape deformation of the stranded wire.

(2) Characteristic Variation Due to Deterioration of Stranded Wire

Figure 32:
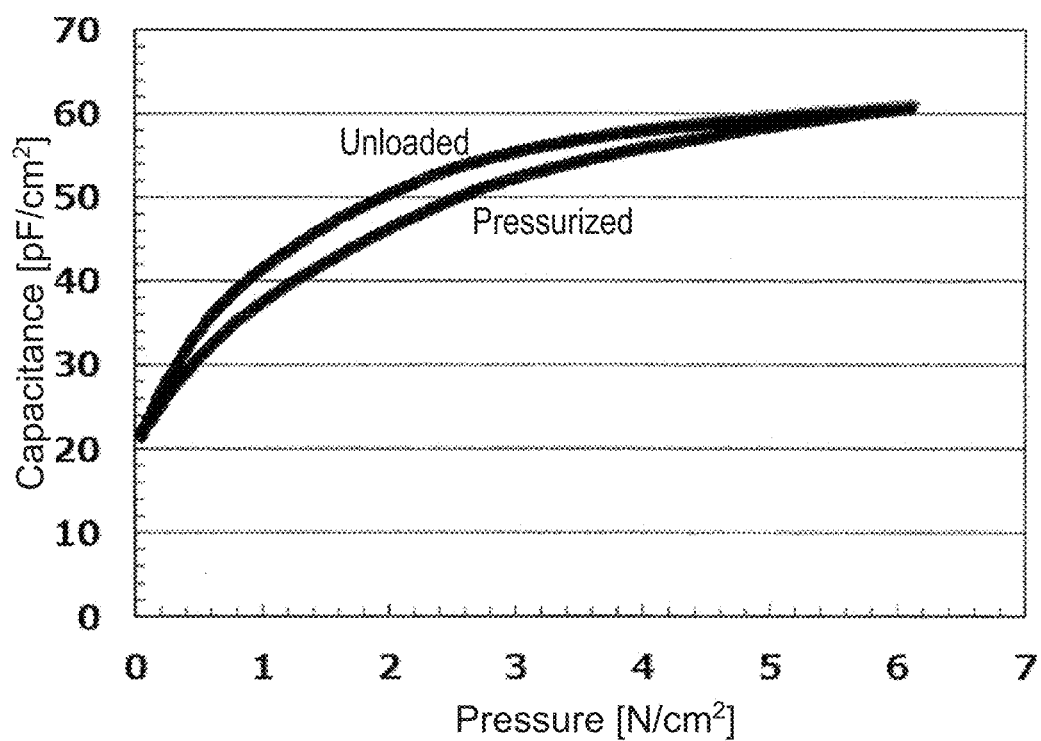
FIG. 32 is a graph of evaluation results related to "(2) characteristic variation due to deterioration of stranded wire" in Example (Experimental Example 2)

The stranded wire was hit (6 N/cm²) up to 10,000 times. In the pressure-sensitive element using such a stranded wire, pressure force F was changed in a range of 0 N/cm² to 6 N/cm² inclusive under the following conditions, and the capacitance was measured. The results are shown in FIG. 32. The measurement conditions are "1,000 hits, pressurized", "1,000 hits, unloaded", "2,000 hits, pressurized", "2,000 hits, unloaded", "3,000 hits, pressured", "3,000 hits, unloaded", "4,000 hits, pressurized", "4,000 hits, unloaded", "5,000 hits, pressurized", "5,000 hits, unloaded", "6,000 hits, pressurized", "6,000 hits, unloaded", "7,000 hits, pressurized", "7,000 hits, unloaded", "8,000 hits, pressurized", "8,000 hits, unloaded", "9,000 hits, pressurized", "9,000 hits, unloaded", "10,000 hits, pressurized", and "10,000 hits, unloaded".

Figure 33:
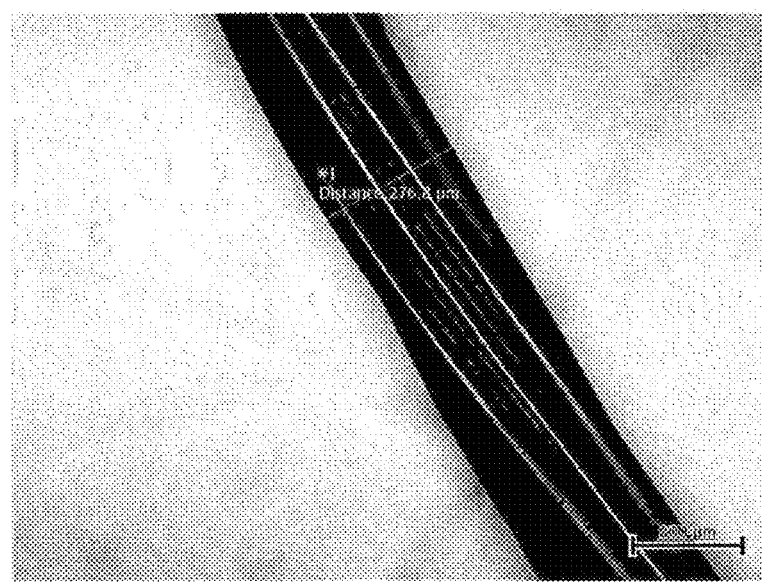
FIG. 33 is a diagram of an optical micrograph of the stranded wire before 10,000 hits in the evaluation related to "(2) characteristic variation due to deterioration of stranded wire" in Example (Experimental Example 2)
Figure 34:
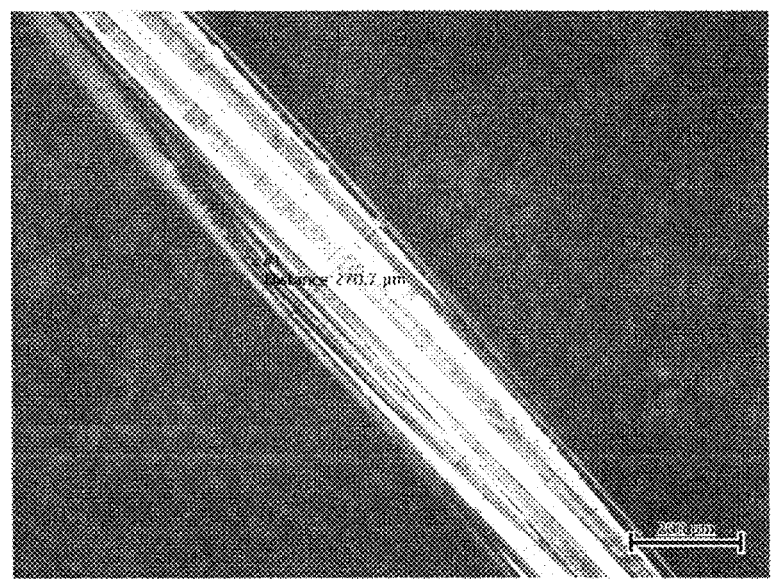
FIG. 34 is a diagram of an optical micrograph of the stranded wire after 10,000 hits in the evaluation related to "(2) characteristic variation due to deterioration of stranded wire" in Example (Experimental Example 2)

In FIG. 32, the measurement results of "1,000 to 10,000 hits, pressurized" overlap, and the measurement results of "1,000 to 10,000 hits, unloaded" overlap. FIG. 33 shows an optical micrograph of the stranded wire before 10,000 hits. A wire diameter of the stranded wire was about 276 μm. FIG. 34 is an optical micrograph of the stranded wire after 10,000 hits. The wire diameter of the stranded wire was about 270 μm. The results clarified that there was no characteristic change or appearance change (or shape change) due to deterioration of the stranded wire such as the shape deformation of the stranded wire due to pressing.

(3) Comparison Between Stranded Wire and Single Wire

Figure 35:
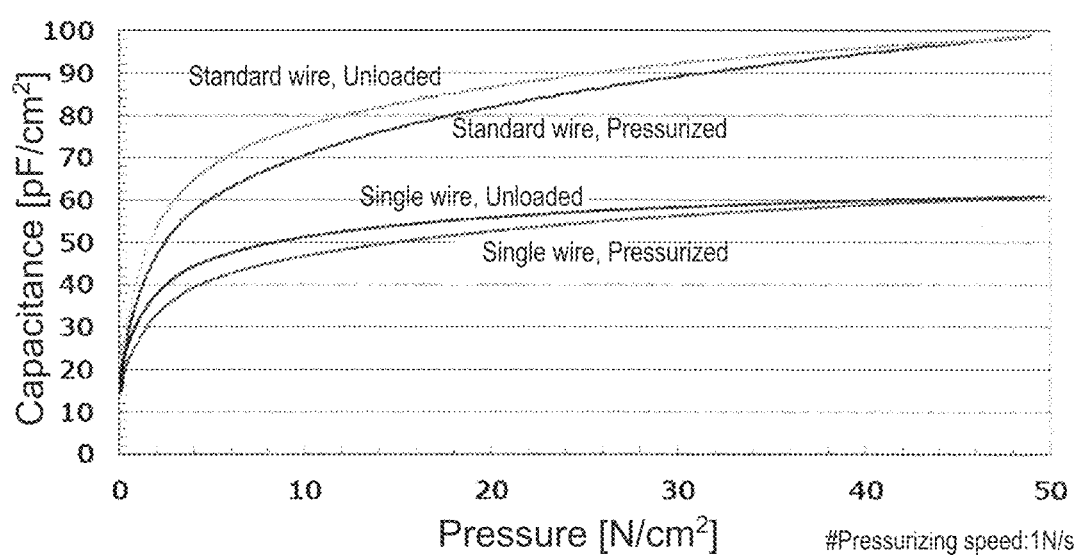
FIG. 35 is a graph of evaluation results related to "(3) comparison between stranded wire and single wire" in Example (Experimental Example 2)

In the pressure-sensitive element using the stranded wire, pressure force F was changed in a range of 0 N/cm² to 50 N/cm² inclusive in the following conditions, and the capacitance was measured. The results are shown in FIG. 35.

On the other hand, the capacitance was measured by a similar method to above except that an enamel wire (diameter of about 0.3 mm, dielectric thickness of about 10 μm) was used as a single wire instead of stranded wire 14y. The results are shown in FIG. 35.

The results have revealed the following phenomena.

Also when the single wire was used, a sufficiently good measurement range of pressure force and pressure sensitivity were obtained. When the stranded wire was used, a better measurement range of pressure force and pressure sensitivity were obtained than when the single wire was used.

[Electronic Device of Present Disclosure]

The electronic device of the present disclosure will be described in detail below with reference to the drawings. The "plan view" as used herein refers to a state (top view or bottom view) when an object is viewed from above or below (particularly, above) along a thickness direction. Further, the "cross-sectional view" referred to in the present specification is a cross-sectional state (cross-sectional view) when viewed from a direction perpendicular to the thickness direction. It should be noted that various elements shown in the drawings are only schematically shown for the present disclosure to be understood, and a dimensional ratio, appearance, or the like in the drawings may differ from actual ones. An "up-down direction", "left-right direction", and "front-rear direction" directly or indirectly used herein correspond to directions corresponding to an up-down direction, left-right direction, and front-rear direction in the drawings, respectively. The same reference signs or symbols indicate the same members or the same meanings unless otherwise specified. In one preferred aspect, it can be considered that a vertical downward direction (that is, a direction in which gravity acts) corresponds to a "downward direction" and a direction opposite to the vertical downward direction corresponds to an "upward direction".

First Exemplary Embodiment

Figure 36A:
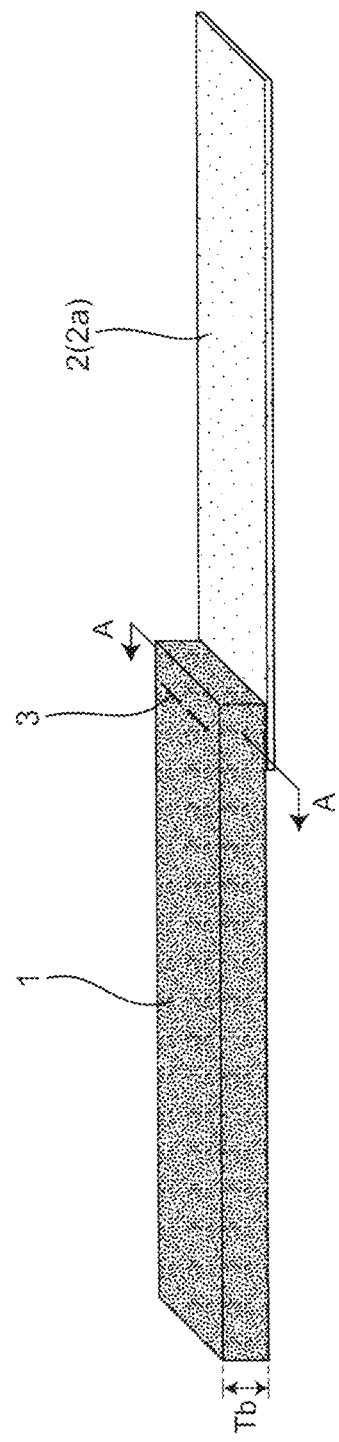
FIG. 36A is a schematic perspective view of an example of a basic structure of an electronic device according to a first exemplary embodiment of the present disclosure.

An electronic device according to a first exemplary embodiment of the present disclosure has a connector structure including an element (particularly, conductive elastic body 1), a lead-out wire, and connecting thread 3, for example, as shown in FIG. 36A.

The element included in the electronic device according to the first exemplary embodiment of the present disclosure is not limited as long as the element includes conductive elastic body 1 having both conductive properties and elastic properties and requires electrical drawing from conductive elastic body 1. The electrical drawing from the conductive elastic body means that the conductive elastic body is electrically connected to another member. A purpose of electrical drawing from the conductive elastic body is not limited, and may be, for example, to measure capacitance, voltage, current, electrical resistance, or other electrical properties (or changes thereof) in the element (for example, conductive elastic body 1). Examples of such an element include a pressure-sensitive element, a touch sensor, an acceleration detection element, a photo sensor, an acoustic sensor, a display, and the like, which will be described later. When the electronic device according to the first exemplary embodiment of the present disclosure includes a pressure-sensitive element as an element, the electronic device may also be referred to as a "pressure-sensitive device".

The elastic properties of conductive elastic body 1 are properties of being locally deformed by external force (for example, normal pressure force applied to the pressure-sensitive device in the interpersonal pressure-sensitive use: for example, pressure force of about 0.1 N/cm$^2$ to 100 N/cm$^2$ inclusive) and returning to an original shape when the external force is removed. The elastic modulus of conductive elastic body 1 is not limited in terms of alleviating the stress concentration and reducing contact resistance between the conductive elastic body and the lead-out wire, and is, for example, from about $10^5$ Pa to $10^{12}$ Pa inclusive. In terms of further alleviating the stress concentration between the conductive elastic body and the lead-out wire and further reducing the contact resistance in the interpersonal pressure-sensitive use (particularly, use for the pressure-sensitive device described later), the elastic modulus of conductive elastic body 1 is preferably from about $10^5$ Pa to $10^8$ Pa inclusive, and more preferably, for example, about $10^6$ Pa. The elastic modulus can be adjusted, for example, by changing a cross-linking density. The cross-linking density can be adjusted by an amount of cross-linking material added. The interpersonal pressure-sensitive use refers to use for monitoring pressure caused by a human body, as will be described later.

The conductive properties of conductive elastic body 1 may be conductive properties according to a type, use, and function of the electronic device. The resistivity of conductive elastic body 1 is not limited in terms of alleviating the stress concentration and reducing the contact resistance between the conductive elastic body and the lead-out wire, and may be sufficiently larger than the impedance of capacitance in a desired frequency band, for example. The resistivity of conductive elastic body 1 is, for example, less than or equal to 300 Ω·cm, particularly from 0.00001 Ω·cm to 300 Ω·cm inclusive, preferably from 1 Ω·cm to 100 Ω·cm inclusive in terms of further alleviating the stress concentration and further reducing the contact resistance between the conductive elastic body and the lead-out wire in the interpersonal pressure-sensitive use (particularly, use for the pressure-sensitive device described later), and more preferably, for example, 25 Ω·cm. This resistivity can be adjusted by changing a relative ratio of the conductive filler and the resin material (rubber material) described later.

Conductive elastic body 1 may also be referred to as an expandable member. Conductive elastic body 1 may include any material as long as elastic base material 19 has both the elastic properties and the conductive properties as described above. For example, conductive elastic body 1 may include a resin material (particularly a rubber material) and a conductive resin including a conductive filler dispersed in the resin material. In terms of further alleviating the stress concentration and further reducing the contact resistance between the conductive elastic body and the lead-out wire in the interpersonal pressure-sensitive use (particularly, use for the pressure-sensitive device described later), preferred conductive elastic body 1 includes conductive rubber including a rubber material and a conductive filler dispersed in the rubber material. The resin material of conductive elastic body 1 may be at least one resin selected from the group consisting of, for example, styrene-based resin, silicone-based resin (for example, polydimethylpolysiloxane (PDMS)), acrylic-based resin, rotaxane-based resin, urethane-based resin, and the like. The rubber material of conductive elastic body 1 may be at least one rubber material selected from the group consisting of, for example, silicone rubber, isoprene rubber, butadiene rubber, styrene-butadiene rubber, chloroprene rubber, nitrile rubber, polyisobutylene, ethylene propylene rubber, chlorosulfonated polyethylene, acrylic rubber, fluororubber, epichlorohydrin rubber, urethane rubber, and natural rubber. One preferred material for conductive elastic body 1 is silicone rubber. The rubber material may include various cross-linking materials depending on a type of rubber. The conductive filler may include at least one material selected from the group consisting of carbon materials such as carbon nanotubes, carbon black, graphite, and carbon (C); metal materials such as gold (Au), silver (Ag), copper (Cu), zinc oxide (ZnO), indium (III) oxide ($In_2O_3$), and tin (IV) oxide ($SnO_2$); conductive polymer materials such as PEDOT:PSS (that is, composite including poly (3,4-ethylene dioxythiophene) (PEDOT) and polystyrene sulfonic acid (PSS)); and conductive fibers such as metal coated organic fibers and metal wires (fiber state). A shape of the conductive filler is preferably a shape in which conductive fillers easily come into contact with each other, and may be spherical, elliptical (cross-sectional shape), carbon nanotube shape, graphene shape, tetrapod shape, or nanorod shape. The conductive filler may have an additive for improving dispersibility, such as a dispersant, attached to a surface (surface layer). As the conductive filler, two or more kinds of conductive fillers having different dimensions, shapes, and types may be used. Further, a conductive layer may be used instead of or in addition to the conductive filler. Specifically, the conductive elastic body may be configured by a conductive layer provided on a surface of a resin structure (particularly, a rubber structure) including the above resin material (particularly, a rubber material), the conductive layer having a conductive ink or the like applied to the surface.

A thickness of conductive elastic body 1 (particularly, a thickness of a part of conductive elastic body 1 that overlaps with the lead-out wire described later) Tb is not limited, and may be, for example, from 0.05 mm to 100 mm inclusive. In terms of further alleviating the stress concentration and further reducing the contact resistance between the conductive elastic body and the lead-out wire in the interpersonal pressure-sensitive use (particularly, use for the pressure-sensitive device described later), thickness Tb of conductive elastic body 1 is preferably from 0.05 mm to 10 mm inclusive, more preferably from 0.05 mm to 5 mm inclusive, further preferably from 0.05 mm to 1 mm inclusive, and particularly preferably, for example, about 0.1 mm.

The lead-out wire is conductive cloth 2 having conductive part 2a, and is led out from the element. "The lead-out wire is led out from the element" means that conductive part 2a of conductive cloth 2 configuring the lead-out wire is electrically connected to conductive elastic body 1 of the element. In the present exemplary embodiment, conductive cloth 2 is used as the lead-out wire, and a direct contact and an electrical connection between conductive part 2a of conductive cloth 2 and conductive elastic body 1 are achieved by connecting thread 3 described later. This more sufficiently alleviates the stress concentration and more sufficiently reduces the contact resistance between the conductive elastic body and the lead-out wire. Furthermore, particularly in a case where the element is an element provided at a part that clothing and a human body are brought into contact with each other (for example, a pressure-sensitive element), the electronic device according to the first exemplary embodiment of the present disclosure gives relatively little feeling of a foreign substance and has a relatively high connection reliability with respect to external force when the human body is brought into contact with a connection part between the element (particularly, conductive elastic body 1) and the lead-out wire (particularly, conductive part 2a). For example, when conductive elastic body 1 and the lead-out wire are connected by using an adhesive, stress is concentrated at an interface between the adhesive layer and the conductive elastic body, and peeling or breakage may occur due to external force. At this time, even if the adhesive has conductivity, the electrical resistance between the conductive elastic body and the lead-out wire increases, and the measurement accuracy of the electronic device decreases. The contact resistance is a contact resistance between conductive elastic body 1 and the lead-out wire, and may also be referred to as "connection resistance". In the present exemplary embodiment, the conductive cloth as the lead-out wire may be particularly referred to as a "connector".

Conductive part 2a of conductive cloth 2 and conductive elastic body 1 of the element are in surface contact with each other. Specifically, at least a part (generally, a part) of a surface of conductive part 2a of conductive cloth 2 and at least a part (generally, a part) of a surface of conductive elastic body 1 of the element are in surface contact with each other. More specifically, conductive cloth 2 is brought into contact with the element along the surface of the element, and thus at least a part of the surface of conductive part 2a of conductive cloth 2 and at least a part of the surface of conductive elastic body 1 of the element are in direct surface contact with each other. The contact area between conductive part 2a and conductive elastic body 1 is not limited as long as an electrical connection between conductive part 2a and conductive elastic body 1 is sufficiently achieved, and is, for example, more than or equal to 1 mm$^2$, particularly from 1 mm$^2$ to 500 mm$^2$ inclusive, preferably from 10 mm$^2$ to 100 mm$^2$ in terms of further reducing the contact resistance and sewing conductive part 2a and conductive elastic body 1, and more preferably, for example, 100 mm$^2$.

Figure 36B:
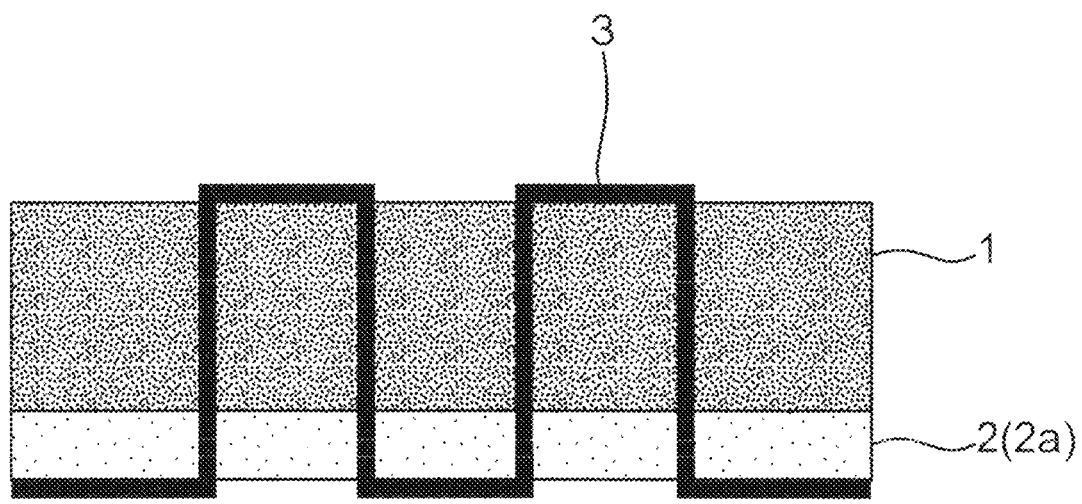
FIG. 36B is a schematic cross-sectional view of the electronic device of the present disclosure in FIG. 36A taken along line A-A when viewed in a direction of an arrow.

FIGS. 36A and 36B show a structure related to drawing from one conductive elastic body 1 by one conductive part 2a (that is, an electrical connection between one conductive elastic body 1 and one conductive part 2a), but the structure is not limited to this. For example, when the element has two or more conductive elastic bodies 1, conductive part 2a preferably has a pattern shape corresponding to two or more conductive elastic bodies 1 in the element in conductive cloth 2. "Conductive part 2a has a pattern shape corresponding to conductive elastic bodies 1" means that conductive cloth 2 has a number of conductive parts 2a corresponding to a number of conductive elastic bodies 1 as shown in FIG. 37A and that each conductive part 2a is formed in such a pattern shape as to be led out from each conductive elastic body 1. As a result, as shown in FIGS. 37B and 37C, each conductive elastic body 1 and each conductive part 2a are electrically connected to each other by stitching with connecting thread 3 described later. In general, the pattern shape may be a shape in which two or more conductive parts 2a have a parallel relationship with each other in a plan view. FIG. 37A is a schematic perspective view for explaining a method of drawing out conductive cloth 2 from two or more conductive elastic bodies 1. FIG. 37B is a schematic perspective view of an example of a basic structure of the electronic device according to the first exemplary embodiment of the present disclosure obtained by the method of drawing out shown in FIG. 37A. FIG. 37C is a schematic cross-sectional view of the electronic device according to the first exemplary embodiment of the present disclosure in FIG. 37B taken along line 37C-37C when viewed in a direction of an arrow. In FIGS. 37A to 37C, the elongation direction of conductive elastic body 1 is defined as first direction D1, and a direction perpendicular to both first direction D1 and thickness direction D3 of conductive elastic body 1 is defined as second direction D2. Note that first elastic sheet 20 including conductive elastic body 1 shown in FIGS. 37A to 37C is an elastic sheet including conductive elastic body 1 as the first electrode suitable for the pressure-sensitive device.

Conductive cloth 2 may have a form such as a woven fabric, a knitted fabric, a non-woven fabric, or the like or a composite form of these fabrics as long as conductive cloth 2 has conductive part 2a in at least a part of conductive part 2a. Conductive cloth 2, having conductive part 2a in a part of conductive part 2, has non-conductive part 2b in the remaining part as shown in FIGS. 37A to 37C. Conductive cloth 2 generally has one or more conductive parts 2a and one or more non-conductive parts 2b (see FIGS. 37A to 37C).

A surface resistivity of conductive part 2a is not limited as long as the electrical properties of the element (particularly, conductive elastic body 1) can be measured, and is, for example, less than or equal to 10Ω/□ (ohms per square), particularly from 0.0001Ω/□ to 10Ω/□ inclusive, preferably from 0.0001Ω/□ to 5Ω/□ inclusive in terms of expanding the measurement range of pressure force and improving the pressure sensitivity in the interpersonal pressure-sensitive use (particularly use for the pressure-sensitive device described later), and more preferably, for example, 0.03Ω/□. It is sufficient that the thread (or fibers) configuring conductive part 2a has the surface resistivity of conductive part 2a.

A surface resistivity of non-conductive part 2b is not limited as long as a short circuit between two or more conductive parts 2a is prevented, and is, for example, more than or equal to 200Ω/□, particularly from 200Ω/□ to 5×10$^{12}$Ω/□ inclusive in terms of expanding the measurement range of pressure force and improving the pressure sensitivity in the interpersonal pressure-sensitive use (particularly use for the pressure-sensitive device described later), preferably from 10$^3$Ω/□ to 10$^{10}$Ω/□ inclusive, and more preferably, for example, 10$^7$Ω/□. It is sufficient that the thread (or fibers or resin) configuring non-conductive part 2b has the surface resistivity of non-conductive part 2b. Note that "Ω/58" is a unit of surface resistivity.

Conductive cloth 2 may have, for example, the following forms: (form A) a form of cloth including a non-conductive thread and a conductive thread; (form B) a form of cloth in which at least a part of a non-conductive cloth is provided with a resin layer containing conductive particles as conductive part 2a; or (form C) a form of cloth in which at least a part of a non-conductive cloth is provided with a metal layer as conductive part 2a.

Conductive cloth 2 of form A is a cloth including a non-conductive thread and a conductive thread and having a woven fabric, a knitted fabric, a non-woven fabric, or a composite form of these fabrics. Conductive cloth 2 of form A has conductive part 2a in a part and non-conductive part 2b in a remaining part. Conductive part 2a includes a conductive thread. When conductive cloth 2 of form A has non-conductive part 2b, non-conductive part 2b includes a non-conductive thread. Connecting thread 15a may herein have a form of a twisted thread in which the fibers are twisted, or may have a form of a single fiber (that is, a monofilament) which is not twisted.

In form A, the conductive thread may be imparted with conductivity by containing conductive particles in the fibers configuring the thread, or the conductive thread may be imparted with conductivity by forming a metal layer or a resin layer including conductive particles on at least a part of the surface of the fibers configuring the thread (specifically, part of the surface). That is, in form A, the conductive thread may be a thread including fibers including conductive particles in the fibers, a thread configuring fibers having a metal layer or a resin layer including conductive particles on at least a part of a fiber surface, or a mixed thread of these threads. The fibers configuring the conductive thread are generally chemical fibers. The chemical fibers may be synthetic fibers, semi-synthetic fibers, regenerated fibers, and/or inorganic fibers. Examples of the synthetic fibers include polystyrene fibers, aliphatic polyamide fibers (for example, nylon 6 fibers and nylon 66 fibers), aromatic polyamide fibers, polyvinyl alcohol fibers (for example, vinylon fibers), polyvinylidene chloride fibers, polyvinyl chloride fibers, polyester fibers (for example, polyester fibers, PET fibers, PBT fibers, polytrimethylene terephthalate fibers, and polyarylate fibers), polyacrylonitrile fibers, polyethylene fibers, polypropylene fibers, polyurethane fibers, phenol fibers, and polyfluoroethylene fibers. Examples of the semi-synthetic fibers include cellulosic fibers and protein fibers. Examples of the regenerated fibers include rayon fibers, cupra fibers, and lyocell fibers. The chemical fibers can be manufactured by spinning a raw material liquid. At this time, the conductive particles can be contained in the fibers by preliminarily containing the conductive particles in the liquid raw material. Examples of conductive particles include carbon materials such as carbon nanotubes, carbon black, and graphite; metal materials such as gold (Au), silver (Ag), copper (Cu), carbon (C), zinc oxide (ZnO), indium (III) oxide ($In_2O_3$), tin (IV) oxide ($SnO_2$), and the like. An average particle size of the conductive particles is generally from 2 μm to 600 μm inclusive. The metal layer on the fiber surface can be formed by, for example, an electroless plating treatment method, an electrolytic plating treatment method, an electrodeposition plating treatment method, a coating method, a vacuum vapor deposition method, a sputtering vapor deposition method, a metal organic chemical vapor deposition (MOCVD) method, or the like. A conductive particle-containing resin layer on the fiber surface can be formed by immersing the fibers in a resin solution containing similar conductive particles to the above and drying the fibers. Examples of the resin material configuring the conductive particle-containing resin layer include polymer materials such as styrene-based resin, silicone-based resin (for example, polydimethylpolysiloxane (PDMS)), acrylic-based resin, rotaxane-based resin, and urethane-based resin; and rubber materials such as silicone rubber, isoprene rubber, butadiene rubber, styrene-butadiene rubber, chloroprene rubber, nitrile rubber, polyisobutylene, ethylene propylene rubber, chlorosulfonated polyethylene, acrylic rubber, fluororubber, epichlorohydrin rubber, urethane rubber, natural rubber, and the like. As the resin material, it is preferable to use the same type of polymer material as a type of polymer configuring the chemical fiber. The metal materials configuring the metal layer are not limited as long as the metal materials have conductivity, and examples of the metal materials include gold (Au), silver (Ag), copper (Cu), titanium (Ti), aluminum (Al), zinc (Zn), tin (Sn), nickel (Ni), nickel-chromium (Ni—Cr), nickel-tin (Ni—Sn), nickel-copper (Ni—Cu), nickel-phosphorus (Ni—P), and the like. A thickness of the metal layer and the conductive particle-containing resin layer is not limited as long as the above resistivity is achieved, and is generally from 0.01 μm to 600 μm inclusive, and preferably 2 μm.

In form A, a thickness of the conductive thread is not limited, and may be, for example, from 0.01 mm to 5 mm inclusive, preferably from 0.1 mm to 1 mm inclusive in terms of further alleviating the stress concentration and further reducing the contact resistance between the conductive elastic body and the lead-out wire in the interpersonal pressure-sensitive use (particularly use for the pressure-sensitive device described later), and more preferably, for example, 0.5 mm.

In form A, the non-conductive thread is similar to the conductive thread except that the non-conductive thread does not contain conductive particles in the fibers configuring the thread and does not have a metal layer or a resin layer containing conductive particles on the surface of the fibers configuring the thread. The fibers configuring the non-conductive thread may be chemical fibers, natural fibers, or mixed fibers of these fibers. The chemical fibers that can configure the non-conductive thread may be chemical fibers similar to the chemical fibers that can form the conductive thread. The natural fibers may be plant fibers, animal fibers, or mixed fibers of plant fibers and animal fibers. Examples of the plant fibers include cotton and hemp (for example, flax and ramie). Examples of the animal fibers include hair (for example, wool, angora, cashmere, and mohair), silk, and feather (for example, down and feather).

In form A, a thickness of the non-conductive thread is not limited, and may be, for example, from 0.01 mm to 5 mm inclusive, preferably from 0.1 mm to 1 mm inclusive in terms of further alleviating the stress concentration and further reducing the contact resistance between the conductive elastic body and the lead-out wire in an interpersonal pressure-sensitive use (particularly use for the pressure-sensitive device described later), and more preferably, for example, 0.5 mm.

Conductive cloth 2 of form B is a cloth in which at least a part of the non-conductive cloth is provided with a resin layer containing conductive particles as conductive part 2a. When conductive cloth 2 of form B is provided with a resin layer containing conductive particles as conductive part 2a on a part of the non-conductive cloth, the remaining part is a part not provided with the conductive particle-containing resin layer as conductive part 2b. The non-conductive cloth is cloth including a woven fabric, knitted fabric, non-woven fabric, or fabric having a composite form of these fabrics. The non-conductive cloth may be formed from a similar non-conductive thread to the thread in conductive cloth 2 of form A. Conductive part 2a is a part of the non-conductive cloth provided with conductivity by forming a resin layer containing conductive particles on the surface of individual fibers of the thread configuring the cloth.

In form B, the conductive particle-containing resin layer on the fiber surface can be formed by immersing the fibers in a resin solution containing the conductive particles and drying the fibers. In form B, conductive part 2a can be selectively formed by protecting, for example, by coating non-conductive part 2b of the non-conductive cloth in advance. The conductive particles and the resin material configuring the conductive particle-containing resin layer in form B may be similar to the conductive particles and the resin material configuring the conductive particle-containing resin layer in form A, respectively. A thickness of the conductive particle-containing resin layer in form B may be similar to the thickness of the conductive particle-containing resin layer in form A.

Conductive cloth 2 of form C is a cloth in which at least a part of the non-conductive cloth is provided with a metal layer as conductive part 2a. When on conductive cloth 2 of form C, a part of the non-conductive cloth is provided with a metal layer as conductive part 2a, the remaining part is a part not provided with the metal layer as non-conductive part 2b. The non-conductive cloth is cloth including a woven fabric, knitted fabric, non-woven fabric, or fabric having a composite form of these fabrics. The non-conductive cloth may be formed from a similar non-conductive thread to the thread in conductive cloth 2 of form A. Conductive part 2a is a non-conductive cloth provided with conductivity by forming a metal layer on the surface of individual fibers of the thread configuring the cloth.

In form C, the metal layer on the fiber surface can be formed by an electroless plating treatment method, an electrolytic plating treatment method, an electrodeposition plating treatment method, a coating method, a vacuum vapor deposition method, a sputtering vapor deposition method, an MOCVD method, or the like. In form C, conductive part 2a can be selectively formed by coating a predetermined formation region of conductive part 2a on the non-conductive cloth with a catalyst in advance. A metal material configuring the metal layer in form C may be similar to the metal material forming the metal layer in form A. A thickness of the metal layer in form C may be similar to the thickness of the metal layer in form A.

Figure 38A:
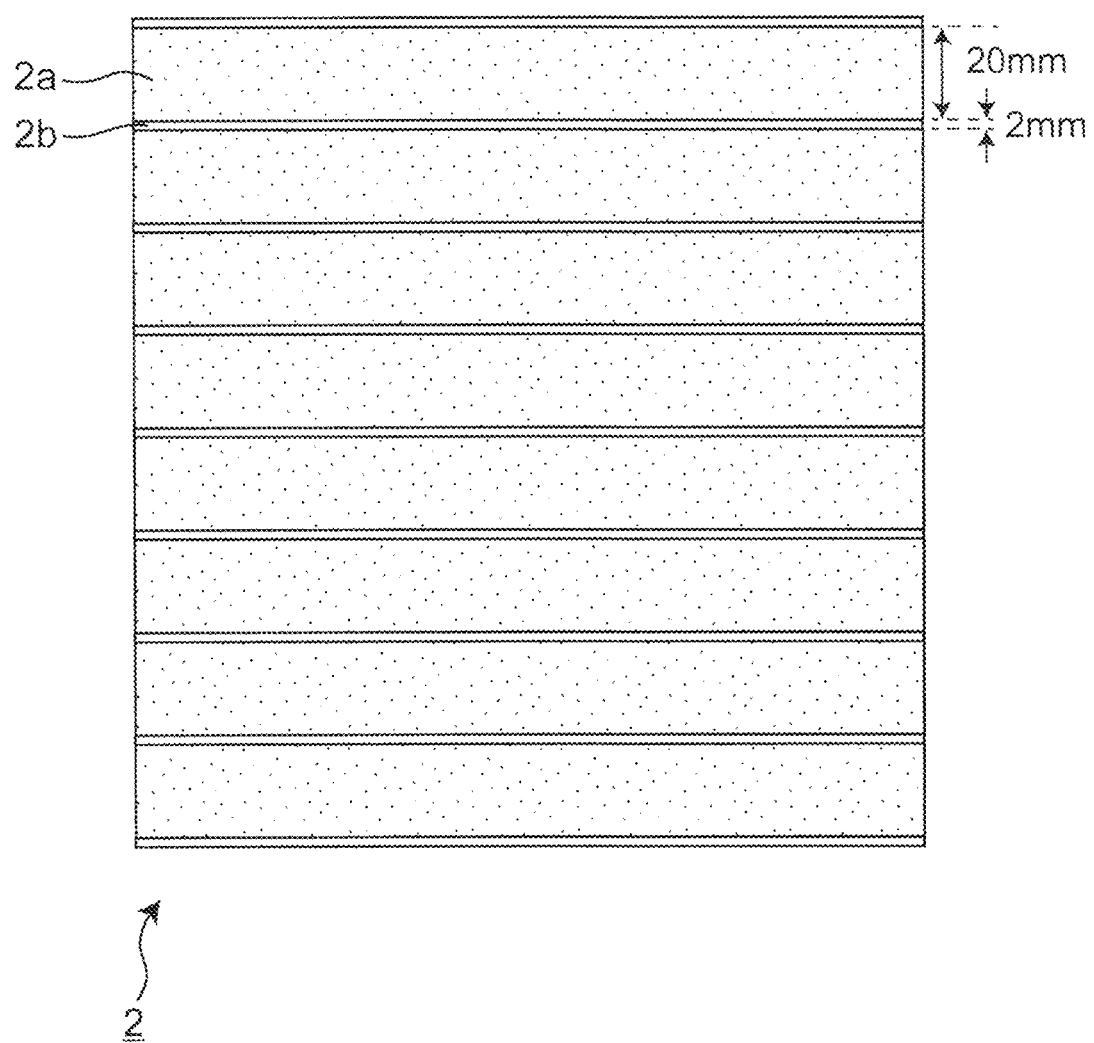
FIG. 38A is a schematic plan view of an example of the conductive cloth.
Figure 38B:
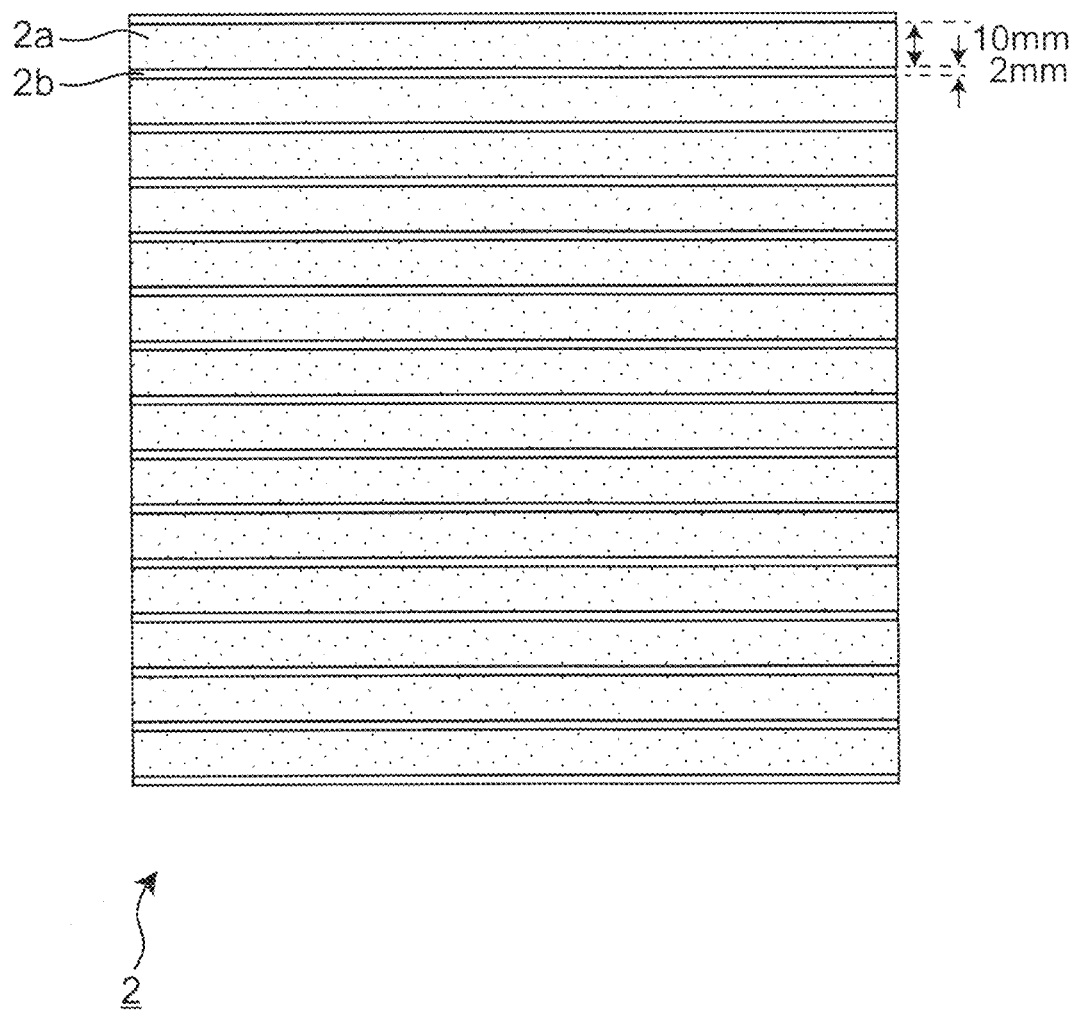
FIG. 38B is a schematic plan view of another example of the conductive cloth.

An example of conductive cloth 2 of form C is shown in FIGS. 38A and 38B. FIG. 38A is a schematic plan view of a conductive cloth in which two or more conductive parts 2a (Ag—Ni layers) are selectively formed in parallel with each other on a non-conductive cloth with a width of 20 mm by the electroless plating treatment method, and is a plan view showing that non-conductive part 2b having a width of 2 mm is selectively left untreated between conductive parts 2a. FIG. 38B is a schematic plan view of a conductive cloth in which two or more conductive parts 2a (Ag—Ni layers) are selectively formed in parallel with each other on a non-conductive cloth with a width of 10 mm by the electroless plating treatment method, and is a plan view showing that non-conductive part 2b having a width of 2 mm is selectively left untreated between conductive parts 2a.

Also in conductive cloth 2 having any form, a basis weight of conductive part 2a is generally from 10 g/m² to 500 g/m² inclusive, preferably from 50 g/m² to 250 g/m² inclusive in terms of further alleviating the stress concentration and further reducing the contact resistance between the conductive elastic body and the lead-out wire in the interpersonal pressure-sensitive use (particularly use for the pressure-sensitive device described later), and more preferably, for example, 100 g/m². A basis weight of non-conductive part 2b may be within a similar range to the basis weight of conductive part 2a, and generally has a value substantially similar to the basis weight of conductive part 2a.

When the element has two or more conductive elastic bodies 1, two or more conductive elastic bodies 1 may be provided as a form of elastic sheet 20 (first elastic sheet) including first insulating part 18 between at least adjacent conductive elastic bodies 1 as shown in FIG. 37A. At this time, two or more conductive elastic bodies 1 and two or more first insulating parts 18 preferably integrally configure first elastic sheet 20. "Two or more conductive elastic bodies 1 and two or more first insulating parts 18 are integrated" means that two or more conductive elastic bodies 1 and two or more first insulating parts 18 are integrally configured so as to be inseparable. As a result, a positional relationship between conductive elastic bodies 1 can be easily maintained, and a high-density electronic device (for example, pressure-sensitive device) can be provided. Further, it is easy to handle and manufacture two or more conductive elastic bodies 1 in manufacturing. Further, durability of expandability of the electronic device (for example, the pressure-sensitive device) is improved.

In first elastic sheet 20, conductive elastic bodies 1 are preferably embedded in first insulating parts 18. Here, "embedded" is "embedded" in a state where surface 1a of conductive elastic body 1 facing conductive cloth 2 is exposed. Specifically, as shown in FIG. 37A, conductive elastic bodies 1 may be embedded in first insulating parts 18 such that only (or a vicinity of) surfaces 1a facing conductive cloth 2 is exposed.

Thickness Tb of each conductive elastic body 1 is not limited, and may be, for example, within a similar range to thickness Tb described above.

A width of each conductive elastic body 1 (dimension in second direction D2) is not limited as long as, for example, the capacitance between the electrodes changes due to the pressure force from outside in the interpersonal pressure-sensitive use (particularly use for the pressure-sensitive device described later). The width of each conductive elastic body 1 is generally from 0.01 mm to 1000 mm inclusive, preferably from 1 mm to 50 mm inclusive in the interpersonal pressure-sensitive use, and more preferably, for example, 10 mm.

Conductive elastic body 1 generally has an elongated shape (for example, a linear shape). A longitudinal dimension of conductive elastic body 1 (dimension in first direction D1) is not limited and may be appropriately set in accordance with an intended use. The longitudinal dimension of conductive elastic body 1 is generally from 10 mm to 1000 mm inclusive, preferably from 100 mm to 500 mm inclusive, and more preferably, for example, 300 mm in the interpersonal pressure-sensitive use.

Conductive elastic body 1 is preferably connected to the ground (0 V) of the detector in terms of preventing noise when the pressure force is measured.

First insulating parts 18 preferably have elastic properties and non-conductive properties. The elastic properties of first insulating parts 18 may be, for example, similar properties to the elastic properties of conductive elastic body 1. First insulating parts 18 may preferably have an elastic modulus equal to or less than the elastic modulus of conductive elastic body 1 so as to be deformed to the same extent as conductive elastic body 1 or to be deformed more than conductive elastic body 1 when expanded or contracted. In terms of further alleviating the stress concentration and further reducing the contact resistance between the conductive elastic body and the lead-out wire in the interpersonal pressure-sensitive use (particularly use for the pressure-sensitive device described later), the elastic modulus of first insulating parts 18 is preferably from about $10^3$ Pa to $10^8$ Pa inclusive, for example, about $10^6$ Pa. When the electronic device is a pressure-sensitive device, the larger the elastic modulus of first insulating parts 18 within the above range, the wider the measurement range of the pressure force. The smaller the elastic modulus of first insulating parts 18 within the above range, the higher the pressure sensitivity. With a higher pressure sensitivity, for example, even minute pressure force that has been difficult to detect in the known art can be detected. This allows a start of application of the pressure force to be accurately detected. The elastic modulus can be adjusted, for example, by changing a cross-linking density. The cross-linking density can be adjusted by an amount of cross-linking material added. In relation to the non-conductive properties, a resistivity of first insulating parts 18 may be sufficiently larger than impedance of capacitance in a desired frequency band. The resistivity of first insulating parts 18 is generally more than or equal to $10^3$ Ω·cm, particularly from $10^4$ Ω·cm to $10^{10}$ Ω·cm inclusive, and more preferably, for example, $10^7$ Ω·cm. This resistivity can be achieved by using a resin material (rubber material).

First insulating parts 18 correspond to elastic insulating members and can also be referred to as expandable members. First insulating parts 18 may include any material as long as first insulating parts 18 have both the elastic properties and the non-conductive properties as described above. For example, first insulating parts 18 may include a non-conductive resin including a resin material (particularly, a rubber material). In terms of further alleviating the stress concentration and further reducing the contact resistance between the conductive elastic body and the lead-out wire in the interpersonal pressure-sensitive use (particularly use for the pressure-sensitive device), preferred first insulating parts 18 include a rubber material including non-conductive rubber. The resin material may be at least one resin material selected from the group consisting of, for example, styrene-based resin, silicone-based resin (for example, polydimethylpolysiloxane (PDMS)), acrylic-based resin, rotaxane-based resin, urethane-based resin, and the like. The rubber material may be at least one rubber material selected from the group consisting of, for example, silicone rubber, isoprene rubber, butadiene rubber, styrene-butadiene rubber, chloroprene rubber, nitrile rubber, polyisobutylene, ethylene propylene rubber, chlorosulfonated polyethylene, acrylic rubber, fluororubber, epichlorohydrin rubber, urethane rubber, natural rubber, and the like. The rubber material may include a cross-linking material and a filler for holding the elastic body and reinforcing tear strength and tensile strength, depending on a type of rubber.

The thickness of each first insulating part 18 is not limited. The thickness of first insulating part 18 may be generally such that surface 18a of first insulating part 18 facing conductive cloth 2 is near surface 1a of conductive elastic body 1 facing conductive cloth 2 (preferably flush with surface 1a) in terms of interpersonal pressure-sensitive use (particularly use for the pressure-sensitive device described later).

A width of each first insulating part 18 between adjacent conductive elastic bodies 1 (dimension in second direction D2) is not limited as long as, the capacitance between the electrodes changes due to the pressure force from outside in an interpersonal pressure-sensitive use (particularly use for the pressure-sensitive device described later). The width of each first insulating part 18 is generally from 0.01 mm to 50 mm inclusive, preferably from 0.5 mm to 10 mm inclusive in the interpersonal pressure-sensitive use, and more preferably, for example, 2 mm.

Connecting thread 3 maintains contact (particularly, surface contact or direct contact) between conductive elastic body 1 and conductive cloth 2 by sewing (and fastening) conductive elastic body 1 and conductive cloth 2 together. This achieves the electrical connection between conductive elastic body 1 and conductive part 2a in conductive cloth 2.

Connecting thread 3 may be a non-conductive thread or a conductive thread. In terms of further reducing the contact resistance between conductive elastic body 1 and conductive cloth 2, connecting thread 3 is preferably a conductive thread.

The conductive thread configuring connecting thread 3 is not limited as long as sewing and fastening between conductive elastic body 1 and conductive cloth 2 are achieved. The conductive thread configuring connecting thread 3 is, for example, a thread similar to the conductive thread in conductive cloth 2 (particularly of form A) (that is, a thread including fibers containing conductive particles in the fibers, a thread including fibers having a metal layer or a resin layer containing conductive particles on at least a part of the fiber surface, or a mixed thread of these threads), a thread including a single metal wire, or a thread including a plurality of metal wires twisted together. In terms of further alleviating the stress concentration and further reducing the contact resistance between the conductive elastic body and the lead-out wire in the interpersonal pressure-sensitive use (particularly use for the pressure-sensitive device described later), the conductive thread configuring connecting thread 3 is preferably a thread shown below. That is, more preferable thread is a thread including fibers containing conductive particles in the fibers, a thread including a metal layer or a laminated metal layer on at least a part of the fiber surface, a thread including fibers having a metal layer or a resin layer containing conductive particles in at least a part of a fiber surface, or a mixed thread of these threads.

A thickness of the conductive thread configuring connecting thread 3 is not limited as long as the sewing and fastening of conductive elastic body 1 and conductive cloth 2 are achieved, and may be in a similar range to that of, for example, the conductive thread in conductive cloth 2 (particularly of form A).

The non-conductive thread configuring connecting thread 3 is not limited as long as the sewing and fastening of conductive elastic body 1 and conductive cloth 2 are achieved, and may be similar to, for example, the non-conductive thread in conductive cloth 2 (particularly of form A). Specifically, the fibers configuring the non-conductive thread may be chemical fibers, natural fibers, or mixed fibers of these fibers. The chemical fibers and natural fibers that can form the non-conductive thread in connecting thread 3 may be similar to the chemical fibers and natural fibers that can form the non-conductive thread in conductive cloth 2, respectively.

A thickness of the non-conductive thread configuring connecting thread 3 is not limited as long as the sewing and fastening of conductive elastic body 1 and conductive cloth 2 are achieved, and may be in a similar range to that of, for example, the non-conductive thread in conductive cloth 2 (particularly of form A).

Connecting thread 3 may pass through conductive elastic body 1 and conductive part 2a as shown in FIGS. 36A and 36B. As shown in FIGS. 37B and 37C, connecting thread 3 preferably passes through first insulating part 18 and non-conductive part 2b instead of conductive elastic body 1 and conductive part 2a in terms of further improving the measurement accuracy in the interpersonal pressure-sensitive use (particularly use for the pressure-sensitive device described later).

The stitch of connecting thread 3 has a parallel stitch form in FIGS. 37B and 37C, but may have an engaging stitch in which a needle thread and a bobbin thread are engaged with each other by machine sewing, for example. The stitch is a way of sewing or a seam.

Second Exemplary Embodiment

Figure 39B:
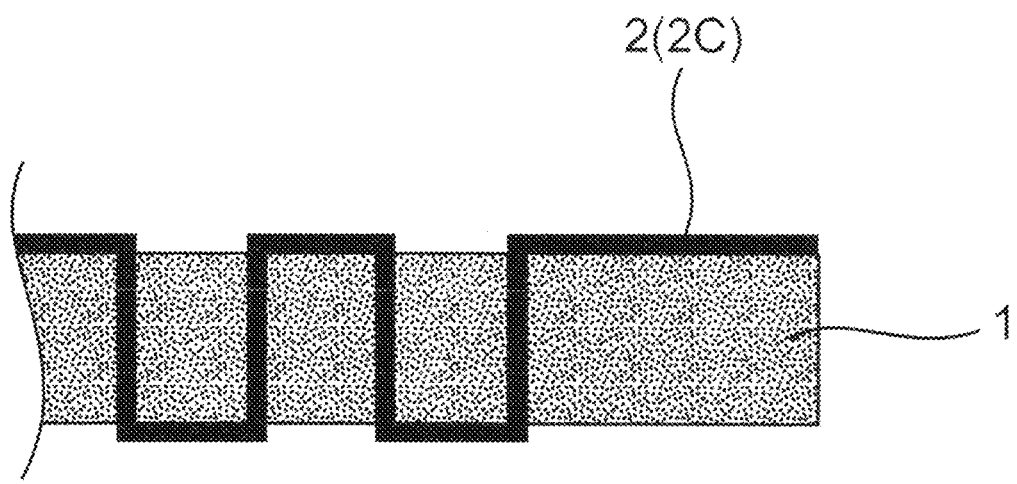
FIG. 39B is a partially enlarged schematic cross-sectional view of the electronic device taken along line 39B-39B of the present disclosure in FIG. 39A when viewed in a direction of an arrow.

The electronic device according to a second exemplary embodiment of the present disclosure has a connector structure including an element (particularly conductive elastic body 1) and a lead-out wire, for example, as shown in FIGS. 39A and 39B. FIG. 39A is a schematic perspective view of an example of a basic structure of the electronic device according to the second exemplary embodiment of the present disclosure. FIG. 39B is a partially enlarged schematic cross-sectional view of the electronic device taken along line 39B-39B of the present disclosure in FIG. 39A when viewed in a direction of an arrow.

The element included in the electronic device according to the second exemplary embodiment of the present disclosure is similar to the element included in the electronic device according to the first exemplary embodiment, that is, is not limited as long as the element includes conductive elastic body 1 having both conductive properties and elastic properties and requires electrical drawing from conductive elastic body 1. Examples of the element included in the electronic device according to the second exemplary embodiment include elements similar to the element included in the electronic device according to the first exemplary embodiment. When the electronic device according to the second exemplary embodiment of the present disclosure includes a pressure-sensitive element as an element, the electronic device may also be referred to as a "pressure-sensitive device".

Conductive elastic body 1 in the second exemplary embodiment is similar to conductive elastic body 1 in the first exemplary embodiment. For example, the elastic properties (for example, elastic modulus), the conductive properties (for example, resistivity), the constituent material, and thickness Tb of conductive elastic body 1 in the second exemplary embodiment may be similar to the elastic properties (for example, elastic modulus), the conductive properties (for example, resistivity), the constituent material, and thickness Tb of conductive elastic body 1 in the first exemplary embodiment, respectively.

In the second exemplary embodiment, the lead-out wire is conductor wire 2c and is led out from the element. "The lead-out wire is led out from the element" means that conductor wire 2c configuring the lead-out wire is electrically connected to conductive elastic body 1 of the element. In the present exemplary embodiment, conductor wire 2c is used as the lead-out wire, and conductor wire 2c passes through inside of at least a part of conductive elastic body 1 while being in direct contact with conductive elastic body 1. This more sufficiently alleviates the stress concentration and more sufficiently reduces the contact resistance between the conductive elastic body and the lead-out wire. Furthermore, particularly in a case where the element is an element provided at a part that clothing and a human body are brought into contact with each other (for example, a pressure-sensitive element), the electronic device according to the second exemplary embodiment of the present disclosure gives relatively little feeling of a foreign substance and has a relatively high connection reliability with respect to an external force when the human body is brought into contact with a connection part between the element (particularly, conductive elastic body 1) and the lead-out wire (particularly, conductor wire 2c). In the present exemplary embodiment, conductor wire 2c as the lead-out wire can be particularly referred to as a "connector".

Conductor wire 2c receives compressive force in conductive elastic body 1 due to the elastic properties of conductive elastic body 1 on an entire outer surface of conductor wire 2c. Thus, the outer surface of conductor wire 2c in conductive elastic body 1 and conductive elastic body 1 are in surface contact with each other. Specifically, by inserting conductor wire 2c into conductive elastic body 1, the outer surface of conductor wire 2c and conductive elastic body 1 are in direct surface contact with each other by a compressive force. A length of conductor wire 2c passing through conductive elastic body 1 (that is, conductor wire 2c inserted into conductive elastic body 1) is not limited as long as these electrical connections are sufficiently achieved, and is, for example, more than or equal to 1 mm, particularly from 1 mm to 500 mm inclusive, preferably from 10 mm to 100 mm inclusive in terms of further reducing the contact resistance, and more preferably, for example, 30 mm.

Conductor wire 2c is not limited as long as conductor wire 2 is a linear member having conductive properties. A resistivity of conductor wire 2c is not limited as long as the electrical properties of the element (particularly, conductive elastic body 1) can be measured, and is, for example, less than or equal to $10^{-1}$ Ω·cm, particularly from $10^{-12}$ Ω·cm to $10^{-1}$ Ω·cm inclusive in terms of expanding the measurement range of pressure force and improving the pressure sensitivity in the interpersonal pressure-sensitive use (particularly use for the pressure-sensitive element described later), preferably from $10^{-12}$ Ω·cm to $10^{-8}$ Ω·cm inclusive, and more preferably, for example, $10^{-12}$ Ω·cm.

Examples of constituent materials of conductor wire 2c include gold (Au), silver (Ag), copper (Cu), titanium (Ti), aluminum (Al), zinc (Zn), tin (Sn), nickel (Ni), nickel-chromium (Ni—Cr), nickel-tin (Ni—Sn), nickel-copper (Ni—Cu), nickel-phosphorus (Ni—P), and the like. The outer surface of conductor wire 2c is preferably not coated with an insulating layer at all, and the constituent material is preferably exposed.

In FIGS. 39A and 39B, conductor wire 2c passes through conductive elastic body 1 in a parallel stitch form. However, conductor wire 2c may pass through conductive elastic body 1 in an engaging stitch in which a needle thread and a bobbin thread are engaged with each other, for example, by machine sewing, or may pass through conductive elastic body 1 by simply being inserted. Conductor wire 2c is used as only one wire in FIGS. 39A and 39B, but may be used as two wires, such as when passing through conductive elastic body 1 in the engaging stitch, or may be used as three or more wires.

A thickness of conductor wire 2c is not limited, and may be, for example, more than or equal to 0.01 mm in diameter, particularly from 0.1 mm to 2 mm inclusive, preferably from 0.1 mm to 1 mm inclusive in terms of further alleviating the stress concentration and further reducing the contact resistance between the conductive elastic body and the lead-out wire in an interpersonal pressure-sensitive use (particularly use for the pressure-sensitive device described later), and more preferably, for example, 0.5 mm.

Third Exemplary Embodiment

The electronic device according to a third exemplary embodiment of the present disclosure is a pressure-sensitive device. The element included in the pressure-sensitive device of the present disclosure is a pressure-sensitive element. An example of the pressure-sensitive device will be described in detail below. In the present exemplary embodiment, a pressure-sensitive device using a connector having the connector structure of the electronic device according to the first exemplary embodiment as connector 60A that achieves electrical drawing from first electrode 11 will be described. However, a connector having the connector structure of the electronic device according to the second exemplary embodiment may be used. In the present exemplary embodiment, first electrode 11 corresponds to conductive elastic body 1 in the first exemplary embodiment.

A pressure-sensitive device of the present disclosure is an element having a capacitance and has a capacitor function. In such a pressure-sensitive device, the capacitance is changed by applying pressure force, and the pressure force is detected from the capacitance change. Thus, the pressure-sensitive device of the present disclosure is also referred to as a "capacitive pressure-sensitive sensor element", a "capacitive pressure detection sensor element", or a "pressure-sensitive switch element".

Hereinafter, the pressure-sensitive device according to the present disclosure will be described with reference to the drawings. In the pressure-sensitive device of the present disclosure, pressing may be performed on either a first electrode side or a second electrode side in a relative relationship between the first electrode and the second electrode. In terms of further expanding the measurement range of the pressure force and further improving pressure sensitivity, the pressing is preferably performed on the first electrode side in the relative relationship between the first electrode and the second electrode. When the third electrode is used, the pressing may be performed on either the first electrode side or the third electrode side in a relative relationship between the first electrode, the second electrode, and the third electrode.

(Basic Measurement Mechanism)

Figure 40A:
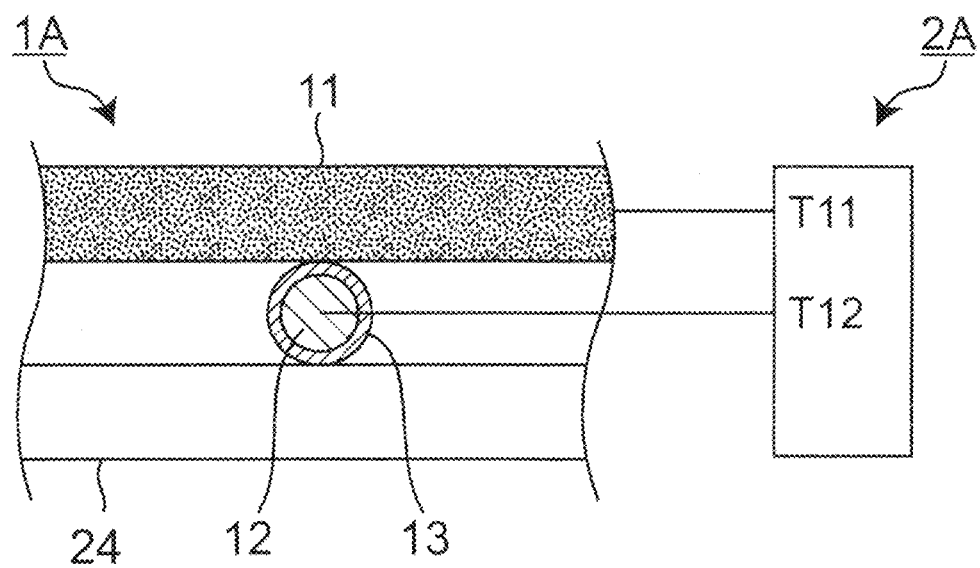
FIG. 40A is a schematic cross-sectional view of an example of the basic structure of the pressure-sensitive device for explaining the basic pressure measurement mechanism adopted by the pressure-sensitive device according to a third exemplary embodiment of the present disclosure.

As shown in FIG. 40A, the pressure-sensitive device of the present disclosure generally includes pressure-sensitive part 1A to which a pressure force is applied and detector 2A that detects the pressure force as a basic structure. FIG. 40A is a schematic cross-sectional view of an example of the basic structure of the pressure-sensitive device for explaining a basic pressure measurement mechanism adopted by the pressure-sensitive device of the present disclosure.

Pressure-sensitive part 1A has first electrode 11 including a conductive elastic body, second electrode 12 including a conductor wire, and dielectric 13 covering a surface of second electrode 12.

Figure 40B:
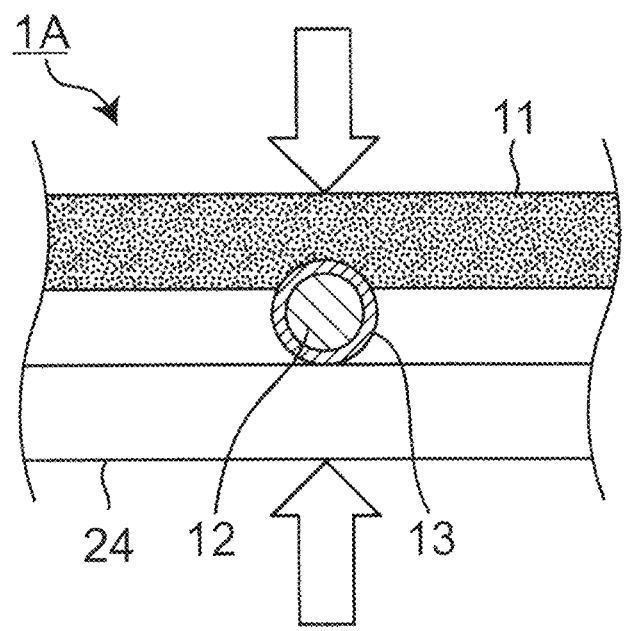
FIG. 40B is a schematic cross-sectional view of the basic structure of the pressure-sensitive device when pressure force is applied in FIG. 40A.

In the pressure-sensitive device of the present disclosure, as shown in FIG. 40B, when pressure force is applied to pressure-sensitive part 1A, an area of a contact region between first electrode 11 and dielectric 13 (hereinafter simply referred to as "area of the contact region") expands based on elasticity of first electrode 11. As a result, capacitance C [pF] between first electrode 11 and second electrode 12 changes. Capacitance C [pF] and pressure force F [N] applied to the pressure-sensitive part are each represented by the following equations. The pressure force is thus detected by the detector. In the present disclosure, the pressure force is detected based on the change in the area of the contact region as described above, and the change in the area contributes more to the change in capacitance than, for example, a change in a distance between electrodes in a conventional pressure-sensitive device (C∝S, C∝1/d). The measurement range of the pressure force is therefore relatively wide. In particular, when the pressure force is small, the change in capacitance based on the change in the distance between the electrodes is significantly small. FIG. 40B is a schematic cross-sectional view of the basic structure of the pressure-sensitive device when the pressure force is applied in FIG. 40A.

$$C = \frac{\varepsilon S}{d} \quad \text{[Equation 3]}$$

$$F = E \cdot eS \quad \text{[Equation 4]}$$

(In the equations, ε [pF/m] is a dielectric constant of the dielectric, S [m$^2$] is a contact area between the first electrode and the dielectric, d [m] is a thickness of the dielectric, and E [Pa] is a Young's modulus of the first electrode, and e is a strain of the first electrode.)

The pressure force may be applied to pressure-sensitive part 1A in the pressure-sensitive device of the present disclosure from any of first electrode 11 or second electrode 12. FIG. 40B shows that the pressure force is applied from first electrode 11, and force is also applied from base material 24 described later by a reaction of the pressure force.

Detector 2A is a circuit that detects pressure force based on a change in capacitance between first electrode 11 and second electrode 12. Detector 2A is electrically connected to a wire drawn from first electrode 11 and a wire drawn from second electrode 12 via terminals T11 and T12, respectively. Detector 2A may be a control circuit, an integrated circuit, and the like. In terms of stabilizing detection of the pressure force by reducing an influence of noise, first electrode 11 is preferably connected to a ground of detector 2A. That is, terminal T11 of detector 2A to which the wire drawn from first electrode 11 is electrically connected is preferably further connected to the ground.

When a plurality of second electrodes 12 is used, detector 2A has a plurality of terminals for electrically connecting to the wires drawn from the plurality of second electrodes 12.

In the pressure-sensitive device of the present disclosure, the pressure force is measured by measuring the change in capacitance between terminal T11 and terminal T12 based on the change in the area of the contact region without deforming dielectric 13. The change in the area of the contact region is relatively larger than, for example, the change in the distance between the electrodes in the conventional pressure-sensitive device, and thus the pressure-sensitive device of the present disclosure has a relatively simple structure and a relatively wide range of pressure force can be measured.

(Pressure-Sensitive Device)

The pressure-sensitive device of the present disclosure includes a pressure-sensitive element including a first electrode as a conductive elastic body, a lead-out wire led out from the element and including a conductive cloth, and a connecting thread sewing the first electrode and the conductive cloth. Hereinafter, the pressure-sensitive device of the present disclosure will be described in detail. The pressure-sensitive element corresponds to a part other than conductive cloth 2 (or connector 60A) as the lead-out wire in the following pressure-sensitive device.

Figure 41A:
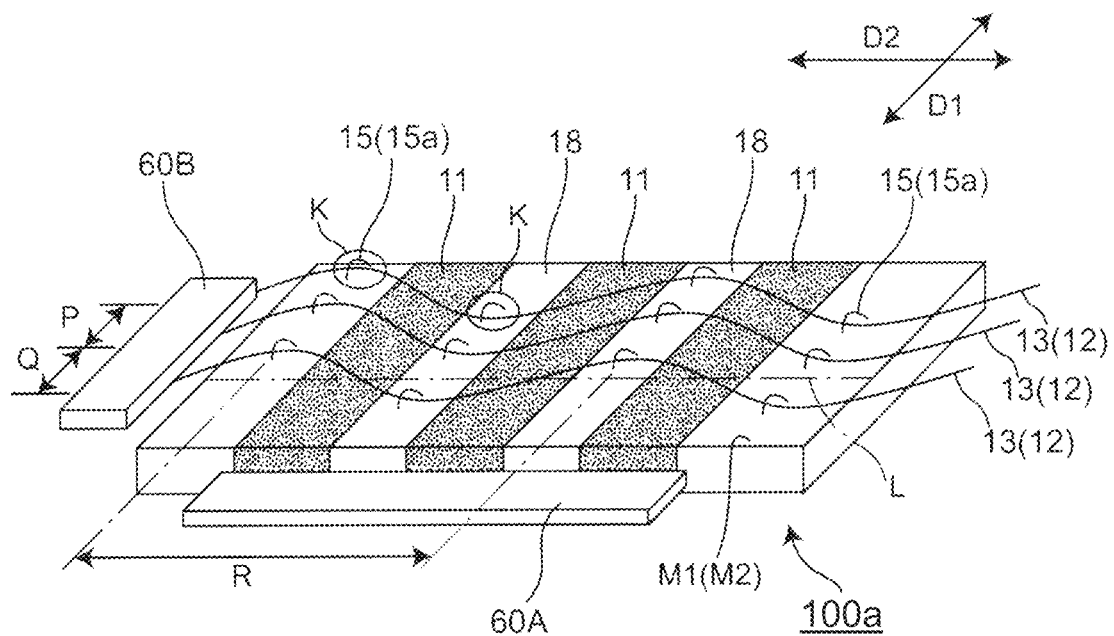
FIG. 41A is a schematic perspective view of a configuration of an example of the pressure-sensitive device according to the third exemplary embodiment of the present disclosure.

As shown in FIG. 41A, for example, pressure-sensitive device 100a of the present disclosure includes a plurality of first electrodes 11, a plurality of second electrodes 12, and a plurality of dielectrics 13. Second electrodes 12 are covered with dielectrics 13. Pressure-sensitive device 100a of the present disclosure can also be referred to as a matrix sensor because the plurality of first electrodes 11 and the plurality of second electrodes 12 are elongated in first direction D1 and second direction D2, respectively, and first direction D1 and second direction D2 are directions intersecting each other in the same plane. In pressure-sensitive device 100a of the present disclosure, as is clear from the above description of the measurement mechanism, the capacitance at intersections (that is, parts or cross points) of first electrodes 11 and second electrodes 12 changes in accordance to the pressure force applied between first electrodes 11 and second electrodes 12. Therefore, the pressure force and the change in pressure force can be measured and detected based on the capacitance and the change in capacitance. For example, when the pressure force is applied, the area of the contact region between first electrodes 11 and dielectrics 13 at the intersections of first electrodes 11 and second electrodes 12 increases based on elasticity of first electrodes 11 and the capacitance changes. FIG. 41A is a schematic cross-sectional view of a configuration of an example of the pressure-sensitive device according to the third exemplary embodiment of the present disclosure.

Figure 41B:
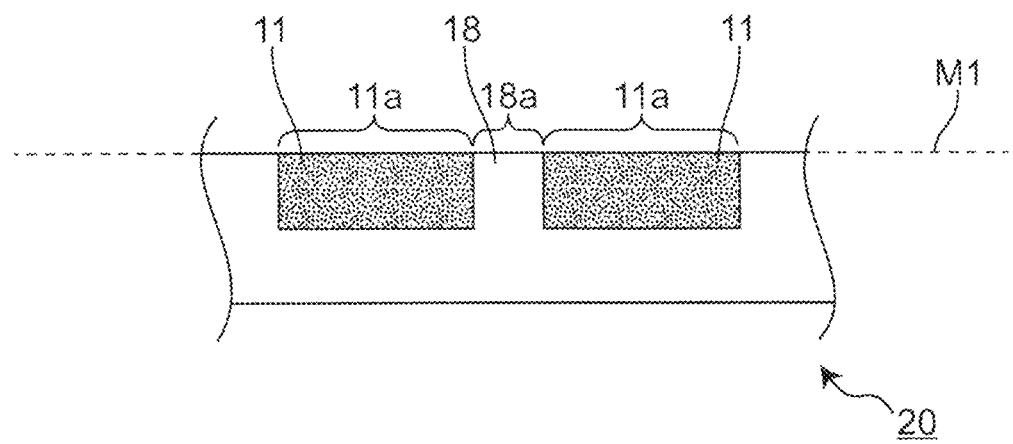
FIG. 41B is an enlarged cross-sectional view of the vicinity of the first electrode in the pressure-sensitive device of the present disclosure shown in FIG. 41A, and is a schematic cross-sectional view perpendicular to the elongation direction of the first electrode (first direction)

The plurality of first electrodes 11 is elongated in first direction D1 and is arranged in a first plane. Furthermore, the plurality of first electrodes 11 includes a conductive elastic body. "The plurality of first electrodes 11 is elongated in first direction D1" means that the elongation direction of first electrodes 11 is substantially parallel to first direction D1. "The plurality of first electrodes 11 is arranged in the first plane" means that the plurality of first electrodes 11 is arranged such that surfaces 11a of the plurality of first electrodes 11 on a side of second electrode 12 are all in substantially the same plane (first plane) M1 as shown in FIG. 41B. First plane M1 may be a flat plane as shown in FIG. 41B, or a curved plane. FIG. 41B is an enlarged cross-sectional view of the vicinity of the first electrode in the pressure-sensitive device of the present disclosure shown in FIG. 41A, and is a schematic cross-sectional view perpendicular to the elongation direction of the first electrode (first direction).

In general, a plurality of first insulating parts 18 including an insulating elastic body is arranged between the plurality of first electrodes 11 as shown in FIGS. 41A and 41B. Thus, even if a wiring density of first electrode 11 is high, adjacent first electrodes can be prevented from being deformed and short-circuited when the pressure force is applied. It is therefore possible to provide a pressure-sensitive device capable of measuring a high-density pressing surface distribution.

When the plurality of first insulating parts 18 is arranged between the plurality of first electrodes 11, surfaces 11a of the plurality of first electrodes 11 on the second electrode side may be arranged as in any of the following aspects.

(Aspect 1) Surfaces 11a of the plurality of first electrodes 11 on the second electrode side are flush with surfaces 18a of the plurality of first insulating parts 18 on the second electrode side as shown in FIG. 41B; "flush" means that there is no step.

(Aspect 2) Surfaces 11a of the plurality of first electrodes 11 on the second electrode side protrude from (that is, become higher than) surface 18a of the plurality of first insulating parts 18 on the second electrode side.

(Aspect 3) Surfaces 11a of the plurality of first electrodes 11 on the second electrode side are recessed from (that is, become lower than) surface 18a of the plurality of first insulating parts 18 on the second electrode side.

The plurality of first electrodes 11 is preferably disposed such that surfaces 11a of the plurality of first electrodes 11 on the second electrode side are in a state of Aspect 1 in terms of further improving expandability of second electrodes 12 in second direction D2, further preventing a short circuit between adjacent first electrodes 11, further expanding the measurement range of pressure force, and further improving the pressure sensitivity. Specifically, in Aspect 1, second electrodes 12 (and dielectrics 13 on the surfaces of second electrodes 12) can receive pressure relatively uniformly between first electrodes 11 and first insulating parts 18 (a first elastic sheet described later) and a base material sheet described later. Thus, expansion and contraction of second electrode 12 in second direction D2 is not easily inhibited by a local high voltage. Furthermore, in Aspect 1, a short circuit between adjacent first electrodes 11 is further prevented, and the pressure-sensitive measurement with higher sensitivity is possible. Specifically, in this flush structure of first electrodes 11 and first insulating parts 18, a short circuit is less likely to occur between adjacent first electrodes 11 even if the pressure-sensitive device bends while good pressure sensitivity is ensured. Further, a short circuit is less likely to occur between adjacent first electrodes 11 due to critical compression while good pressure sensitivity is ensured.

The plurality of first electrodes 11 and the plurality of first insulating parts 18 are preferably integrated to configure first elastic sheet 20. "The plurality of first electrodes 11 and the plurality of first insulating parts 18 are integrated" means that the plurality of first electrodes 11 and the plurality of first insulating parts 18 are integrally configured so as to be inseparable. As a result, a positional relationship between first electrodes 11 can be easily maintained, and a high-density pressure-sensitive device can be provided. Further, it is easy to handle and manufacture the plurality of first electrodes in manufacturing. Further, durability related to expandability of the pressure-sensitive device is improved.

First electrode 11, first insulating part 18, and first elastic sheet 20 in the present exemplary embodiment are similar to conductive elastic body 1, insulating part 18 (first insulating part), and elastic sheet 20 (first elastic sheet) in the first exemplary embodiment, respectively.

First electrode 11 is preferably connected to the ground (0V) of the detector in terms of preventing noise when the pressure force is measured.

A dimension of each first insulating part 18 in first direction D1 is not limited, and is generally equal to or longer than the longitudinal dimension of first electrode 11 (dimension in first direction D1) in terms of preventing a short circuit between first electrodes 11.

First electrodes 11 and first insulating parts 18 (particularly, first elastic sheet 20 including first electrodes 11 and first insulating parts 18) can be manufactured by a known method of molding with a mold.

Figure 42A:
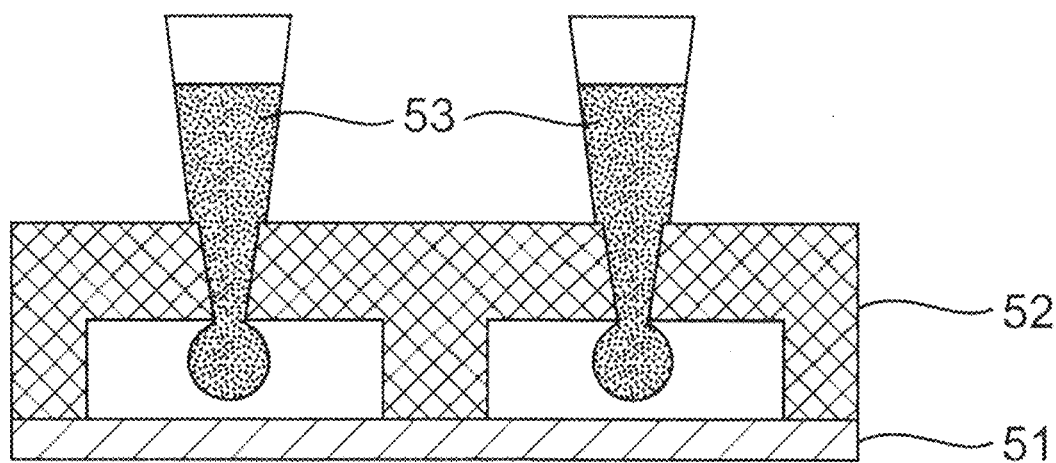
FIG. 42A is a schematic cross-sectional view of one step of the method of manufacturing the first elastic sheet including the first electrode and the first insulating part in the pressure-sensitive device of the present disclosure.
Figure 42B:
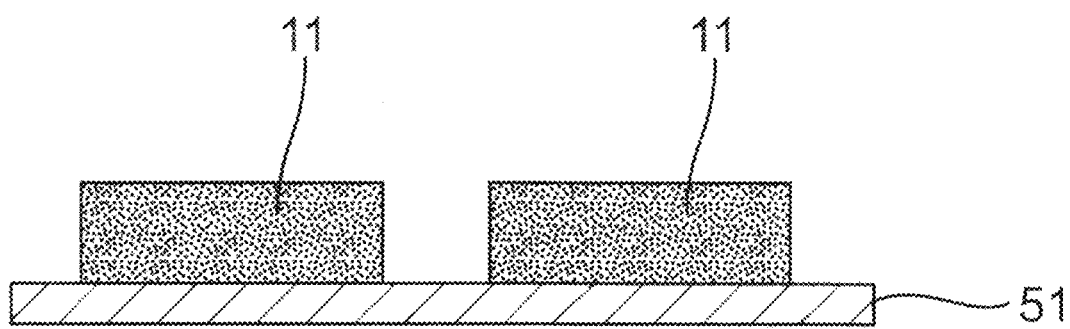
FIG. 42B is a schematic cross-sectional view of one step of the method of manufacturing the first elastic sheet including the first electrode and the first insulating part in the pressure-sensitive device of the present disclosure.
Figure 42C:
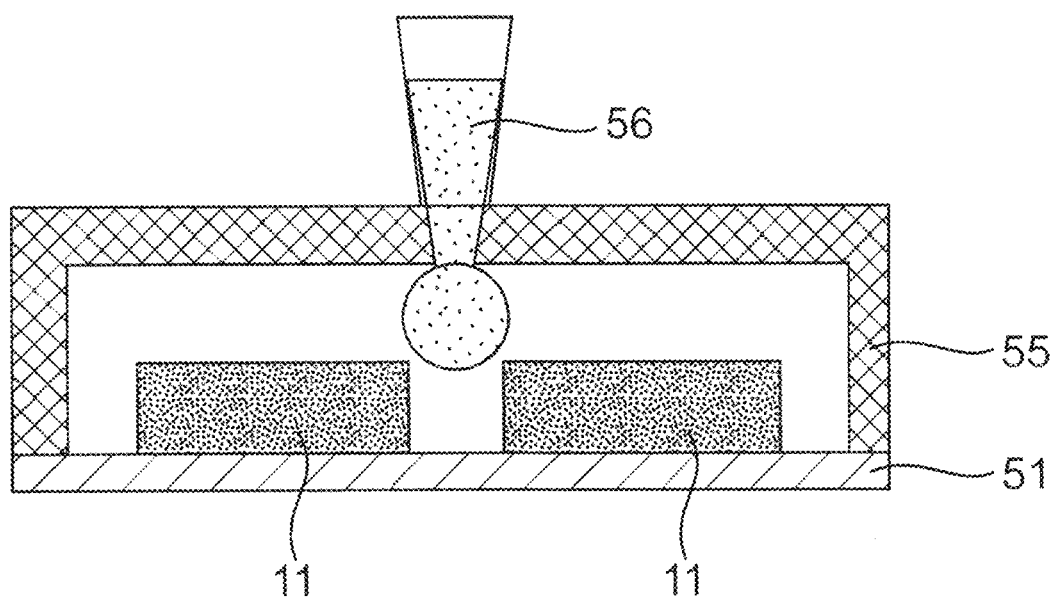
FIG. 42C is a schematic cross-sectional view of one step of the method of manufacturing the first elastic sheet including the first electrode and the first insulating part in the pressure-sensitive device of the present disclosure.
Figure 42D:
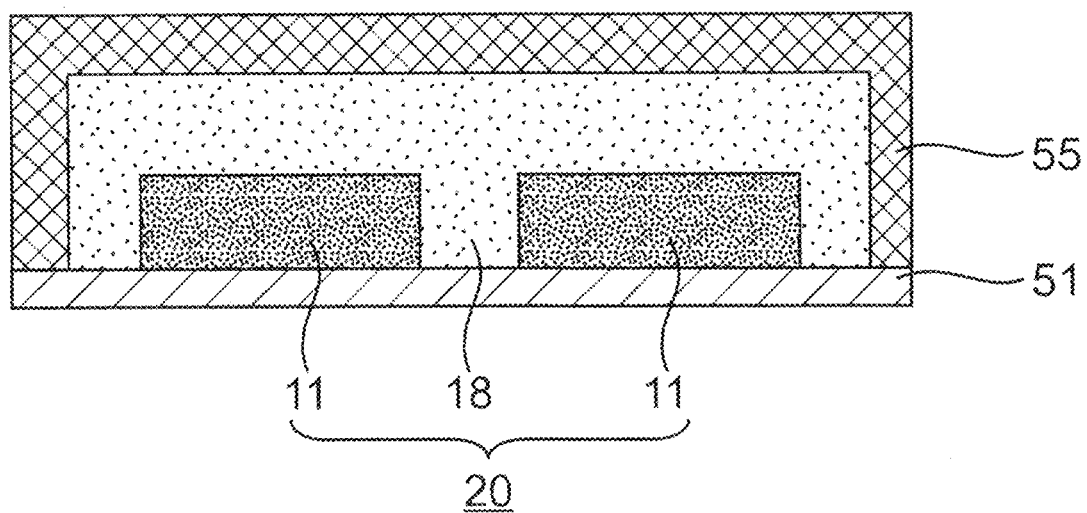
FIG. 42D is a schematic cross-sectional view of one step of the method of manufacturing the first elastic sheet including the first electrode and the first insulating part in the pressure-sensitive device of the present disclosure.

For example, first, at least one of a conductive filler or a cross-linking material as desired is applied to a solution of a desired resin material (rubber material) or raw material solution to obtain a composite material for the first electrode and a composite material for the first insulating part. Next, as shown in FIG. 42A, composite material 53 for the first electrode is filled and cross-linked between molds 51 and 52 having a molding surface corresponding to a desired shape of the first electrode to obtain first electrode 11 on mold 51 as shown in FIG. 42B. Then, as shown in FIG. 42C, composite material 56 for the first insulating part is filled and cross-linked between molds 51 and 55 having a molding surface corresponding to a desired shape of the first insulating part (particularly, first elastic sheet 20) to obtain first electrode 11 and first insulating part 18 (particularly, first elastic sheet 20) in molds 51 and 55 as shown in FIG. 42D. FIGS. 42A to 42D are schematic cross-sectional views of one step of the method of manufacturing the first elastic sheet including the first electrode and the first insulating part in the pressure-sensitive device of the present disclosure.

Each of the plurality of second electrodes 12 is a linear member having at least conductive properties (for example, a conductor wire or a metal wire), and a surface of each second electrode 12 is generally covered with dielectric 13. Each of the plurality of second electrodes 12 is elongated in second direction D2 intersecting first direction D1 and is arranged in a second plane facing the first plane. Second direction D2 intersecting first direction D1 refers to second direction D2 intersecting first direction D1 when first direction D1 and second direction D2 are represented in the same plane, and means that these directions are not parallel to each other. In the present exemplary embodiment, the angle (smaller angle) formed by first direction D1 and second direction D2 is not limited, and may be, for example, from 1° to 90° inclusive. In terms of further improving the expandability of the pressure-sensitive device in first direction D1, the angle (smaller angle) formed by first direction D1 and second direction D2 is preferably from 30° to 90° inclusive (particularly more than or equal to 30° and particularly less than 90°) and more preferably, for example, 45°. "The plurality of first electrodes 11 is elongated in second direction D2" means that the elongation direction of second electrodes 12 is substantially parallel to second direction D2. As will be described later, second electrodes 12, having bent parts arranged periodically, are elongated in second direction D2, and thus the elongation direction of second electrodes 12 is a direction in which second electrodes 12 are elongated as a whole (for example, the main direction). The second plane facing the first plane refers to the second plane parallel to first plane M1, and second plane M2 may be the same plane as first plane M1 as shown in FIG. 41A. The second plane may be a flat plane or a curved plane depending on first plane M1.

Figure 41C:
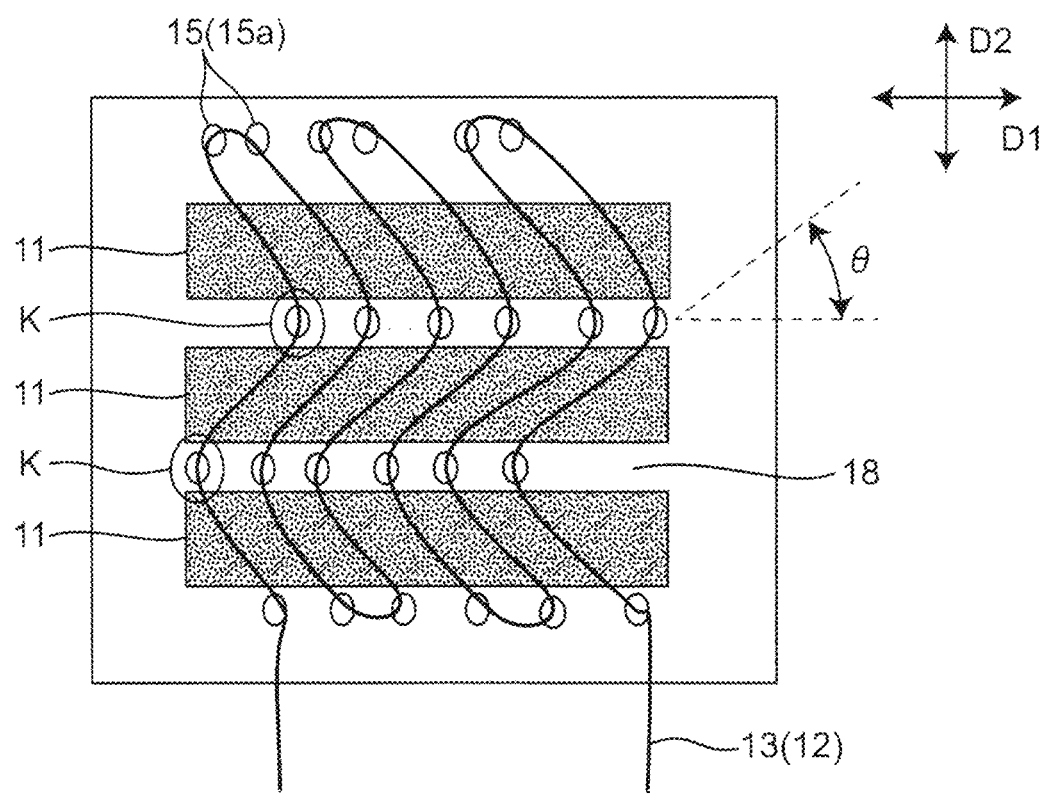
FIG. 41C is a plan view of another example of the pressure-sensitive device according to the third exemplary embodiment of the present disclosure, and is a plan view thereof before extension.

Each of the plurality of second electrodes 12 has bent parts K arranged periodically (and regularly) in a plan view, as shown in FIGS. 41A and 41C. For example, each of the plurality of second electrodes 12 has a meander shape in a plan view. The meander shape is a shape of a wave in which a linear object is bent periodically (and regularly). "Bent" described herein includes not only a state of being linearly bent but also a state of being curvilinearly bent (that is, "curved"). Thus, specific examples of the meander shape include a sine wave shape, a rectangular wave shape, a triangular wave shape, a sawtooth wave shape, and a composite shape of these shapes. FIG. 41A is a schematic perspective view of the configuration of an example of the pressure-sensitive device of the present disclosure. It is also obvious from FIG. 41A that each of the plurality of second electrodes 12 has bent parts K arranged periodically (and regularly) in a plan view. FIG. 41C is a plan view of another example of the pressure-sensitive device according to the third exemplary embodiment of the present disclosure, and is a plan view thereof before extension.

Figure 41D:
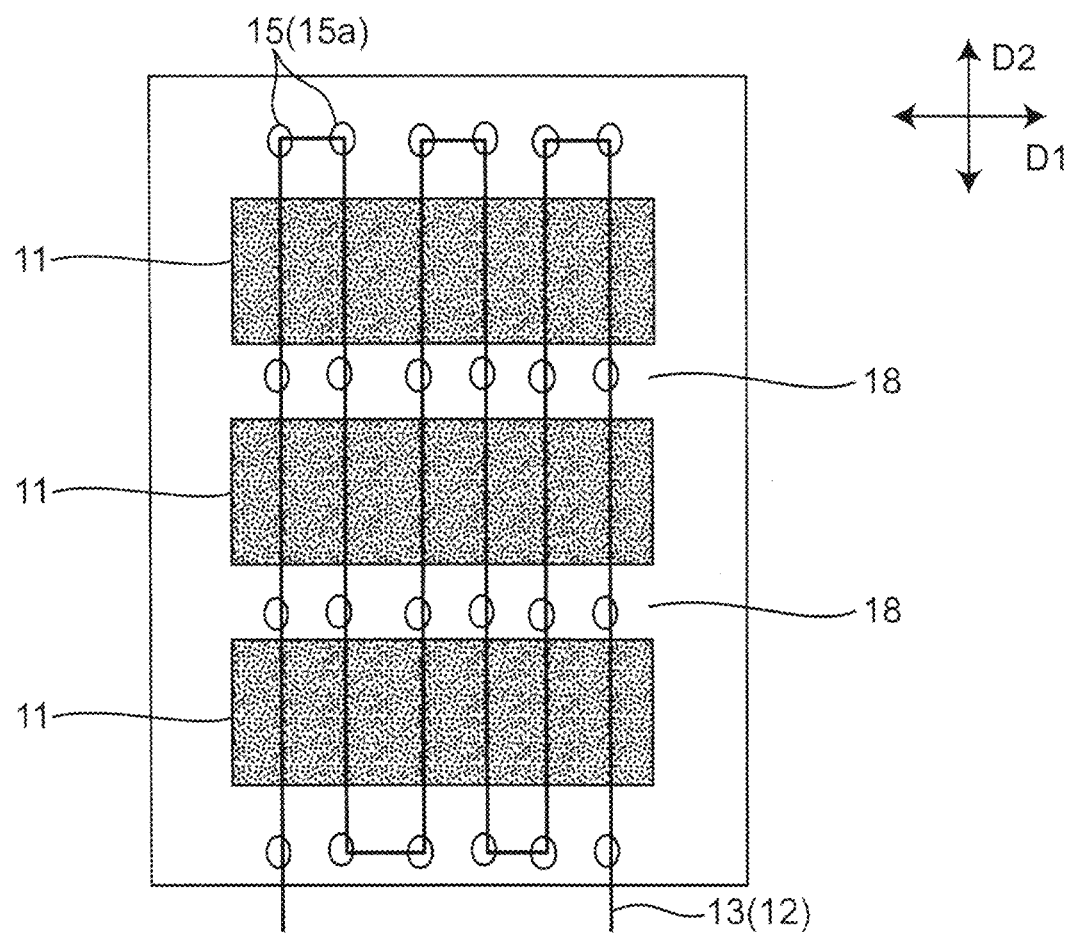
FIG. 41D is a plan view of the pressure-sensitive device in FIG. 41C when extended.

As described above, each of the plurality of second electrodes 12 has bent parts K arranged periodically (and regularly), and thus pressure-sensitive device 100a of the present disclosure has more sufficient expandability. Specifically, pressure-sensitive device 100a expands and contracts more sufficiently in the second direction based on the extension and bending of bent parts K of second electrode 12 (and the elasticity of first electrode 11 and first insulating part 18) as shown in FIGS. 41C and 41D. Further, pressure-sensitive device 100a expands and contracts more sufficiently in first direction D1 based on the elasticity of first electrode 11 (and the first insulating part). FIG. 41D is a plan view of the pressure-sensitive device in FIG. 41C when extended.

In relation to expansion and contraction (particularly, extension) in second direction D2, assuming that a bending angle of second electrode 12 with respect to first direction D1 is θ as shown in FIG. 41C, pressure-sensitive device 100a extends such that a dimension of pressure-sensitive device 100a in second direction D2 during extension is 1/sin θ times a dimension of pressure-sensitive device 100a in second direction D2 during bending (that is, before extension). On the other hand, when second electrode 12 is not provided with a bent part, θ is 90°, and thus extension is not achieved.

Bending angle θ of second electrode 12 is an average value of the angles (smaller angles) formed by a tangent line between any two adjacent bent parts K in each second electrode 12 and first direction D1. In terms of further improving the expandability (particularly expandability in second direction D2) of pressure-sensitive device 100a, further preventing a short circuit between adjacent first electrodes 11, further improving the expansion of the measurement range of the pressure force, and further improving the pressure sensitivity, bending angle θ of second electrode 12 is preferably from 1° to 90° inclusive (particularly, more than or equal to 1° and less than 90°), more preferably from 10° to 80° inclusive, even more preferably from 30° to 60° inclusive, and most preferably from 40° to 50° inclusive.

The plurality of second electrodes 12 generally has a similar shape in a plan view, and any two adjacent second electrodes 12 of the plurality of second electrodes 12 are parallel to each other. Here, "parallel" means a relationship in which two adjacent second electrodes 12 are spaced apart from each other at a certain space and do not intersect each other.

When each of the plurality of second electrodes 12 has a meander shape, distance P (pitch) (space in first direction D1) (FIG. 41A) between any two adjacent second electrodes 12 is generally from 1 mm to 30 mm inclusive, preferably from 2 mm to 10 mm inclusive in terms of an interpersonal pressure-sensitive use, and more preferably, for example, 5 mm. Maximum displacement Q (for example, amplitude× 2a) (FIG. 41A) in first direction D1 at each second electrode 12 is generally from 2 mm to 40 mm inclusive, preferably from 4 mm to 20 mm inclusive in terms of interpersonal pressure-sensitive use, and more preferably, for example, 10 mm. Repeating unit dimension R (FIG. 41A) in second direction D2 at each second electrode 12 is generally from 1 mm to 40 mm inclusive, preferably from 2 mm to 20 mm inclusive in terms of interpersonal pressure-sensitive use, and more preferably, for example, 10 mm.

Each second electrode 12, having dielectric 13 covering the surface of second electrode 12, is disposed in close proximity to first electrode 11. That is, each second electrode 12 is disposed so as to be in indirect contact with first electrode 11 via dielectric 13 on the surface of second electrode 12. In relation to the conductive properties, it is sufficient that second electrode 12 has a resistivity sufficiently smaller than impedance of capacitance in a desired frequency band. The resistivity of second electrode 12 is generally less than or equal to $10^{-1}$ Ω·cm, particularly from $10^{-12}$ Ω·cm to $10^{-1}$ Ω·cm inclusive, and more preferably from $10^{-12}$ Ω·cm to $10^{-8}$ Ω·cm inclusive. This resistivity can be achieved, for example, by using a metal wire.

Each second electrode 12 may generally have flexibility or may have elastic properties. Flexibility is a characteristic of returning to an original shape when released from force after having been flexed and deformed as a whole by external force (normal pressure force applied to the pressure-sensitive device: for example, pressure force of about 0.1 N/cm² to 100 N/cm² inclusive). Second electrode 12, having flexibility, has an elastic modulus of, for example, more than about $10^8$ Pa, particularly more than $10^8$ Pa and less than or equal to $10^{12}$ Pa, for example, about $1.2 \times 10^{11}$ Pa.

Second electrode 12 may include any material as long as second electrode 12 has at least conductive properties. Second electrode 12, having flexibility, for example, may include a metal body, may include a glass body and a conductive layer formed on a surface of the glass body or a conductive filler dispersed in the glass body, or may include a resin body and a conductive layer formed on a surface of the resin body or a conductive filler dispersed in the resin body. The metal body is an electrode member including metal, that is, second electrode 12 may substantially include metal. The metal body include, for example, at least one metal selected from the group consisting of gold (Au), silver (Ag), copper (Cu), nichrome (Ni—Cr alloy), carbon (C), zinc oxide (ZnO), indium (III) oxide ($In_2O_3$), and tin (IV) oxide ($SnO_2$). The glass body is not limited as long as the glass body has a silicon oxide network structure and may include, for example, at least one glass material selected from the group consisting of quartz glass, soda-lime glass, borosilicate glass, lead glass, and the like. The resin body may include at least one resin material selected from the group consisting of styrene-based resin, silicone-based resin (for example, polydimethylpolysiloxane (PDMS)), acrylic-based resin, rotaxane-based resin, urethane-based resin, and the like. The conductive layer of the glass body and the resin body may be a layer formed by depositing at least one metal selected from the group of metals similar to the metal that can form the metal body, or may be a layer formed by coating a conductive ink. The conductive filler of the glass body and the resin body may include at least one metal selected from the group consisting of metals similar to the metals that can form the metal body. Second electrode 12, having elastic properties, may include conductive rubber similar to first electrode 11.

Second electrode 12 is generally a long member having an elongated shape (for example, linear shape). When second electrode 12 is a long member and includes a metal body, second electrode 12 corresponds to a metal wire (for example, a copper wire) and is preferable in terms of further expanding the measurement range of the pressure force and further improving the pressure sensitivity.

Second electrode 12 may be a heater element of the pressure-sensitive device. When second electrode 12 is a heater element, the pressure-sensitive device having second electrode 12 also functions as a heater. A nichrome wire can be mentioned as a heater element. For example, when the pressure-sensitive device is installed on a seat surface of a vehicle, a driver's body or a passenger's body can be kept warm so as not to be cold. Further, for example, when the pressure-sensitive device is installed on a surface of a steering device (for example, a steering wheel), hands holding the steering device can be kept warm so as not to be cold.

The cross-sectional shape of second electrode 12 is not limited as long as the area of the contact region between dielectric 13 and first electrode 11 on the surface of second electrode 12 is expanded by applying pressure force, and may be, for example, a circular shape or an elliptical shape, or a triangular or trapezoidal shape. When the cross-sectional shape of second electrode 12 is a shape having an inclination, such as a triangular shape or a trapezoidal shape, the area of the contact region between dielectric 13 and first electrode 11 is likely to be constant when no pressure force is applied, and this improves linearity of sensitivity. In particular, when the cross-sectional shape of second electrode 12 is a trapezoidal shape, the first electrode and the second electrode (particularly, dielectric 13) can be separated from each other without a load during unloading, and thus reliability is improved.

The cross-sectional dimension of second electrode 12 is not limited as long as the capacitance between the electrodes can be measured, and is generally from 1 μm to 10 mm inclusive, preferably from 100 μm to 1 mm inclusive in terms of further expanding the measurement range of the pressure force and further improving the pressure sensitivity, and more preferably, for example, 300 μm. When the cross-sectional dimension of second electrode 12 is reduced, the change in the area of the contact region becomes large, and the pressure sensitivity is improved. Increasing a cross-sectional dimension of the long member further widens the measurement range of the pressure force. The cross-sectional dimension of second electrode 12 is a maximum dimension in the cross-sectional shape. Specifically, the cross-sectional dimension of second electrode 12 is a maximum dimension (for example, diameter) in the cross-sectional view perpendicular to the longitudinal direction, assuming that second electrode 12 has a linear shape.

In general, the plurality of second electrodes 12 is used. At this time, patterning is possible by detecting the changes in capacitance at the intersections (intersecting parts or cross points) between the plurality of second electrodes 12 and the plurality of first electrodes 11 with a detector. Patterning refers to detecting a pressing position as well as the pressure force.

The surface of each of the plurality of second electrodes 12 is covered with dielectric 13. Although dielectric 13 completely covers the entire surface of second electrode 12 in FIG. 41A and the like, a covering region of dielectric 13 is not limited as long as dielectric 13 at least partially covers the surface of second electrode 12. "Dielectric 13 at least partially covers the surface of second electrode 12" means that dielectric 13 covers at least a part of the surface of second electrode 12 between first electrode 11 and second electrode 12. In other words, it is sufficient that dielectric 13 covers at least a part of the surface of second electrode 12 as long as dielectric 13 is between first electrode 11 and second electrode 12. "Dielectric 13 covers" means that dielectric 13 is adhered to the surface of second electrode 12 as a film and integrated with the surface of second electrode 12.

In terms of further simplifying a pressure-sensitive device structure, dielectric 13 preferably completely covers the entire surface of second electrode 12. When dielectric 13 completely covers the entire surface of second electrode 12, dielectric 13 configures an insulating film of second electrode 12, and dielectric 13 and second electrode 12 are generally integrated. Integrated dielectric 13 and second electrode 12 may correspond to a single insulation-coated metal wire, and may be, for example, an enamel wire or an element wire. When an insulation-coated metal wire is used, a pressure-sensitive device can be configured without a photolithography process such as etching by simply arranging the insulation-coated metal wire between first electrode 11 and base material 24. This can further sufficiently simplify the pressure-sensitive device structure and reduce manufacturing costs.

Dielectric 13 may include any material as long as dielectric 13 has at least properties of a "dielectric". For example, dielectric 13 may include a resin material, a ceramic material, a metal oxide material, or the like. It should be noted that these are merely examples, but dielectric 13 may include at least one resin material selected from the group consisting of polypropylene resin, polyester resin (for example, polyethylene terephthalate resin), polyimide resin, polyphenylene sulfide resin, polyvinyl formal resin, polyurethane resin, polyamideimide resin, polyamide resin, and the like. Further, dielectric 13 may include at least one metal oxide material selected from the group consisting of $Al_2O_3$, $Ta_2O_5$, and the like. Dielectric 13 generally includes a material having a resistance value higher than impedance of capacitance in a desired frequency band.

Dielectric 13 generally has rigid properties. The rigidity properties are properties of resisting deformation due to external force (normal pressure force applied to a pressure-sensitive device: for example, pressure force of about 0.1 $N/cm^2$ to 100 $N/cm^2$ inclusive). Dielectric 13 is generally not deformed by the normal pressure force as described above. Dielectric 13 may have a higher elastic modulus than first electrode 11 so as not to be deformed more than first electrode 11 when pressure force is applied to the pressure-sensitive part. For example, when the elastic modulus of first electrode 11 is from about $10^4$ Pa to $10^8$ Pa inclusive, dielectric 13 may have a higher elastic modulus than the elastic modulus.

A thickness of dielectric 13 is not limited as long as the capacitance between the electrodes changes due to external pressure force, and is usually from 20 nm to 2 mm inclusive, preferably from 20 nm to 1 mm inclusive in terms of interpersonal pressure-sensitive use, and more preferably, for example, 10 μm.

Dielectric 13, including a resin material, can be formed by a coating method of applying a resin material solution and drying, an electrodeposition method of performing electrodeposition in a resin material solution, or the like. Dielectric 13, including a metal oxide material, can be formed by an anodic oxidation method or the like.

Pressure-sensitive device 100a may further include restraining member that limits displacement of second electrode 12. Restraining member 15 does not have to fix second electrode 12 at a predetermined position on pressure-sensitive device 100a, but it is sufficient that restraining member has such binding force as to hold second electrode 12 at a predetermined position. Pressure-sensitive device 100a, having the restraining member, can prevent displacement of second electrode 12, and consequently, can reliably detect the pressure force at a predetermined position. Further, the pressure-sensitive device, mounted on a curved surface, can easily reduce distortion and the like and prevent damage.

Restraining member 15 restrains second electrode 12 (and dielectric 13) to first elastic sheet 20 including first electrode 11 in FIG. 41A, but the configuration is not limited to this as long as dielectric 13 on the surface of second electrode 12 and first electrode 11 are brought into contact with each other. For example, restraining member 15 may restrain second electrode 12 (and dielectric 13) to first elastic sheet 20 and the base material sheet (not shown) described later, which is disposed so as to sandwich second electrode 12 (and dielectric 13). Further, for example, restraining member 15 may restrain second electrode 12 (and dielectric 13) to both first elastic sheet 20 and the base material sheet (not shown) described later. That is, the first elastic sheet, second electrode 12 (and dielectric 13), and the base material sheet (not shown) may be integrated by restraining member 15 in a state where second electrode 12 (and dielectric 13) is disposed between the first elastic sheet and the base material sheet. Restraining member 15 preferably restrains second electrode 12 (and dielectric 13) to first elastic sheet 20 including first electrode 11 in terms of further improving the expandability, further expanding the measurement range of the pressure force, and further improving the pressure sensitivity.

Restraining member 15 restrains by sewing and connecting with connecting thread 15a in terms of preventing dielectric 13 from peeling from second electrode 12, further improving the expandability of the pressure-sensitive device, further expanding the measurement range of the pressure force, and further improving the pressure sensitivity. By sewing and connecting first elastic sheet 20 and second electrode 12 with connecting thread 15a, a position where the first electrode and the second electrode intersect each other can be restrained within a certain range while maintaining bendability and expandability of the pressure-sensitive device, and reproducibility of a pressure sensitive position can be ensured. Furthermore, it is possible to prevent dielectric 13 from peeling from second electrode 12.

Connecting thread 15a may have a form of a twisted thread in which the fibers are twisted, or may have a form of a single fiber (that is, a monofilament) which is not twisted. The fibers configuring connecting thread 15a may be chemical fibers, natural fibers, or mixed fibers of chemical fibers and natural fibers. The chemical fibers and natural fibers that can form connecting thread 15a may be similar to the chemical fibers and natural fibers that can form the non-conductive thread in conductive cloth 2, respectively.

As connecting thread 15a, a thread having expandability and used for a thread for knitting or the like is preferably used. The thread having expandability is available as a commercial product such as Eiffel (Kanagawa Co., Ltd.) and SOLOTEX (registered mark) (TEIJIN FRONTIER CO., LTD.).

Restraint of second electrode 12 (and dielectric 13) to at least one of first elastic sheet 20 and the base material sheet described later with connecting thread 15a generally includes passing connecting thread 15a through at least one of first elastic sheet 20 and the base material sheet described later. At this time, connecting thread 15a is preferably passed so as to avoid the electrode (that is, the first electrode). For example, when connecting thread 15a is passed through first elastic sheet 20, connecting thread 15a is preferably passed through first insulating part 18, not through first electrode 11. Passing connecting thread 15a so as to avoid the electrodes makes it possible to suppress variations in the conductive properties of the first electrode and ensure accuracy of the pressure-sensitive measurement.

In FIG. 41A and the like, second electrode 12 is sewn and connected to first elastic sheet 20 by stitch in which connecting thread 15a straddles (or crosses) second electrode 12 (and dielectric 13) at first insulating part 18 (hereinafter, simply referred to as "stitch S1") without straddling (or crossing) first electrode 11, but the configuration is not limited to this.

When connecting thread 15a sews and connects second electrode 12 to first elastic sheet 20 by stitch S1, connecting thread 15a can sew and connect first elastic sheet 20 and second electrode 12 while being disposed along first direction D1 in a plan view as shown in FIG. 41A. As a result, first elastic sheet and second electrode 12 can be easily sewn and connected together in a state where a sewn part is not brought into contact with first electrode 11 during sewing with the connecting thread.

In general, pressure-sensitive device 100a preferably further includes the base material sheet (not shown) that faces first elastic sheet 20 across the plurality of second electrodes 12.

The base material sheet has elastic properties and non-conductive properties. The elastic properties are similar to the elastic properties of first electrode 11. Specifically, it is sufficient that the base material sheet has elastic properties such that expansion and contraction of the pressure-sensitive device in first direction D1 and second direction D2 are achieved. The base material sheet preferably has a lower elastic modulus than first electrode 11 so as to be deformed more than first electrode 11 when expanded or contracted. In terms of further improving the expandability, further expanding the measurement range of the pressure force, and further improving the pressure sensitivity, the elastic modulus of the base material sheet is preferably, for example, about $10^4$ Pa to $10^8$ Pa inclusive, for example, about $10^5$ Pa. The larger the elastic modulus of the base material sheet within the above range, the wider the measurement range of the pressure force. The smaller the elastic modulus of the base material sheet within the above range, the higher the pressure sensitivity. With a higher pressure sensitivity, for example, even minute pressure force that has been difficult to detect in the known art can be detected. This allows a start of application of the pressure force to be accurately detected. The elastic modulus can be adjusted, for example, by changing a cross-linking density. The cross-linking density can be adjusted by an amount of cross-linking material added. In relation to the non-conductive properties, a resistivity of the base material sheet may be sufficiently larger than impedance of capacitance in a desired frequency band. The resistivity of the base material sheet is generally more than or equal to $10^3$ Ω·cm, particularly from $10^4$ Ω·cm to $10^{10}$ Ω·cm inclusive, and more preferably, for example, $10^7$ Ω·cm. This resistivity can be achieved by using a resin material (rubber material).

The base material sheet corresponds to an elastic insulating member and can also be referred to as an expandable member. The base material sheet may include any material as long as the base material sheet has both the elastic properties and the non-conductive properties as described above. For example, the base material sheet may include a non-conductive resin including a resin material (particularly, a rubber material). In terms of further improving the expandability of the base material sheet in first direction D1 and second direction D2, further expanding the measurement range of the pressure force, and further improving the pressure sensitivity, the base material sheet preferably includes non-conductive rubber including a rubber material. The base material sheet, including non-conductive rubber, can more effectively expand and contract in first direction D1 and second direction D2, allows the pressure force to be more effectively detected, and produces a sense of pressure during pressing. The resin material may be a similar resin material to the resin material described in the description of first insulating part 18. The rubber material may be a similar rubber material to the rubber material described above in the description of first insulating part 18. The rubber material may include a cross-linking material and a filler for holding the elastic body and reinforcing tear strength and tensile strength, depending on a type of rubber.

A thickness of the base material sheet is not limited as long as the capacitance between the electrodes changes due to the pressure force from outside and the base material sheet can withstand the expansion and contraction. The thickness of base material sheet is generally from 0.01 mm to 10 mm inclusive, preferably from 0.01 mm to 2 mm inclusive, more preferably from 0.1 mm to 2 mm inclusive, and even more preferably, for example, 0.5 mm in terms of further improving the expandability of the base material sheet in first direction D1 and second direction D2, further expanding the measurement range of the pressure force, and further improving the pressure sensitivity in the interpersonal pressure-sensitive use.

Pressure-sensitive device 100a of the present disclosure generally has connector 60A electrically connected to the plurality of first electrodes 11 and connector 60B electrically connected to the plurality of second electrodes 12, as shown in FIG. 41A and the like. The capacitance and the changes in capacitance at the intersections (that is, the intersecting parts or cross points) of first electrodes 11 and second electrodes 12 in a plan view are measured through connectors 60A and 60B described above.

Figure 43B:
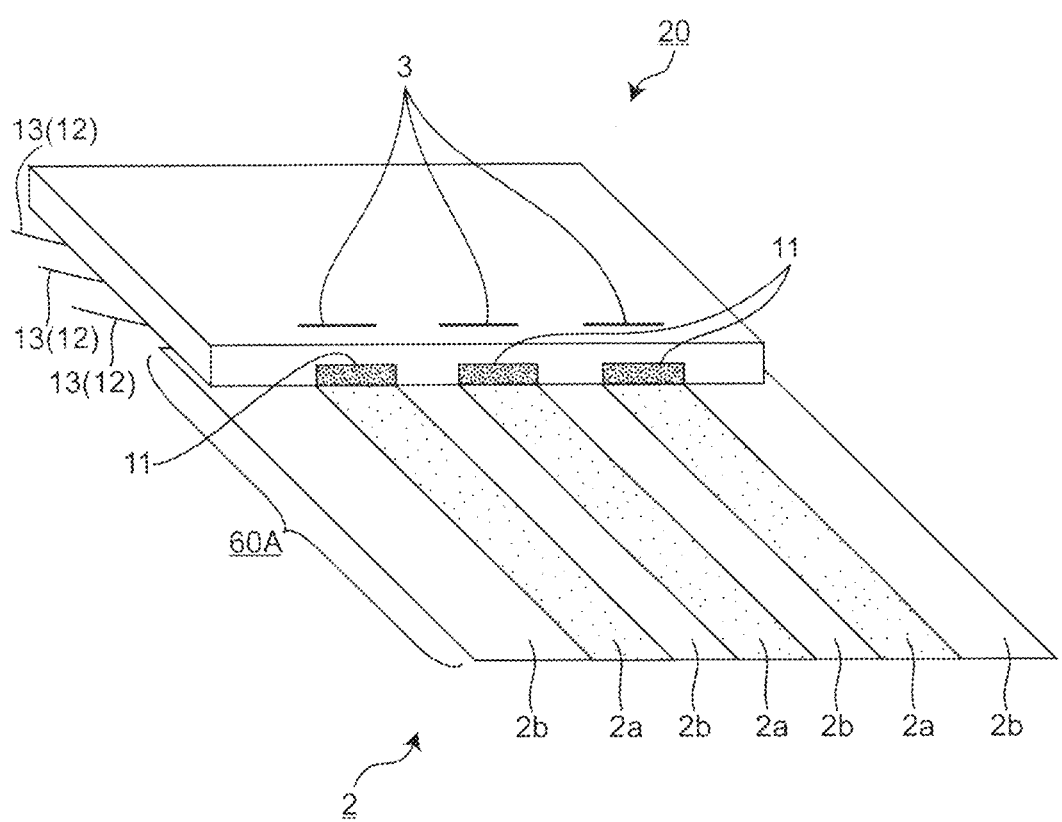
FIG. 43B is a schematic perspective view of an example of the basic structure (particularly, the connector structure) of the pressure-sensitive device according to the third exemplary embodiment of the present disclosure obtained by the method of drawing out shown in FIG. 43A.

In the present exemplary embodiment, conductive cloth 2 as the lead-out wire in the first exemplary embodiment is used as connector 60A. As described in the first exemplary embodiment, conductive cloth 2 includes two or more conductive parts 2a and two or more non-conductive parts 2b, and conductive part 2a preferably has a pattern shape corresponding to the plurality of first electrodes 11 in conductive cloth 2. "Conductive part 2a has a pattern shape corresponding to the plurality of first electrodes 11" means that conductive cloth 2 has a number of conductive parts 2a corresponding to a number of the plurality of first electrodes 11 as shown in FIG. 43A and that each conductive part 2a is formed in such a pattern shape as to be led out from each of the plurality of first electrodes 11. As a result, as shown in FIGS. 43A and 43B, each of the plurality of first electrodes 11 and each conductive part 2a are electrically connected to each other by sewing with connecting thread 3. In general, the pattern shape may be a shape in which two or more conductive parts 2a have a parallel relationship with each other in a plan view. FIG. 43A is a schematic perspective view (or schematic exploded view) for explaining the method (particularly, the connector structure) of drawing out from two or more first electrodes (that is, conductive elastic bodies) by the conductive cloth in the pressure-sensitive device according to the third exemplary embodiment. FIG. 43B is a schematic perspective view of an example of the basic structure (particularly, the connector structure) of the pressure-sensitive device according to the third exemplary embodiment of the present disclosure obtained by the method of drawing out shown in FIG. 43A.

In the present exemplary embodiment, conductive part 2a of conductive cloth 2 configuring the lead-out wire is electrically connected to first electrode 11. Specifically, conductive cloth 2 is used as the lead-out wire, and a direct contact and an electrical connection between conductive part 2a of conductive cloth 2 and conductive elastic body 1 are achieved by connecting thread 3. This more sufficiently alleviates the stress concentration and more sufficiently reduces the contact resistance between the first electrode and the lead-out wire. Furthermore, in the pressure-sensitive device, the pressure-sensitive device according to the third exemplary embodiment of the present disclosure gives relatively little feeling of a foreign substance and has a relatively high connection reliability with respect to external force when the human body is brought into contact with a connection part between first electrode 11 and conductive cloth 2.

Connector 60B is not limited as long as the measurement can be performed with an electrical connection with second electrodes 12, and a known connector can be used.

(Method of Manufacturing Pressure-Sensitive Device According to Third Exemplary Embodiment of Present Disclosure)

Pressure-sensitive device 100a according to the third exemplary embodiment of the present disclosure can be manufactured, for example, by a method including the following steps:

a step of manufacturing first elastic sheet 20 including the plurality of first electrodes 11 and first insulating part 18; a step of installing second electrodes 12 having dielectric 13 on the surface of first elastic sheet 20; and a step of connecting connectors 60A and 60B to first elastic sheet 20 on which second electrodes 12 are installed.

In a step of manufacturing first elastic sheet 20, for example, first elastic sheet 20 shown in FIG. 37A is obtained by using a known method of molding with a mold. Specifically, it is sufficient to adopt, for example, the method shown in FIGS. 42A to 42D described above.

In the step of installing second electrodes 12, first, bent parts K are formed on second electrodes 12 in a desired arrangement, and second electrodes 12 are arranged on first elastic sheet 20. Next, each second electrode 12 is restrained to first elastic sheet 20 at a desired position by restraining member 15. For example, as shown in FIG. 43A, connecting thread 15a is used at a desired position and with a desired stitch to sew and connect second electrodes 12 to first elastic sheet 20.

In the step of connecting the connectors, for example, as shown in FIGS. 43A and 43B, each end of the plurality of first electrodes 11 of first elastic sheet in which second electrodes 12 are installed is disposed so as to overlap each end of the plurality of conductive parts 2a of conductive cloth 2 (connector 60A). Then, as shown in FIG. 43B, an overlapping part between first elastic sheet 20 and conductive cloth 2 is sewn with connecting thread 3.

(Use of Electronic Device of Present Disclosure)

The electronic device (particularly, pressure-sensitive device) of the present disclosure can be suitably used as a sensor element in various management systems and various electronic devices.

Examples of management systems include a shortage management system (shopping basket, logistics management, refrigerator goods, and inventory management), a vehicle management system (or driver monitoring system) (seat, steering device, switch around console (allowing analog input)), a coaching management system (shoes and clothing), a security management system (all contact parts), a nursing care and childcare management system (functional bedding and functional toilet seat goods), and the like.

The vehicle management system (or driver monitoring system) monitors a distribution of pressure applied to a steering device by a driver (that is, gripping force or gripping position) and changes in the distribution and a distribution of pressure applied to an in-vehicle seat by the driver (sitting state) (for example, center of gravity position) and changes in the distribution. This makes it possible to grasp a driving state, read a condition of the driver (sleepiness, psychological state, and the like), and provide feedback.

The coaching management system is a system that can monitor at least one of the center of gravity and load distribution of the human body (for example, the sole of the foot) and changes in the at least one of the center of gravity and the load distribution, and correct or guide a state to an appropriate state or a comfortable state.

The security management system can, for example, read a weight, stride length, passing speed, sole pattern, and the like simultaneously when a person passes by and identify the person by collating with data.

The nursing care and childcare management system is a system that monitors a distribution of pressure applied to a bed, a toilet seat, or the like by a human body or a center of gravity of the pressure and changes in the distribution or the center of gravity, and estimates a behavior, and prevents overturn and fall.

Examples of electronic devices include in-vehicle devices (car navigation systems, audio equipment, and the like), home appliances (electric kettles, IH cooking heaters, and the like), smartphones, electronic paper, electronic book readers, and the like. By being applied to various management systems and various electronic devices as described above, the pressure-sensitive device of the present disclosure can be used as a touch sensor element (pressure-sensitive sheet, operation panel, operation switch, and the like) that is more convenient for a user than ever before.

In the detector (not shown) of pressure-sensitive device 100a, terminal T11 to which first electrode 11 is electrically connected is preferably connected to a ground of a main body of the moving body.

Uses of the pressure-sensitive device of the present disclosure can be classified into interpersonal pressure-sensitive use and non-interpersonal pressure-sensitive use.

The interpersonal pressure-sensitive use is use for monitoring pressure caused by the human body, and includes, among the above uses, for example, the vehicle management system (or driver monitoring system), the coaching management system, the security management system, and the nursing care and childcare management system. The non-interpersonal pressure-sensitive use is use for monitoring pressure caused by an object other than the human body, and includes, for example, a shortage management system among the above uses.

Example 2

(Experimental Example 1) (First Exemplary Embodiment)

Figure 44:
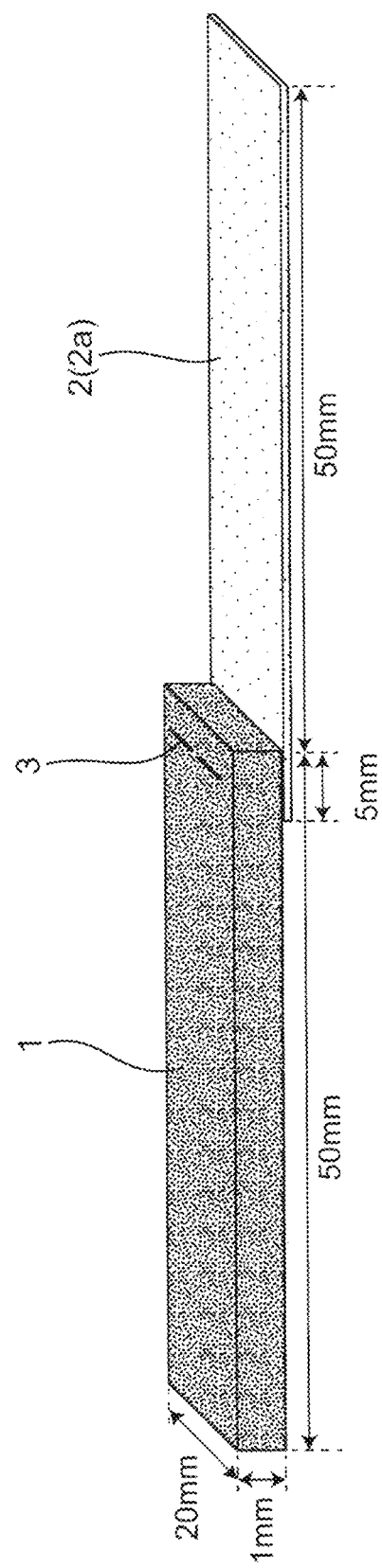
FIG. 44 is a schematic perspective view of an evaluation device used in Experimental Example 1.

Conductive elastic body 1 having dimensions shown in FIG. 44 was manufactured. Conductive elastic body 1 includes conductive rubber containing silicone rubber and a conductive filler (conductive carbon). The elastic modulus was $10^6$ Pa.

Conductive cloth 2 having dimensions shown in FIG. 44 was manufactured. Conductive cloth 2 includes only conductive part 2a. Specifically, conductive cloth 2 was formed by electroless plating a non-conductive cloth (woven fabric), plating nickel as a buffer layer, and then laminating a silver layer on a surface layer.

Conductive elastic body 1 and conductive cloth 2 were sewn together with connecting thread 3 (cotton thread) in a state of being overlapped as shown in FIG. 44.

Evaluation

The resistance value of only conductive elastic body 1 was measured with a tester. Specifically, the measurement was performed at both ends of conductive elastic body 1 in the longitudinal direction.

Next, the resistance value of an integrated product of conductive elastic body 1 and conductive cloth 2 was measured by a tester. Specifically, the measurement was performed at both ends of the integrated product in the longitudinal direction.

Such measurements were performed two more times. The measurement results are shown in Table 2.

TABLE 2

| Measurement method/resistance value [kΩ] | First time | Second time | Third time |
|---|---|---|---|
| After sewing: only conductive elastic body | 0.455 | 0.455 | 0.454 |
| After sewing: conductive elastic body + conductive cloth | 0.468 | 0.460 | 0.455 |

The "resistance value of only the conductive elastic body" and the "resistance value of the conductive elastic body+the conductive cloth" were substantially the same. This has revealed that the contact resistance between the conductive elastic body and the conductive cloth (that is, the electrical resistance generated by the contact) is extremely low in the electronic device of the present disclosure.

These results have confirmed that the electronic device according to the first exemplary embodiment of the present disclosure can achieve a sufficiently low contact resistance while having excellent flexibility and expandability.

(Experimental Example 2) (Second Exemplary Embodiment)

Figure 45:
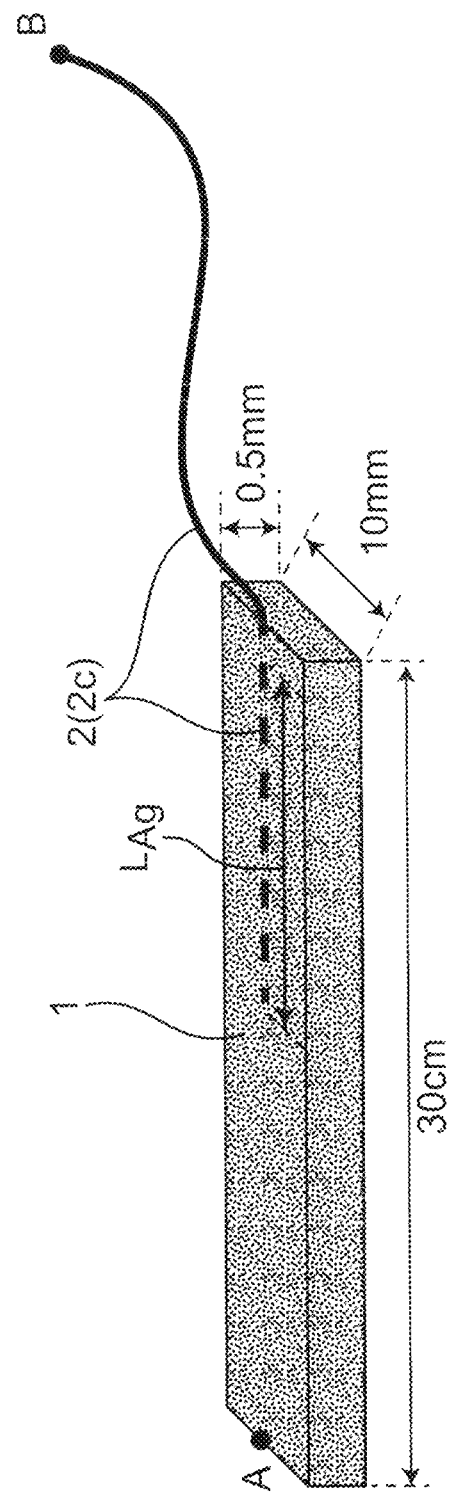
FIG. 45 is a schematic perspective view of an evaluation device used in Experimental Example 2.

Conductive elastic body 1 having dimensions shown in FIG. 45 was manufactured. Conductive elastic body 1 includes conductive rubber containing silicone rubber and a conductive filler (conductive carbon). The elastic modulus was $10^6$ Pa.

A silver wire was used as conductor wire 2c shown in FIG. 45.

Figure 46:
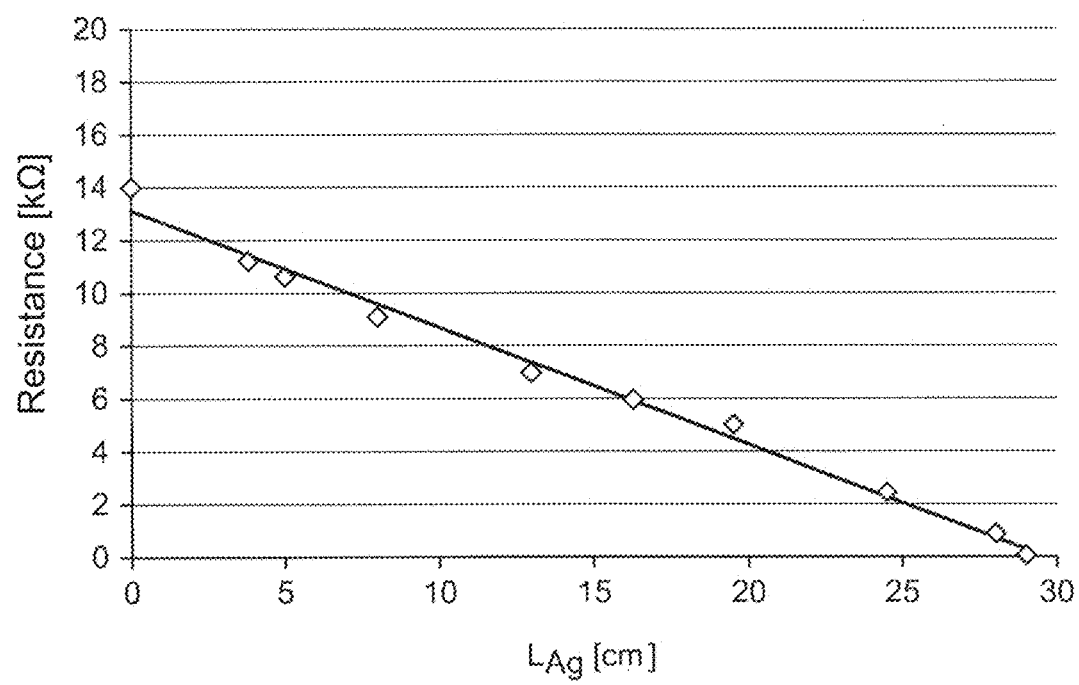
FIG. 46 is a graph of evaluation results of Experimental Example 2.
Figure 47:
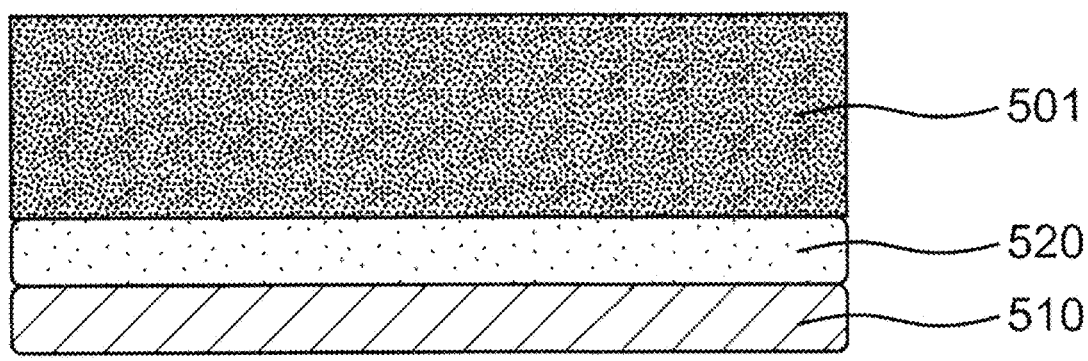
FIG. 47 is a schematic cross-sectional view of an example of a basic structure of an electronic device according to the known art.

As shown in FIGS. 45 and 39B, conductor wire 2c was gradually passed through conductive elastic body 1 in a parallel stitch form.
Evaluation The resistance value between A and B in FIG. 45 was measured by a tester, and a graph showing a relationship between LAg and the resistance value is shown in FIG. 46. LAg is LAg in FIG. 10, and is a passing distance of conductor wire 2c in conductive elastic body 1. The resistance value of only conductive elastic body 1 (that is, the resistance values measured at both ends of conductive elastic body 1 in the longitudinal direction) was 14 kΩ. The resistance value of conductor wire 2c alone was 0.05 kΩ.

The graph shown in FIG. 46 has revealed the following items:
  The resistance value between A and B when LAg is 0 cm is significantly close to the resistance value of conductive elastic body 1 alone;
  The resistance value between A and B when LAg is 30 cm is significantly close to the resistance value of conductor wire 2c alone; and
  When LAg is from 0 cm to 30 cm inclusive, the relationship between LAg and the resistance value between A and B indicates a relationship of a linear function.

These results confirmed that the electronic device according to the second exemplary embodiment of the present disclosure can achieve a sufficiently low contact resistance while having excellent flexibility and expandability.

The pressure-sensitive element of the present disclosure can be suitably used as a sensor element in various management systems and various electronic devices described above. By being applied to various management systems and various electronic devices as described above, the pressure-sensitive element of the present disclosure can be used as a touch sensor element (pressure-sensitive sheet, operation panel, operation switch, and the like) that is more convenient for a user than ever before.

The electronic device (particularly, pressure-sensitive device) of the present disclosure can be suitably used as a sensor element in various management systems and various electronic devices described above. By being applied to various management systems and various electronic devices as described above, the pressure-sensitive device of the present disclosure can be used as a touch sensor element (pressure-sensitive sheet, operation panel, operation switch, and the like) that is more convenient for a user than ever before.

What is claimed is:

1. A pressure-sensitive element comprising:
a plurality of first electrodes each including a conductive elastic body and being elongated in a first direction;
a plurality of second electrodes each including a conductor wire and being elongated in a second direction; and
a plurality of dielectrics, each of which completely covers a surface of a corresponding one of the plurality of second electrodes as a whole, and the plurality of the dielectrics are in contact with the plurality of first electrodes in a predetermined contact region, wherein:
the plurality of first electrodes is aligned in a first plane and in a direction perpendicular to the first direction,
the plurality of second electrodes is aligned in a second plane facing the first plane and in a direction perpendicular to the second direction,
the first direction and the second direction intersect when viewed from above the first plane,
the plurality of the first electrodes, the plurality of the second electrodes, and the plurality of the dielectrics produce capacitance, and
an area of the contact region is changed in accordance with applied pressure force, thereby changing the capacitance.

2. The pressure-sensitive element according to claim 1, further comprising a third electrode facing the plurality of the first electrodes and including a conductive elastic body.

3. The pressure-sensitive element according to claim 2, wherein each of the plurality of the second electrodes has bent parts arranged regularly.

4. The pressure-sensitive element according to claim 3, wherein the pressure-sensitive element expands and contracts in the first direction based on elasticity of the plurality of the first electrodes and expands and contracts in the second direction based on extension and bending of the bent parts of the plurality of the second electrodes.

5. The pressure-sensitive element according to claim 1, wherein each of the plurality of the second electrodes has a meander shape in a plan view.

6. The pressure-sensitive element according to claim 1, further comprising a first insulating part, wherein the plurality of the first electrodes and the first insulating part integrally configure a first elastic sheet.

7. The pressure-sensitive element according to claim 6, wherein each of the plurality of the first electrodes is disposed with a surface facing the plurality of the second electrodes being flush with a surface facing the plurality of the second electrodes in the first insulating part.

8. The pressure-sensitive element according to claim 7, further comprising a first insulating layer disposed on a side opposite to the second electrode when viewed from the first elastic sheet.

9. The pressure-sensitive element according to claim 8, further comprising a second elastic sheet facing the first elastic sheet across the plurality of the second electrodes, wherein the second elastic sheet has a plurality of third electrodes facing the plurality of the first electrodes and including a conductive elastic body, and a plurality of second insulating parts disposed between the plurality of third electrodes and including an insulating elastic body.

10. The pressure-sensitive element according to claim 9, further comprising a second insulating layer disposed on a side opposite to the plurality of the second electrodes when viewed from the second elastic sheet.

11. The pressure-sensitive element according to claim 9, further comprising a sealing part provided between the first elastic sheet and the second elastic sheet and internally sealing the plurality of the second electrodes.

12. The pressure-sensitive element according to claim 1, wherein the plurality of the first electrodes includes conductive rubber.

13. The pressure-sensitive element according to claim 1, wherein the dielectric has a thickness of 20 nm to 2 mm inclusive.

14. The pressure-sensitive element according to claim 1, wherein each of the plurality of the first electrodes is in direct contact with more than one dielectrics.

\* \* \* \* \*